(12) United States Patent
Imai et al.

(10) Patent No.: US 11,726,254 B2
(45) Date of Patent: Aug. 15, 2023

(54) METHOD FOR PRODUCING OPTICAL RESONATOR AND OPTICAL MODULATOR, OPTICAL RESONATOR, OPTICAL MODULATOR, OPTICAL FREQUENCY COMB GENERATOR, AND OPTICAL OSCILLATOR

(71) Applicant: XTIA LTD, Tokyo (JP)

(72) Inventors: Kazuhiro Imai, Tokyo (JP); Motonobu Kourogi, Tokyo (JP); Mark Jablonski, Tokyo (JP)

(73) Assignee: XTIA LTD, Tokyo (JP)

( * ) Notice: Subject to any disclaimer, the term of this patent is extended or adjusted under 35 U.S.C. 154(b) by 0 days.

(21) Appl. No.: 17/787,215

(22) PCT Filed: Dec. 9, 2020

(86) PCT No.: PCT/JP2020/045819
§ 371 (c)(1),
(2) Date: Jun. 17, 2022

(87) PCT Pub. No.: WO2021/125007
PCT Pub. Date: Jun. 24, 2021

(65) Prior Publication Data
US 2023/0016963 A1 Jan. 19, 2023

(30) Foreign Application Priority Data

Dec. 17, 2019 (JP) .................. 2019-227630
Jun. 8, 2020 (JP) .................. 2020-099226

(51) Int. Cl.
*F21V 8/00* (2006.01)
(52) U.S. Cl.
CPC ......... *G02B 6/0065* (2013.01); *G02B 6/0055* (2013.01)

(58) Field of Classification Search
CPC ...... G02B 6/3636; G02B 6/00; G02B 6/0218; G02B 6/022
See application file for complete search history.

(56) References Cited

U.S. PATENT DOCUMENTS 6,181,851 B1 * 1/2001 Pan ...................... G02B 6/0218
385/37
6,456,766 B1 * 9/2002 Shaw ..................... G02B 6/423
385/47

(Continued)

FOREIGN PATENT DOCUMENTS

JP    1980045070    3/1980
JP    1990118605    5/1990

(Continued)

*Primary Examiner* — William J Carter
(74) *Attorney, Agent, or Firm* — David R. Stevens; Stevens Law Group

(57) ABSTRACT

The present disclosure describes an optical waveguide provided with an incident side reflection film and an emission side reflection film to resonate light incident via the incident side reflection film and formed to penetrate from the incident side reflection film to the emission side reflection film for propagating resonated light. The disclosure also includes a substrate to which the optical waveguide is formed from a top surface thereof and a first protection member and a second protection member formed with a material corresponding to a material of the substrate, wherein the first protection member and the second protection member are arranged on the optical waveguide such that one end facet of the first protection member forms an identical plane with a first end facet of the substrate including an optical incident end.

15 Claims, 35 Drawing Sheets

(56) References Cited

U.S. PATENT DOCUMENTS

2006/0291793 A1* 12/2006 Carpenter ............ G02B 6/3652
385/137
2009/0297087 A1 12/2009 Kawano

FOREIGN PATENT DOCUMENTS

| JP | 1995027931 | 1/1995 |
| JP | 1995058386 | 3/1995 |
| JP | 1999352350 | 12/1999 |
| JP | 2001125157 | 5/2001 |
| JP | 2003202609 | 7/2003 |
| JP | 2004206068 | 7/2004 |
| JP | 003891977 | 3/2007 |
| JP | 004781648 | 9/2011 |
| WO | 2007114367 | 10/2007 |

* cited by examiner

S11 Manufacturing photoresist pattern

S12 Thermal diffusion

S13 Deposition of SiO₂ film

S14 Manufacturing electrode

S15 Bonding protection member

S16 Polishing and coating

FIG. 21(A) S21 Manufacturing photoresist pattern
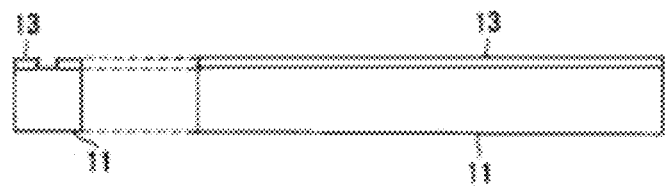
FIG. 21(B) S22 Proton exchange
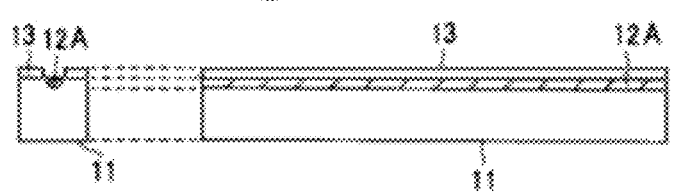
FIG. 21(C) S23 Depsition of SiO₂ film
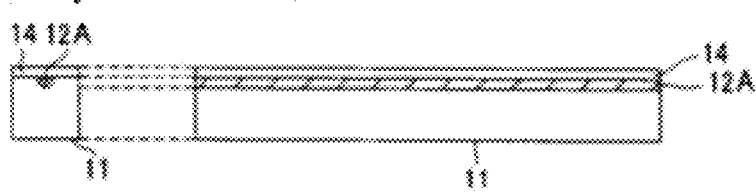
FIG. 21(D) S24 Manufacturing electrode
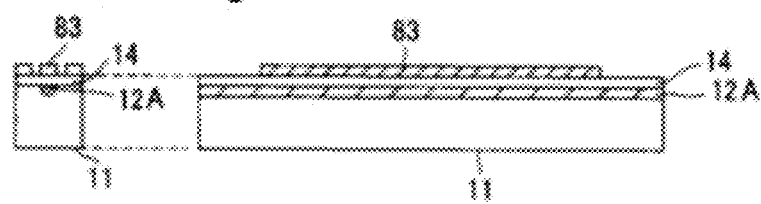
FIG. 21(E) S25 Bonding protection member
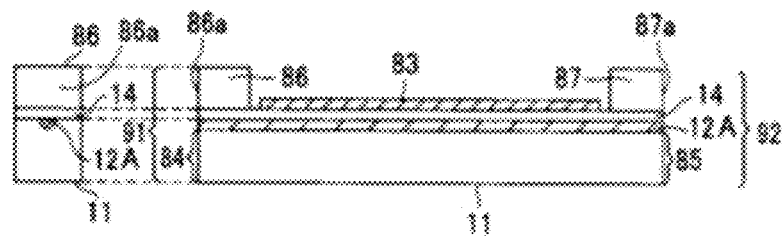
FIG. 21(F) S26 Polishing and coating
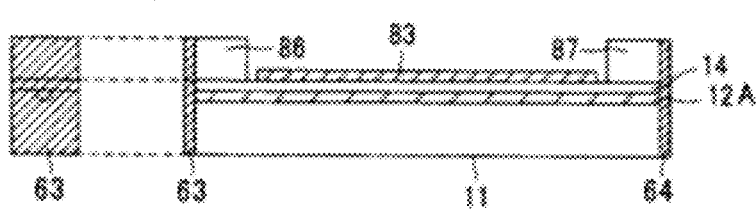

FIG. 26(A) S31 Manufacturing photoresist pattern
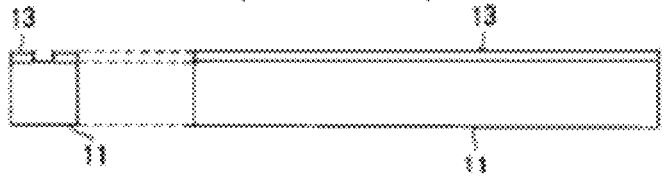
FIG. 26(B) S32 Proton exchange
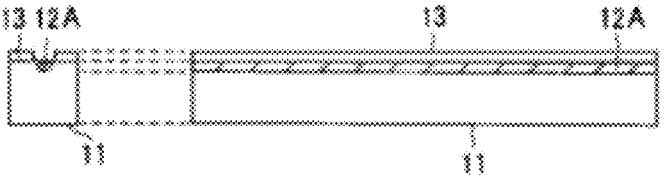
FIG. 26(C) S33 Forming ridge structure
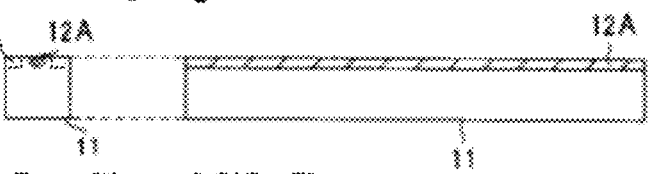
FIG. 26(D) S34 Depsition of SiO₂ film
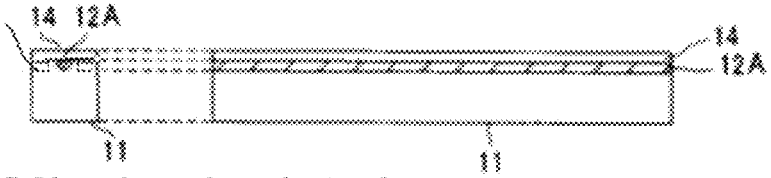
FIG. 26(E) S35 Manufacturing electrode
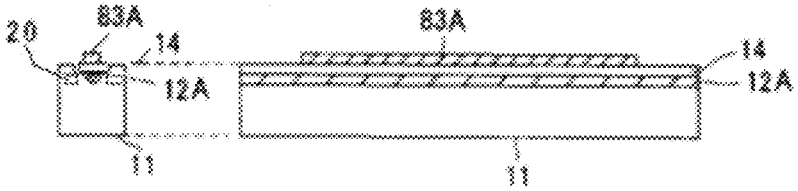
FIG. 26(F) S36 Bonding protection member
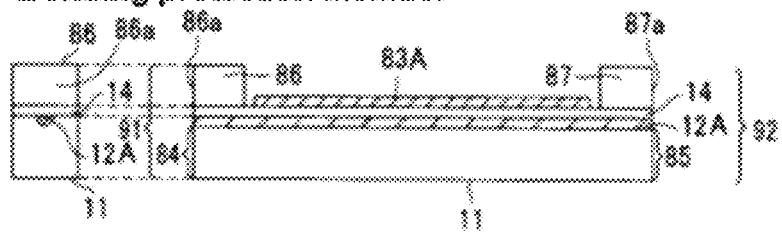
FIG. 26(G) S37 Polishing and coating
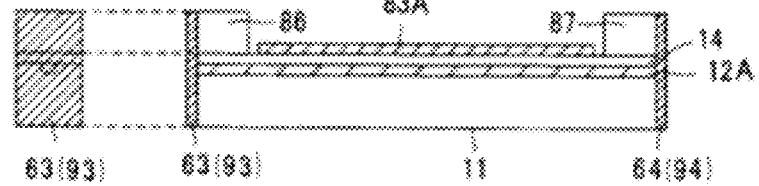

METHOD FOR PRODUCING OPTICAL RESONATOR AND OPTICAL MODULATOR, OPTICAL RESONATOR, OPTICAL MODULATOR, OPTICAL FREQUENCY COMB GENERATOR, AND OPTICAL OSCILLATOR

BACKGROUND OF THE INVENTION

Field of the Invention

The present invention relates to a method for producing an optical resonator and an optical modulator, an optical resonator, an optical modulator, an optical frequency comb generator, and an optical oscillator that are applicable to technical fields requiring highly coherent multi-frequency reference light sources, such as an optical communication, an optical CT, and an optical frequency standard, and light sources that can utilize the coherence among frequencies. The present application claims priority based on Japanese Patent Application No. 2019-227630 filed in Japan on Dec. 17, 2019 and Japanese Patent Application No. 2020-099226 filed in Japan on Jun. 8, 2020, which are incorporated by reference herein.

Description of Related Art

As a result of the development of optoelectronics in recent years, a waveguide type optical resonator for resonating a light confined in an optical waveguide has been used frequently, in order to meet demands for a laser optical control for frequency multiplex communications and frequency observations of widely distributed absorption line.

When highly accurately observing an optical frequency, the technique of heterodyne detection is employed. With heterodyne detection, light to be observed is made to interfere with other light to detect the electric signal of the generated optical beat frequency. The band of light which can be observed that can be used for heterodyne detection is limited by the frequency band of the light receiving element to be used for the detection system and is about tens of several GHz.

Meanwhile, as a result of the development of optoelectronics in recent years, the need for extending the band of light which can be observed has been intensified for the purpose of optical control for frequency multiplex communications and frequency observations of widely distributed absorption line.

Broad band heterodyne detection systems using an optical frequency comb generator have been proposed (for example, refer to Patent Document 1) to meet the need for extending the band of light which can be observed. Optical frequency comb generators are adapted to generate comb-shaped sidebands appearing at regular frequency intervals. The frequency stability of the sidebands is substantially equal to that of incident light. It is possible to set up a broad band heterodyne detection system of several THz where the generated sidebands and light to be observed are subjected to heterodyne detection.

FIG. 1 of the accompanying drawings schematically illustrates the principle of structure of a known optical frequency comb generator 1003 of the bulk type.

Referring to FIG. 1, an optical resonator 1000 including an optical phase modulator 1031 and reflectors 1032, 1033 arranged opposite to each other with the optical phase modulator 1031 interposed between them is used in the optical frequency comb generator 1003.

The optical resonator 1000 causes light $L_{in}$ that enters it by way of the reflector 1032 with a small transmission factor to resonate between the reflectors 1032, 1033 and allows part of light Lout by way of the reflector 33. The optical phase modulator 1031 is formed by using electrooptic crystal for optical phase modulation of changing the refractive index by applying an electric field and adapted to modulate the phase of light passing through the optical resonator 1000 according to the electric signal of frequency $f_m$ applied to the electrode 1036.

With the optical frequency comb generator 1003, it is possible to modulate the phase of light deeper by tens of several times than ever by using an electric signal that is synchronized with the time necessary for light to make a round trip in the optical resonator 1000 and driving it to enter from the electrode 1036 into the optical phase modulator 1031 if compared with light that is made to pass through the optical phase modulator 1031 only once. With this arrangement, it is possible to generate several hundreds of sidebands of higher orders. Then, all the frequency intervals $f_m$ of adjacent sidebands are equal to the frequency $f_m$ of the input electric signal.

Known optical frequency comb generators are not limited to the above-described bulk type. For example, a waveguide type optical frequency comb generator 1020 including an optical waveguide as shown in FIG. 2 of the accompanying drawings is also feasible.

Referring to FIG. 2, the waveguide type optical frequency comb generator 1020 includes a waveguide type optical modulator 1200. The waveguide type optical modulator 1200 includes a substrate 1201, an optical waveguide 1202, an electrode 1203, an incident side reflection film 1204, an emission side reflection film 1205 and an oscillator 1206.

The substrate 1201 is typically formed by cutting a large crystal of $LiNbO_3$ or GaAs with a diameter of 3 to 4 inches grown by a pulling method into a wafer. The surface of the substrate 1201 produced by cutting is then subjected to a mechanical polishing process and/or a chemical polishing process.

The optical waveguide 1202 is provided to propagate light. The refractive index of the layer of the optical waveguide 1202 is set to be higher than that of any other layer such as the substrate 1201. Light that enters the optical waveguide 1202 is propagated through the optical waveguide 1202 as it is totally reflected by the interface thereof. Generally, the optical waveguide 1202 can be prepared by diffusing Ti atoms in the substrate 1201 or by depositing Ti atoms on the substrate 1201 by epitaxial growth.

Note that an $LiNbO_3$ crystal type optical waveguide may be used as the optical waveguide 1202. The $LiNbO_3$ crystal type optical waveguide can be formed by diffusing Ti atoms on a surface of the substrate 1201 mainly made of $LNbO_3$. When preparing the $LiNbO_3$ crystal type optical waveguide, firstly a photoresist pattern is formed on the surface of the substrate 1201 and then Ti atoms are deposited. Subsequently, the photoresist is removed to produce Ti micro-wires having a width of microns. Thereafter, Ti atoms are thermally diffused in the substrate 1201 by heating the Ti micro-wires.

As Ti is thermally diffused in the substrate 1201 of $LiNbO_3$, light can be confined to the region where Ti is diffused as the region shows a refractive index higher than that of any other region. Thus, the optical waveguide 1202 that can propagate light through the region where Ti is diffused is formed. Since the $LiNbO_3$ crystal type optical waveguide 1202 prepared in a manner as described above has electrooptic effects, it is possible to change the refractive index by applying an electric field to it.

The electrode 1203 is typically made of a metal material such as Al, Cu, Pt or Au and adapted to drive and input an electric signal of frequency $f_m$ supplied from outside into the optical waveguide 1202. The direction of propagation of light agrees with the direction of progression of the modulation electric field. The speed of light propagating through the optical waveguide 1202 may be made to agree with the speed of the electric signal propagating on the electrode 1203 by adjusting a width and thickness of the electrode 1203. With this arrangement, it is possible to maintain the phase of the electric signal relative to light propagating through the optical waveguide 1202.

The incident side reflection film 1204 and the emission side reflection film 1205 are provided to resonate light that enters the optical waveguide 1202 by reciprocatingly reflecting light passing through the optical waveguide 1202. The oscillator 1206 is connected to the electrode 1203 to supply an electric signal of frequency $f_m$.

The incident side reflection film 1204 is arranged at the light receiving side of the waveguide type optical modulator 1200 and receives light of frequency $\gamma_1$ from the light source. The incident side reflection film 1204 reflects light that is reflected by the emission side reflection film 1205 and passed through the optical waveguide 1202.

The emission side reflection film 1205 is arranged at the emission side of the waveguide type optical modulator 1200 and reflects light that is passed through the optical waveguide 1202. It also emits light that is passed through the optical waveguide 1202 to the outside at a predetermined ratio.

Since the electric signal synchronized with the time necessary for light to make a round trip in the optical waveguide 1202 is driven and input from the electrode 1203 to the waveguide type optical modulator 1200 of the waveguide type optical frequency comb generator 1020 having the above-described configuration, it is possible to modulate the phase of light deeper by tens of several times than ever by using an electric signal that is synchronized with the time necessary for light to make a round trip in the optical phase modulator and driving it to enter from the electrode 1203 into the waveguide type optical modulator 1200 if compared with light that is made to pass through the optical phase modulator only once. With this arrangement, it is possible to generate broad sidebands like the above-described bulk type optical frequency comb generator 1003. Then, all the frequency intervals of adjacent sidebands are equal to the frequency $f_m$ of the input electric signal.

The waveguide type optical frequency comb generator 1020 is characterized by a small interacting region of light and an electric signal. Since light is confined in the optical waveguide 1202 of dimensions in the order of microns having a refractive index higher than that of the surroundings and propagated, it is possible to locally raise the electric field intensity in the optical waveguide 1202 by fitting the electrode 1203 at a position close to the pole of the optical waveguide 1202. Therefore, the electrooptic effects obtained in the optical waveguide 1202 are greater than those of the bulk type optical frequency comb generator 1003 so that the waveguide type optical modulator 1200 can modulate light with less electric power.

However, known waveguide type optical frequency comb generator 1020 as described above has a disadvantage that the operation of laying the incident side reflection film 1204 and the emission side reflection film 1205 and polishing the end facets of the optical waveguide 1202 where the films are laid is difficult due to the structure of the optical waveguide 1202, and hence it is difficult to prepare resonators with a high degree of finesse and reproducibility. To improve the performance of a waveguide type optical frequency comb generator 1020, it is indispensable to improve the finesse of the resonator including the incident side reflection film 1204 and the emission side reflection film 1205. As the number of reciprocations of light cannot be increased if the degree of finesse is low, even if the modulation index of the optical waveguide 1202 is high only in the forward direction or the backward direction, and as it is not possible to generate sidebands over a broad range with an enhanced intensity.

Also, an optical comb generator and an optical modulator applying a phase modulation not only to a light transmitted toward a forward direction of an optical waveguide, but also to a light transmitted toward a backward direction of the optical waveguide, are proposed (for example, refer to Patent Document 2).

FIG. 3 of the accompanying drawings illustrates an end facet of a waveguide type optical frequency comb generator 1020 where an incident side reflection film 1204 is formed. Referring to FIG. 3, an optical waveguide 1202 is formed at the top of a substrate 1201 and a thin buffer layer is laid thereon. Finally, an electrode 1203 is formed on the buffer layer. In short, the optical waveguide 1202 is arranged at a corner of the top of the end facet of the waveguide type optical frequency comb generator 1020. Since the corner of the top of the end facet is pointed, it can be often chipped in a manner as shown in FIG. 3 during the polishing operation. When the top of the end facet has chips, light to be resonated is scattered and lost.

If the corner of the top of the end facet does not have chips, it may be rounded depending on the condition of polishing the end facet. When the corner is rounded, reflected light partly goes out of the waveguide mode of the optical waveguide 1202 and becomes lost.

The corner of the top of the end facet may remain free from chips and roundedness by chance. However, a problem as described below arises when forming an incident side reflection film 1204 on the end facet even when the corner is free from chips and roundedness. A highly reflective film such as the incident side reflection film 1204 is normally prepared by depositing alternately component films showing a high refractive index and films showing a low refractive index. However, the films can easily be peeled off from the corner at the top of the end facet and the material of the component films showing a high refractive index can easily move from the end facet to the lateral surfaces to consequently change the film thickness. Then, it is no longer possible to control the film thickness according to the design value.

Thus, in the optical waveguide forming a core by a diffusion or the like in the substrate, the core is formed on a surface of the substrate, so at the end facet, at least one side of an outer periphery of the core will be located at an outer periphery of the substrate. When an optical thin film such as a reflection film is formed on the end facet of such waveguide by a deposition method, a sputtering method, a chemical vapor deposition method, or the like, at an outer periphery of the end facet of the substrate, film deposition particles will be moved to a side surface, and film deposition particles derived from a side surface direction will be moved to the end facet, so it is difficult to achieve a uniform film thickness at the outer periphery of the end facet of the substrate. Therefore, it was very difficult to form a film thin enough to function as the reflection film or the like, and also with small film thickness distribution, on the end facet of the core located at the outer periphery of the end facet of the substrate.

Here, the present applicant has previously proposed an optical resonator, an optical modulator, an optical frequency comb generator and an optical oscillator where the chips and the roundedness of the corner of the end facet of the optical waveguide are minimized in the polishing process and the reflection film is laid reliably and prevented from being peeled off at the corner of the top of the end facet to improve the reflection factor of the reflection film and the finesse of the resonator and to improve the performance of the device (for example, refer to Patent Document 3).

Thus, members having same stiffness as the substrate for forming the optical waveguide from a top surface is provided in an upper part of the optical waveguide so as to make at least an end facet thereof form planes identical with the respective end facets of the substrate including respectively an optical incident end and an optical emission end of the optical waveguide, and an incident side reflection film and an emission side reflection film composing a resonating means are laid on the planes formed by polishing an end facet of the members and the end facet of the substrate, so the chips and the roundedness of the corner of the end facet of the optical waveguide are minimized in the polishing process and the reflection film is laid reliably and prevented from being peeled off at the corner of the top of the end facet to improve the reflection factor of the reflection film and the finesse of the resonator and to improve the performance of the device.

Patent Document 1: JP 2003-202609 A
Patent Document 2: JP 3891977 B
Patent Document 3: JP 4781648 B

SUMMARY OF THE INVENTION

Here, in a conventional waveguide type optical frequency comb generator 1020, an end facet of an optical waveguide 1202 is located at a corner of a top of the end facet, so there were problems that, when a single-layer or multi-layer deposition film is formed on the end facet as an optical thin film such as a reflection film by a deposition method, a sputtering method, a chemical vapor deposition method, or the like, at an outer periphery of the end facet of the substrate, film deposition particles will be moved to a side surface, and film deposition particles derived from a side surface direction will be moved to the end facet, so it is difficult to achieve a uniform film thickness at the outer periphery of the end facet of the substrate, and that it was very difficult to form a film thin enough to function as the reflection film or the like, and also with small film thickness distribution, on the end facet of the core located at the outer periphery of the end facet of the substrate.

Also, there were problems that, when polishing the end facet of the optical waveguide 1202, the corner of the end facet of the optical waveguide 1202 can easily be chipped in the polishing process, the corner of the end facet of the optical waveguide 1202 can be rounded in the polishing process, and the reflection film formed on the end facet of the optical waveguide 1202 can easily be peeled off at the corner of the top of the end facet.

These problems entail a reduced reflection factor of the reflection film laid on the end facet of the optical waveguide 1202, a reduced finesse of the resonator including the incident side reflection film 1204 and the emission side reflection film 1205, and a reduced performance level of the waveguide type optical frequency comb generator 1020 itself. Also, these problems depend on the environment of preparing the waveguide type optical frequency comb generator 1020, so it is difficult to secure the reproducibility of the waveguide type optical frequency comb generator 1020 and a waveguide type Fabry-Perot resonator realized by applying the former, and it has not been a cause for reducing the yield of manufacture of such devices.

Conventionally, in a waveguide type optical resonator for resonating a light confined in an optical waveguide, an optical waveguide for transmitting a polarized component including a mix of an orthogonal mode is used, and an optical output obtained when assembling an optical modulator and an optical frequency comb generator also includes a polarized component including a mix of an orthogonal mode.

In a conventional optical frequency comb generator, when it is used for measuring an optical frequency comb, a part of light emitted from an optical resonator is detected by an optical detector, in order to obtain a stable output, and a resonant length of the optical resonator was feedback controlled to be a predetermined resonant length, but the optical waveguide for transmitting a polarized component including a mix of an orthogonal mode was used, so as illustrated by a mark ○ in FIG. 4, a transmission mode waveform by orthogonal polarized components may be changed in shape. Also, places (relative position with respect to a main mode) where a transmission mode waveform by orthogonal polarized components is changed in shape are separated and minimum parts will be plural, so it will be a destabilizing factor when controlling a resonant length.

Thus, in an optical frequency comb generation in an optical comb generator using a waveguide type optical resonator for resonating a light confined in an optical waveguide, orthogonal polarized components may destabilize a control for matching a resonant frequency of an optical frequency comb generator with a laser frequency, so it will be a cause of a deviation of a control point, an oscillation of a control and else, and when using an optical frequency comb for example to a measuring device for measuring a height and a distance to an object to be measured, orthogonal polarized components have been a cause of measurement error.

As mentioned in the above, members having same stiffness as the substrate for forming the optical waveguide from a top surface is provided in an upper part of the optical waveguide so as to make at least an end facet thereof form planes identical with the respective end facets of the substrate including respectively an optical incident end and an optical emission end of the optical waveguide, and an incident side reflection film and an emission side reflection film composing a resonating means are laid on the planes formed by polishing an end facet of the members and the end facet of the substrate, so the chips and the roundedness of the corner of the end facet of the optical waveguide are minimized in the polishing process and the reflection film is laid reliably and prevented from being peeled off at the corner of the top of the end facet to improve the reflection factor of the reflection film and the finesse of the resonator and to improve the performance of the device. However, an epoxy-based or acrylic thermosetting type optical adhesive or photocuring type optical adhesive used for adhering and fixing a protection member on top of the optical waveguide may diffuse a gas component when heated even after curing, so there was a problem that a diffusion gas deteriorates an optical property of a deposition film as an amount of a diffusion gas is increased with a rise of a deposition temperature, when forming the incident side reflection film and the emission side reflection film as the deposition film.

Also, an optical adhesive itself will be deteriorated when a glass transition temperature is exceeded, so there was a problem that a change in shape and a reduced intensity of adhered part may affect a physical change in shape to the deposition film.

In view of the above-identified problems, it is therefore an object of the present invention to provide an optical resonator, an optical modulator, an optical frequency comb generator and an optical oscillator where the chips and the roundedness of the corner of the end facet of the optical waveguide are minimized in the polishing process and a single-layer or multi-layer deposition film is laid reliably and prevented from being peeled off at the corner of the top of the end facet as each reflection film to improve the reflection factor of the reflection films and the finesse of the resonator and to improve the performance of the device, as well as a method of preparing such an optical resonator and an optical modulator.

Also, other purpose of the present invention is to be able to stabilize a control of the resonator without changing a shape of a transmission mode waveform of the optical waveguide.

Also, other purpose of the present invention is to be able to obtain an optical frequency comb output with increased single polarization degree by improving a polarization extinction ratio, by inhibiting an output of orthogonal polarized components which do not contribute to an optical frequency comb generation.

Further, other purpose of the present invention is to be ale to stabilize as an optical frequency comb generator, and to reduce an error and improve an accuracy of a measuring device including an optical frequency comb.

Also, other purpose of the present invention is to provide an optical resonator, an optical modulator, an optical frequency comb generator and an optical oscillator where a single-layer or multi-layer deposition film is laid reliably and prevented from being peeled off at the corner of the top of the end facet as each reflection film, without an adverse effect such as a physical change in shape of the deposition film by a reduced intensity of an adhered part or a deterioration of an optical property of the deposition film by a diffusion gas caused by heating an optical adhesive for adhering and fixing a protection member for minimizing the chips and the roundedness of the corner of the end facet of the optical waveguide on top of the optical waveguide, to improve the reflection factor of the reflection films and the finesse of the resonator and to improve the performance of the device, as well as a method of preparing such an optical resonator and an optical modulator.

Other purpose of the present invention, and concrete advantages obtained by the present invention will be clearer from an explanation of embodiments explained in below.

The present invention is a method for preparing an optical resonator for propagating and resonating light incident via an incident side reflection film by an optical waveguide formed to penetrate from the incident side reflection film to an emission side reflection film, wherein the method comprises: an optical waveguide forming process for forming the optical waveguide from a top of a substrate; an arranging process for arranging protection members having same stiffness as the substrate on top of the optical waveguide such that at least one end facet of each of the protection members forms an identical plane with an end facet of the substrate including an optical incident end or an optical emission end in the optical waveguide; a polishing process for forming a plane perpendicular to the optical waveguide as a flat polished surface including the optical incident end or the optical emission end in the optical waveguide by polishing the end facet of the substrate and the end facet of one of the protection members arranged in the arranging process; and a reflection film laying process for laying a single-layer or multi-layer deposition film as the incident side reflection film or the emission side refection film on the plane formed in the polishing process, wherein, in the arranging process, the protection member is arranged on top of the optical waveguide by attaching by an adhesive, in the reflection film laying process, the incident side reflection film or the emission side reflection film is formed on a plane perpendicular to the optical waveguide, by laying the single-layer or multi-layer deposition film all over the plane formed by the end facet of the substrate and the end facet of one of the protection members attached by the adhesive.

In the method for preparing the optical resonator relating to the present invention, in the reflection film laying process, the single-layer or multi-layer deposition film is laid all over the plane formed by the end facet of the substrate and the end facet of one of the protection members attached by the adhesive, in a temperature condition lower than a heat-resistant temperature of the adhesive.

The present invention is a method for preparing an optical modulator for propagating and modulating light incident via an incident side reflection film by an optical waveguide in which the incident side reflection film and an emission side reflection film are formed, wherein the method comprises: an optical waveguide forming process for forming the optical waveguide from a top of a substrate; a laminating process for laminating a buffer layer on the substrate to cover the optical waveguide at least formed in the optical waveguide forming process; an electrode forming process for forming an electrode for applying an electric field to the optical waveguide on the buffer layer laminated in the laminating process; an arranging process for arranging protection members having same stiffness as the substrate on top of the optical waveguide such that at least one end facet of each of the protection members forms an identical plane with an end facet of the substrate including an optical incident end or an optical emission end in the optical waveguide; a polishing process for forming a plane perpendicular to the optical waveguide as a flat polished surface including the optical incident end or the optical emission end in the optical waveguide by polishing the end facet of the substrate and the end facet of one of the protection members arranged in the arranging process; and a reflection film laying process for laying a single-layer or multi-layer deposition film as the incident side reflection film or the emission side refection film on the plane formed in the polishing process, wherein, in the arranging process, the protection members are arranged on top of the optical waveguide by attaching by an adhesive, in the reflection film laying process, the incident side reflection film or the emission side reflection film is formed on a plane perpendicular to the optical waveguide, by laying the single-layer or multi-layer deposition film all over the plane formed by the end facet of the substrate and the end facet of one of the protection members attached by the adhesive.

In the method for preparing the optical modulator relating to the present invention, in the reflection film laying process, the single-layer or multi-layer deposition film is laid all over the plane formed by the end facet of the substrate and the end facet of one of the protection members attached by the adhesive, in a temperature condition lower than a heat-resistant temperature of the adhesive.

Also, in the method for preparing the optical modulator relating to the present invention, in the optical waveguide forming process, the optical waveguide is formed as a region in which a waveguide mode exists only with respect to a single polarized component by a proton exchange from a top of the substrate having at least an electrooptic effect.

Further, in the method for preparing the optical modulator relating to the present invention, the method further comprises a ridge structure forming process for forming a ridge structure to the substrate, wherein in the electrode forming process, an electrode having a ridge structure is formed as the electrode for applying an electric field to the optical waveguide on the buffer layer laminated in the laminating process on the substrate in which the ridge structure is formed.

The present invention is an optical resonator comprising: a resonating means composed of an incident side reflection film and an emission side reflection film for resonating light incident via the incident side reflection film; an optical waveguide formed to penetrate from the incident side reflection film to the emission side reflection film for propagating light resonated by the resonating means; a substrate to which the optical waveguide is formed from a top surface thereof; and an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a single-layer or multi-layer deposition film laid on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

In the optical resonator relating to the present invention, the end facet protecting means is arranged such that the optical incident end or the optical emission end in the optical waveguide is positioned at an approximate center of the plane formed by the end facet of the substrate and the end facet of one of the protection members, and the incident side reflection film and the emission side reflection film may be respectively a single-layer or multi-layer deposition film laid all over the plane formed by the end facet of the substrate and the end facet of one of the protection members attached by the adhesive in a temperature condition lower than a heat-resistant temperature of the adhesive.

Further, in the optical resonator relating to the present invention, the protection members composing the end facet protecting means are made from a material same as the substrate, and the end facet of the substrate and the end facet of one of the protection members forming the plane are having an identical crystal orientation mutually, the end facet protecting means may be arranged on the optical waveguide such that one end facet of one of the protection members forms an identical plane with the end facet of the substrate including the optical incident end in the optical waveguide, and such that one end facet of other of the protection members forms an identical plane with the end facet of the substrate including the optical emission end in the optical waveguide.

The present invention is an optical modulator comprising: an oscillating means for oscillating a modulation signal of a predetermined frequency; a resonating means composed of an incident side reflection film and an emission side reflection film for resonating light incident via the incident side reflection film; an optical waveguide formed to penetrate from the incident side reflection film to the emission side reflection film for modulating a phase of light resonated by the resonating means according to the modulation signal supplied from the oscillating means; a substrate to which the optical waveguide is formed from a top surface thereof; and an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a single-layer or multi-layer deposition film laid on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

In the optical modulator relating to the present invention, the end facet protecting means is arranged such that the optical incident end or the optical emission end in the optical waveguide is positioned at an approximate center of the plane formed by the end facet of the substrate and the end facet of one of the protection members, and the incident side reflection film and the emission side reflection film may be respectively a single-layer or multi-layer deposition film laid all over the plane formed by the end facet of the substrate and the end facet of one of the protection members attached by the adhesive in a temperature condition lower than a heat-resistant temperature of the adhesive.

In addition, the present invention is an optical modulator comprising: a resonating means composed of an incident side reflection film and an emission side reflection film for resonating light incident via the incident side reflection film; an optical waveguide formed to penetrate from the incident side reflection film to the emission side reflection film; a substrate to which the optical waveguide is formed from a top surface thereof; an optical modulation means composed of an electrode formed on the substrate for propagating a modulation signal to a forward direction or a backward direction for modulating a phase of light propagated in the optical waveguide according to a wavelength of an electric signal supplied to the electrode; and an end facet protecting means composed of protection members having same stiffness as the substrate and the protection members are arranged and attached on the optical waveguide by an adhesive such that at least one end facet of each of the protection member forms an identical plane with an end facet of the substrate including an optical incident end or an optical emission end in the optical waveguide, wherein the incident side reflection film and the emission side reflection film are respectively a single-layer or multi-layer deposition film laid on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

In the optical modulator relating to the present invention, the end facet protecting means is arranged such that the optical incident end or the optical emission end in the optical waveguide is positioned at an approximate center of the plane formed by the end facet of the substrate and the end facet of one of the protection members, and the incident side reflection film and the emission side reflection film may be respectively a single-layer or multi-layer deposition film laid all over the plane formed by the end facet of the substrate and the end facet of one of the protection members attached by the adhesive in a temperature condition lower than a heat-resistant temperature of the adhesive.

In addition, in the optical modulator relating to the present invention, the optical waveguide may be formed on the substrate having at least an electrooptic effect as a region in which a waveguide mode exists only with respect to a single polarized component. Further, in the optical modulator relating to the present invention, the electrode of the optical modulator may have a ridge structure.

The present invention is an optical frequency comb generator comprising: an oscillating means for oscillating a modulation signal of a predetermined frequency; a resonating means composed of an incident side reflection film and an emission side reflection film for resonating light incident via the incident side reflection film; an optical waveguide formed to penetrate from the incident side reflection film to the emission side reflection film for modulating a phase of light resonated by the resonating means according to the modulation signal supplied from the oscillating means and for generating side bands with a frequency of incident light as a center at frequency intervals of the modulation signal; a substrate to which the optical waveguide is formed from a top surface thereof; an optical modulation means composed of an electrode formed on the substrate for propagating the modulation signal to a forward direction or a backward direction for modulating a phase of light propagated in the optical waveguide according to a wavelength of an electric signal supplied to the electrode; and an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a single-layer or multi-layer deposition film laid on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

In the optical frequency comb generator relating to the present invention, the end facet protecting means is arranged such that the optical incident end or the optical emission end in the optical waveguide is positioned at an approximate center of the plane formed by the end facet of the substrate and the end facet of one of the protection members, and the incident side reflection film and the emission side reflection film may be respectively a single-layer or multi-layer deposition film laid all over the plane formed by the end facet of the substrate and the end facet of one of the protection members attached by the adhesive in a temperature condition lower than a heat-resistant temperature of the adhesive.

Further, in the optical frequency comb generator relating to the present invention, further comprising a reflection mirror for reflecting light transmitted to outside via the incident side refection film among light resonated by the resonating means.

The present invention is an optical oscillator comprising: a resonating means composed of an incident side reflection film and an emission side reflection film for resonating light incident via the incident side reflection film or light generated by a laser amplification; an optical waveguide formed to penetrate from the incident side reflection film to the emission side reflection film for amplifying light resonated by the resonating means and for emitting amplified light to outside via the emission side reflection film; a substrate to which the optical waveguide is formed from a top surface thereof; an optical modulation means composed of an electrode formed on the substrate for propagating a modulation signal to a forward direction or a backward direction for modulating a phase of light propagated in the optical waveguide according to a wavelength of an electric signal supplied to the electrode; and an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a single-layer or multi-layer deposition film laid on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

In the optical oscillator relating to the present invention, the end facet protecting means is arranged such that the optical incident end or the optical emission end in the optical waveguide is positioned at an approximate center of the plane formed by the end facet of the substrate and the end facet of one of the protection members, and the incident side reflection film and the emission side reflection film may be respectively a single-layer or multi-layer deposition film laid all over the plane formed by the end facet of the substrate and the end facet of one of the protection members attached by the adhesive in a temperature condition lower than a heat-resistant temperature of the adhesive.

In addition, in the optical oscillator relating to the present invention, a medium having an amplifying property with respect to a wavelength of light inherent to the medium by absorbing light incident via the incident side reflection film is diffused in the optical waveguide.

Further, in the optical oscillator relating to the present invention, the optical waveguide may be composed of a nonlinear optical crystal.

The present invention is an optical oscillator comprising: an oscillating means for oscillating a modulation signal of a predetermined frequency; a resonating means composed of an incident side reflection film and an emission side reflection film for resonating light incident via the incident side reflection film or light generated by a laser amplification; an optical waveguide formed to penetrate from the incident side reflection film to the emission side reflection film for amplifying light resonated by the resonating means according to the modulation signal supplied from the oscillating means and for emitting amplified light to outside via the emission side reflection film; a substrate to which the optical waveguide is formed from a top surface thereof; an optical modulation means composed of an electrode formed on the substrate for propagating the modulation signal to a forward direction or a backward direction for modulating a phase of light propagated in the optical waveguide according to a wavelength of an electric signal supplied to the electrode; and an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a single-layer or multi-layer deposition film laid on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive, and synchronize phases between multi-modes for oscillating laser.

In the optical oscillator relating to the present invention, the end facet protecting means is arranged such that the optical incident end or the optical emission end in the optical waveguide is positioned at an approximate center of the plane formed by the end facet of the substrate and the end facet of one of the protection members, and the incident side reflection film and the emission side reflection film may be respectively a single-layer or multi-layer deposition film laid all over the plane formed by the end facet of the substrate and the end facet of one of the protection members attached by the adhesive in a temperature condition lower than a heat-resistant temperature of the adhesive.

In the present invention, protection members having same stiffness as a substrate for forming an optical waveguide from a top surface thereof are arranged and attached on the optical waveguide by an adhesive such that at least one end facet of each of the protection members forms an identical plane with an end facet of the substrate including an optical incident end or an optical emission end in the optical waveguide, single-layer or multi-layer deposition films are respectively laid all over the plane formed by the end facet of the substrate and the end facet of one of the protection members as an incident side reflection film and an emission side reflection film composing a resonating means on planes perpendicular to the optical waveguide formed as flat polished surfaces including the optical incident end or the optical emission end of the optical waveguide, so chips and roundedness when processing a corner of an end facet of the optical waveguide are minimized, the reflection films are laid reliably and prevented from being peeled off at the corner of the top of the end facets, the reflection factor of the reflection films and the finesse of the resonator are improved, and the performance of the device itself is improved. By laying single-layer or multi-layer deposition films respectively all over the plane formed by the end facet of the substrate and the end facet of one of the protection members attached by the adhesive in a temperature condition lower than a heat-resistant temperature of the adhesive, single-layer or multi-layer deposition films are laid reliably as each reflection film and prevented from being peeled off at the corner of the top of the end facets, without a bad influence such as a deterioration of an optical property of deposition films by a diffusion gas generated by heating the adhesive or a physical change in shape of the deposition films by a reduced intensity of adhered part.

In addition, the present invention comprises an optical waveguide formed as a region in which a waveguide mode exists only with respect to a single polarized component on the substrate having at least an electrooptic effect such as to penetrate from an incident end to an emission end, so only the single polarized component of light incident via an incident side reflection film is propagated at the optical waveguide, and phase modulated and emitted from the emission end. By having the incident side reflection film and an emission side reflection film composing a resonating means, an optical comb is generated as an optical modulation output of the single polarized component only via the emission side reflection film.

In addition, in the present invention, by comprising an optical modulation means for modulating a phase of light propagated in the optical waveguide according to a modulation signal supplied to an electrode formed on the optical waveguide formed on the substrate at least having an electrooptic effect and having a ridge structure for propagating the modulation signal to a forward direction or a backward direction, an electric power of a microwave used as the modulation signal necessary for driving is reduced.

In other words, according to the present invention, an optical modulator and an optical comb generator capable of achieving low power driving, energy saving, low heat generation, miniaturization and light weight, improvement of reliability, and low cost, is provided by using an optical waveguide having an electrode with a ridge structure, and also, by having single-layer or multi-layer deposition films as an optical incident end facet and an optical emission end facet formed on planes perpendicular to the optical waveguide by minimizing chips and roundedness when processing a corner of an end facet of the optical waveguide, by polishing the end facet of the substrate and the end facet of the protection member having same stiffness as the substrate for forming the optical waveguide.

BRIEF DESCRIPTION OF THE DRAWINGS

FIG. 21A, FIG. 21B, FIG. 21C, FIG. 21D, FIG. 21E, and FIG. 21F are sectional views of main part in each process for explaining about a method for manufacturing the optical modulator according to the present invention.

FIG. 26A, FIG. 26B, FIG. 26C, FIG. 26D, FIG. 26E, FIG. 26F and FIG. 26G are sectional views of main part in each process for explaining about a method for manufacturing the optical modulator (optical comb generator).

DETAILED DESCRIPTION OF THE INVENTION

Figure 1:
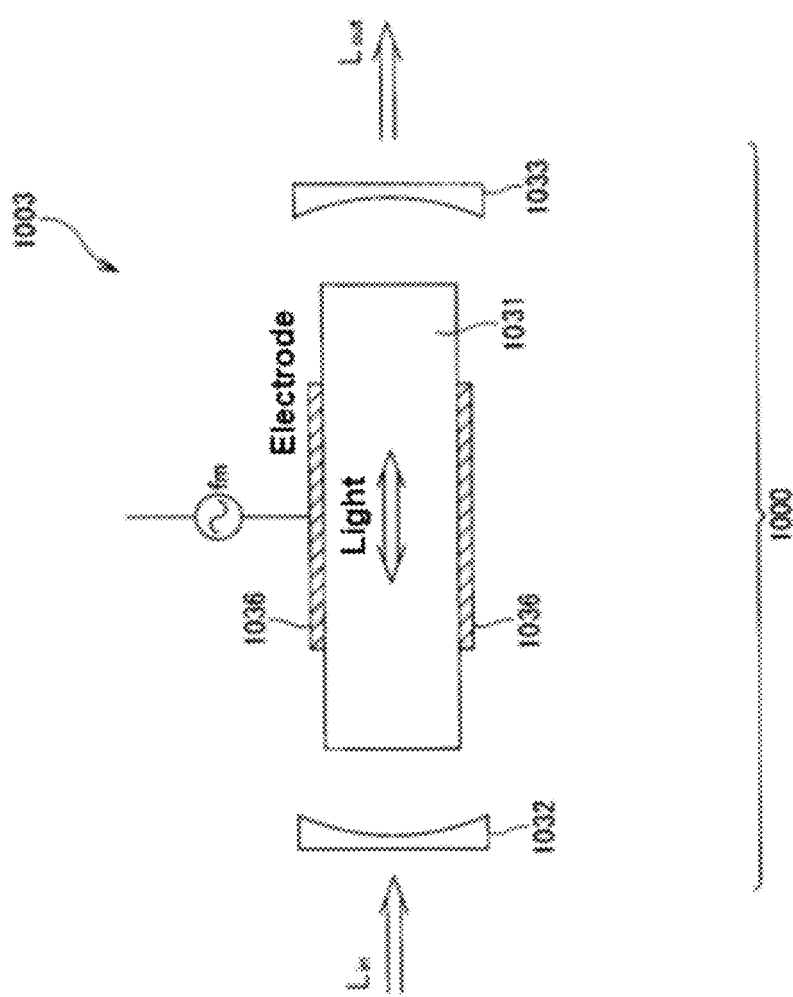
FIG. 1 is a view illustrating a principle of structure of a known optical frequency comb generator.
Figure 2:
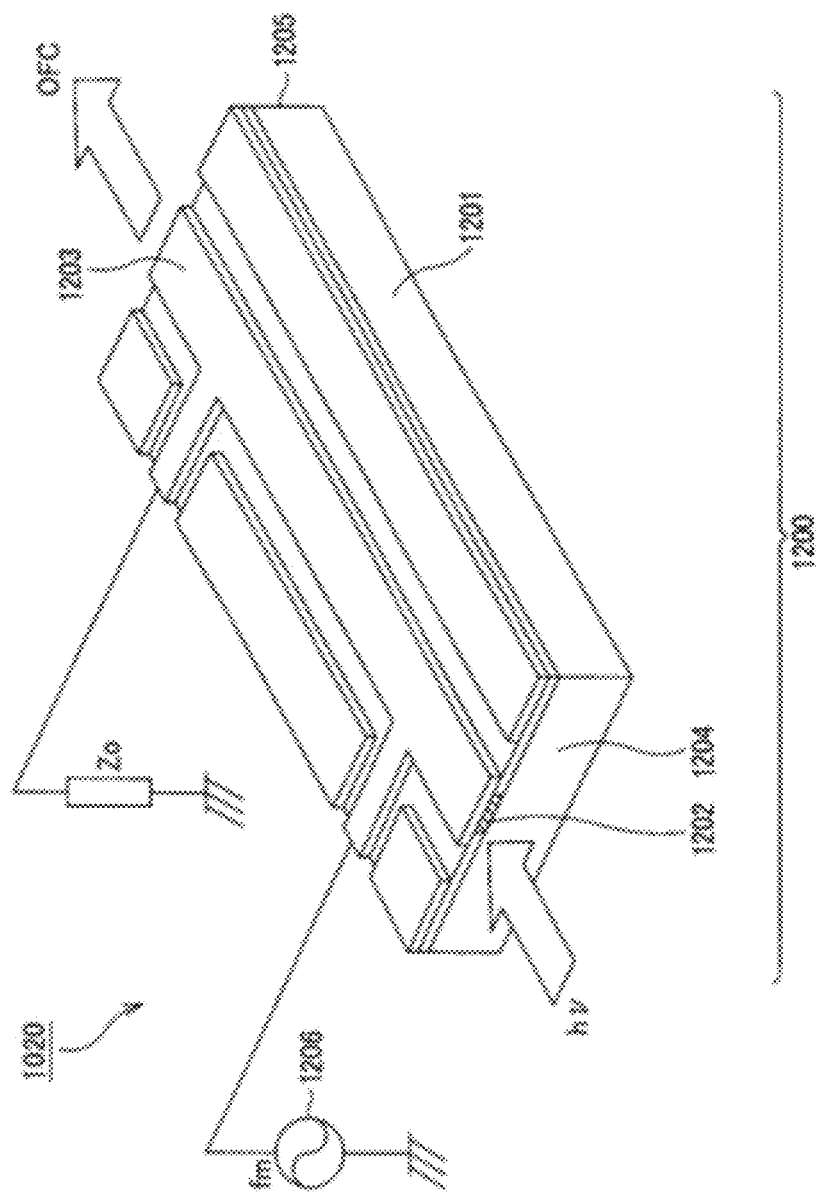
FIG. 2 is a view illustrating a principle of structure of a known waveguide type optical frequency comb generator.
Figure 3:
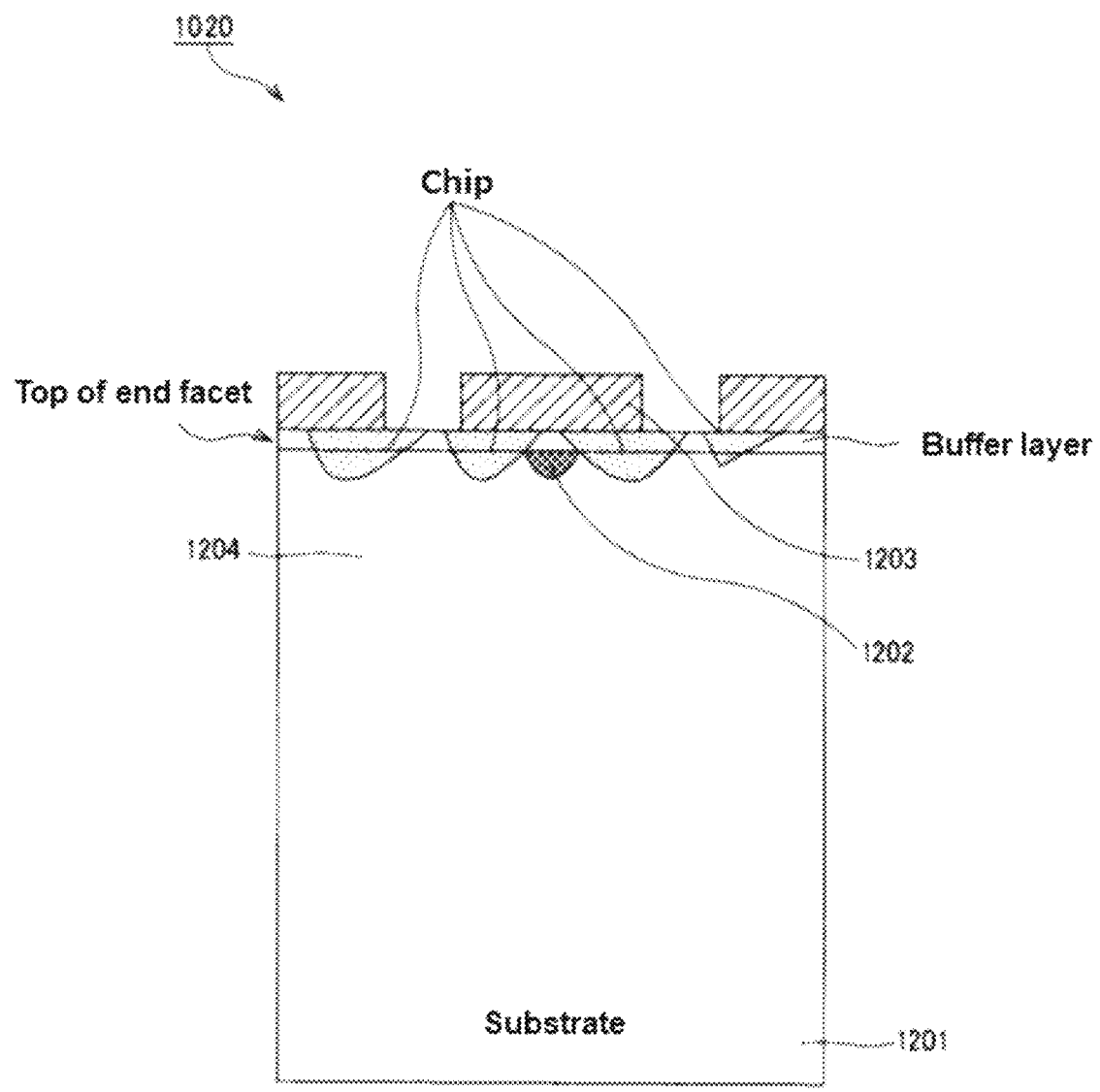
FIG. 3 is a view illustrating an end facet of a known waveguide type optical frequency comb generator where an incident side reflection film is formed

Hereinafter, explaining in detail about preferred embodiments of the present invention, with reference to the drawings. In addition, about common components, it is explained by giving common reference number in the drawings. Also, the present invention should not be limited to the following examples, it goes without saying that it can be changed optionally within a scope not deviating from a gist of the present invention.

Figure 5:
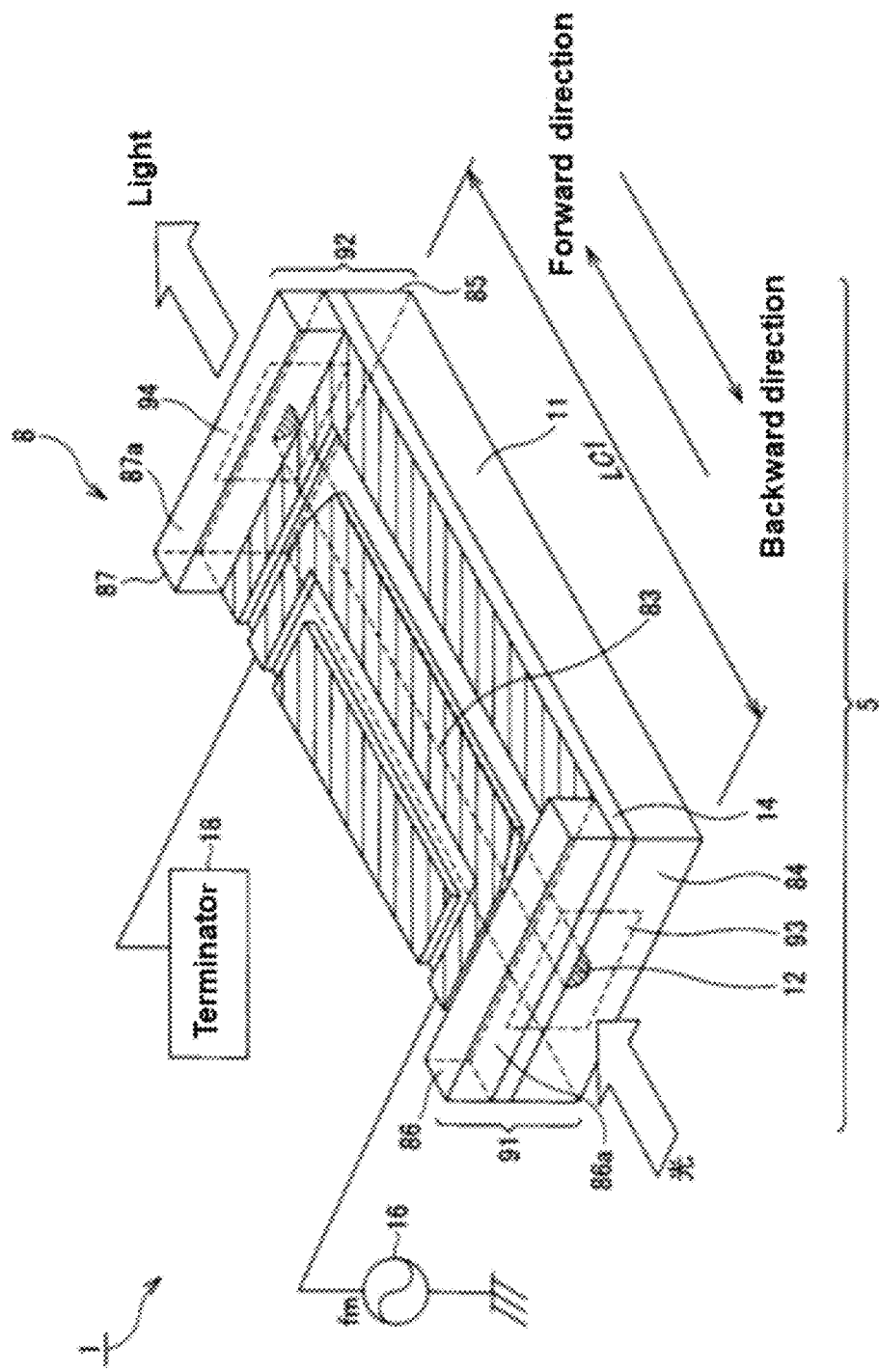
FIG. 5 is a view illustrating a configuration of an optical modulator according to the present invention.
Figure 6:
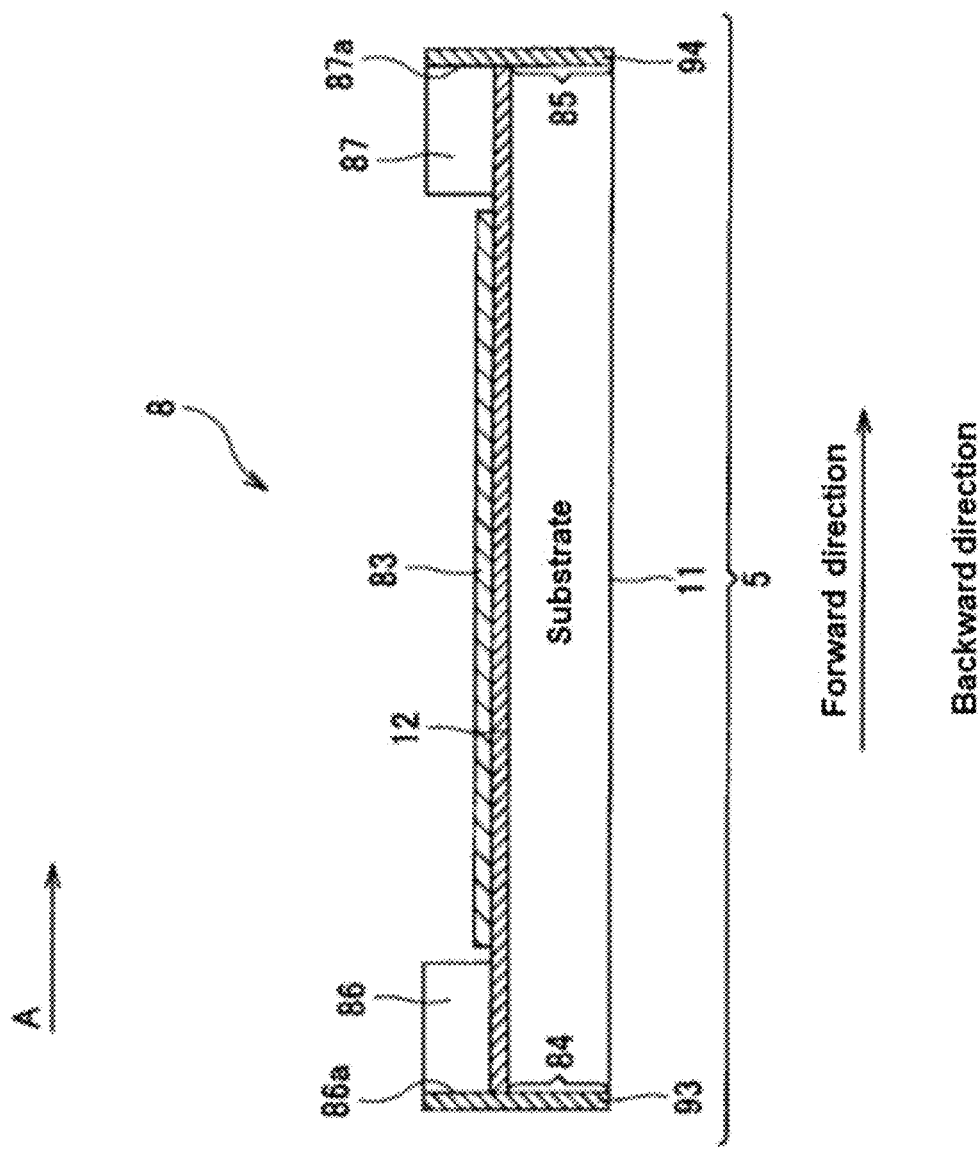
FIG. 6 is a side view of an optical modulator according to the present invention.

FIGS. 5 and 6 schematically illustrate an optical modulator 8 according to the present invention. The optical modulator 8 includes a substrate 11, an optical waveguide 12 formed on the substrate 11 to modulate the phase of propagating light, a buffer layer 14 laid on the substrate 11 so as to cover the optical waveguide 12, an electrode 83 formed on the top surface of the optical waveguide 12 in such a way that the direction of the modulation electric field is substantially perpendicular to the direction of propagation of light, a first end facet 84 and a second end facet 85 arranged opposite to each other with the optical waveguide 12 interposed between them, a first protection member 86 arranged at an upper part of the optical waveguide 12 so as to form an identical plane with the first end facet 84, a second protection member 87 formed at an upper part of the optical waveguide 12 so as to form an identical plane with the second end facet 85, an incident side reflection film 93 laid on the plane 91 formed between the first end facet 84 and an end facet 86a of the first protection member 86, an emission side reflection film 94 laid on the plane 92 formed between the second end facet 85 and an end facet 87a of the second protection member 87, an oscillator arranged at the side of one of the opposite ends of the electrode 83 to oscillate a modulation signal of frequency $f_m$ and a terminator 18 arranged at the side of the other end of the electrode 83.

The substrate 11 is typically formed by cutting a large crystal of $LiNbO_3$ or GaAs with a diameter of 3 to 4 inches grown by a pulling method into a wafer. The surface of the substrate 11 produced by cutting is then subjected to a mechanical polishing process and/or a chemical polishing process.

The optical waveguide 12 is formed so as to run through from the incident side reflection film 93 to the emission side reflection film 94 and adapted to propagate resonated light. The refractive index of the layer of the optical waveguide 12 is set to be higher than that of any other layer such as the substrate 1. Light that enters the optical waveguide 12 is propagated through the optical waveguide 12 as it is totally reflected by the interface thereof. Generally, the optical waveguide 12 can be prepared by diffusing Ti atoms in the substrate 11 or by growing Ti atoms on the substrate 11 under epitaxial growth.

Note that an $LiNbO_3$ crystal optical waveguide may be used as the optical waveguide 12. An $LiNbO_3$ crystal optical waveguide can be formed by diffusing Ti atoms on the surface of a substrate 11 mainly made of $LiNbO_3$. As Ti is thermally diffused in the substrate 201 of $LiNbO_3$, light can be confined to the region where Ti is diffused as the region shows a refractive index higher than that of any other region. Thus, it is possible to prepare an optical waveguide 12 that can propagate light. An $LiNbO_3$ crystal type optical waveguide 12 prepared by the above-described method provides electrooptic effects such as Pockels effect that the refractive index changes in proportion to the intensity of electric field and the Kerr effect that the refractive index changes in proportion to the square of the intensity of the electric field so that it is possible to modulate light, utilizing such physical phenomena.

The buffer layer 14 covers the optical waveguide 12 to suppress the propagation loss of light in the optical waveguide 12. Note that, the electric field intensity falls to reduce the modulation effect when the buffer layer 14 has a too large film thickness. Therefore, it is preferable to select a small film thickness within a range that does not significantly raise the light propagation loss.

The electrode 83 is made of a metal material such as Ti, Pt or Au and adapted to modulate the phase of light propagating through the optical waveguide 12 by driving and inputting the modulation signal of frequency $f_m$ supplied from the oscillator 16 into the optical waveguide 12.

Each of the first protection member 86 and the second protection member 87 is formed by a member corresponding to the material of the substrate 11. The first protection member 86 and the second protection member 87 may be made of a material same as that of the substrate 11. The end facet 86a of the first protection member 86 and the first end facet 84 that form the plane 91 may be processed so as to have the same crystal orientation relative to each other. Similarly, the end facet 87a of the second protection member 87 and the second end facet 85 that form the plane 92 may be processed so as to have the same crystal orientation relative to each other.

The incident side reflection film 93 and the emission side reflection film 94 are arranged in parallel with each other in order to resonate light that enters the optical waveguide 12 and form the optical resonator 5 for resonating light by reciprocatingly reflecting light passing through the optical waveguide 12.

The incident side reflection film 93 receives light of frequency $v_1$ from the light source. The incident side reflection film 93 reflects light that is reflected by the emission side reflection film 94 and passed through the optical waveguide 12. The emission side reflection film 94 reflects light that is passed through the optical waveguide 12. It also emits light that is passed through the optical waveguide 12 to the outside at a predetermined ratio.

The incident side reflection film 93 and/or the emission side reflection film 94 may be formed entirely along the planes 91 and 92 respectively, although they may alternatively be formed to minimally cover the respective ends of the optical waveguide 12.

The terminator 18 is a resistor fitted to the terminal of the electrode 83 and adapted to prevent the waveform of the electric signal from being disturbed by preventing the electric signal from being reflected at the terminal.

Figure 7:
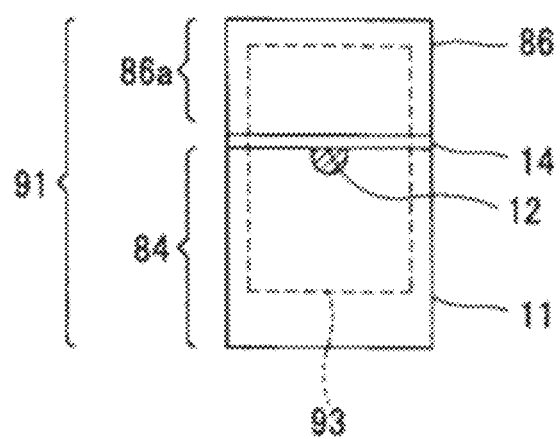
FIG. 7 is a view illustrating a plane on which an incident side reflection film is formed in an optical modulator according to the present invention.

FIG. 7 schematically illustrates the plane 91 where the incident side reflection film 93 is formed as viewed in the direction A in FIG. 6.

An identical plane 91 is formed by the first end facet 84 of the optical waveguide 12 that includes the light entering end of the optical waveguide 12 and the end facet 86a of the protection member 86. The plane 91 that is formed in this way is inclined by an angle of not greater than 0.05 degrees. The loss of light that arises when light having a beam diameter of $1/e^2$ is reflected by an end facet inclined by 0.05 degrees relative to the plane 91 with the angle of inclination of 0.05 degrees is computationally determined to be $4*10^{-4}$, which is small and negligible if compared with the reflection factor of the incident side reflection film 93.

As the first end facet 91 and the second end facet 92 are formed substantially perpendicular relative to the optical waveguide 12, it is possible to resonate light efficiently by means of the incident side reflection film 93 and the emission side reflection film 94 that are laid respectively on them as a single-layer or multi-layer deposition film.

With the optical modulator 8 having the above-described configuration, light that is made to enter it from the outside via the incident side reflection film 93 is propagated in the forward direction in the optical waveguide 12 and reflected by the emission side reflection film 94, while it is partly transmitted to the outside. Light reflected by the emission side reflection film 94 is propagated in the backward direction in the optical waveguide 12 and reflected by the incident side reflection film 93. As such reflections are repeated, light resonates in the optical waveguide 12.

Additionally, it is possible to modulate the phase of light deeper by tens of several times than ever by using an electric signal that is synchronized with the time necessary for light to make a round trip in the optical waveguide 12 and driving it to enter from the electrode 83 if compared with light that is made to pass through the optical modulator 8 only once. With this arrangement, it is also possible to generate several hundreds of sidebands over a broad range with the center thereof at the frequency $v_1$ of incident light. Note that all the frequency intervals of adjacent sidebands are equal to the frequency $f_m$ of the input electric signal. Therefore, the optical modulator 8 can also be used as an optical frequency comb generator adapted to use a large number of sidebands.

Now, the method of preparing an optical modulator 8 according to the present invention will be described below by referring to FIG. 8.

Figure 8A:
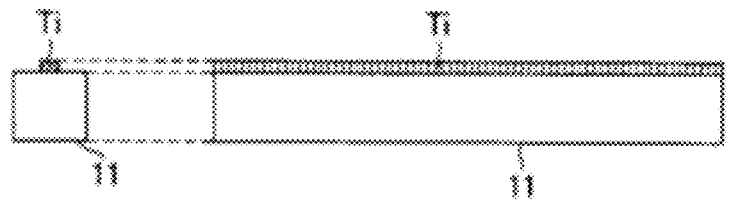
FIG. 8A, FIG. 8B, FIG. 8C, FIG. 8D, FIG. 8E, and FIG. 8F are sectional views of main part in each process for explaining about a method for manufacturing an optical modulator according to the present invention.

Firstly, in Step S11, a photoresist pattern is formed on the surface of a substrate 11 made of $LiNbO_3$ crystal and Ti is deposited by evaporation thereon as shown in FIG. 8A. Then, the photoresist is removed to produce Ti micro-wires having a width of microns.

Figure 8B:
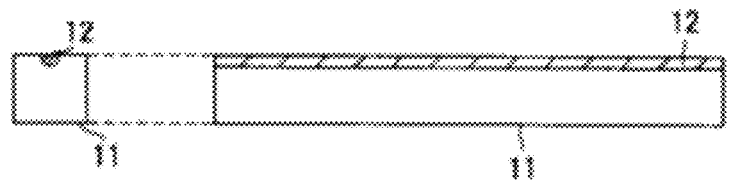

Then, in Step S12, as shown in FIG. 8B, Ti atoms are thermally diffused in the substrate 11 to form an optical waveguide 12 by heating the substrate 11 where Ti micro-wires are formed.

Figure 8C:
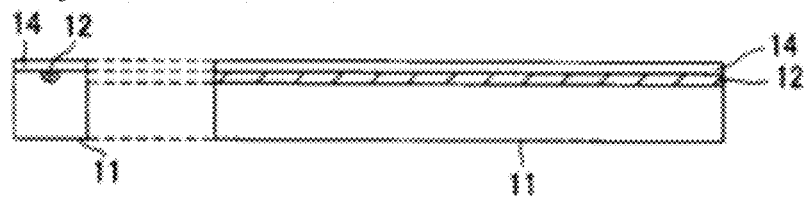

Then, in Step S13, an $SiO_2$ thin film is formed as buffer layer 14 on the surface of the substrate 11 by deposition as shown in FIG. 8C. Alternatively, in Step S13, a buffer layer 14 may be formed by applying an $SiO_2$ wafer to the surface of the substrate 11. If such is the case, the film thickness may be controlled by polishing the deposited buffer layer 14, considering the region for arranging an electrode in Step S14, which will be described hereinafter.

Figure 8D:
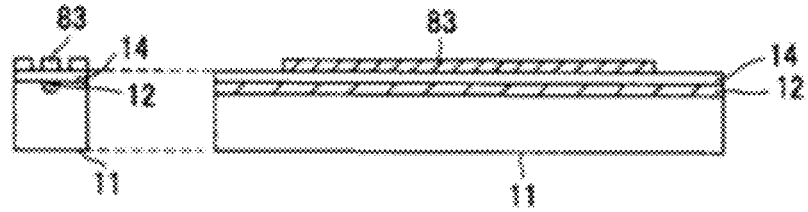
Figure 8E:
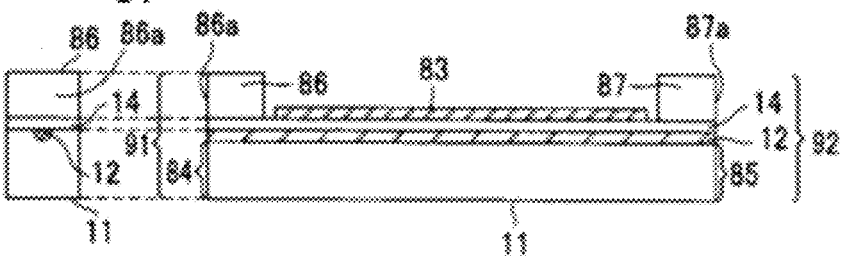

Then, in Step S14, an electrode 83 is formed on the buffer layer 14 as shown in FIG. 8D. Then, in Step S15, protection members 86, 87 are bonded to an upper part of the optical waveguide 12 as shown in FIG. 8E. The protection members 86, 87 may be bonded by means of an adhesive agent or by means of some other direct bonding method. When the substrate 11 is made of LiNbO₃ crystal, the protection members 86, 87 may also be made of the same material as LiNbO₃. In Step S15, the applied protection members 86, 87 are cut so as to make their end facets 86a, 87a form planes 91, 92 with the first end facet 84 and the second end facet 85 of the substrate 11 respectively.

As the adhesive agent used when adhering the protection members 86, 87 on top of the optical waveguide, for example epoxy or acrylic thermosetting optical adhesive or photosetting optical adhesive is used.

Figure 8F:
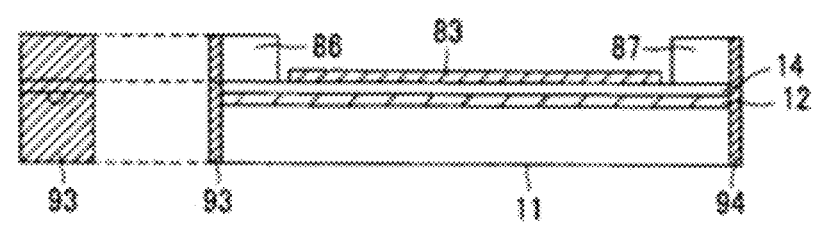

Then, in the last step of Step S16, the obtained planes 91, 92 are polished to planes perpendicular to the optical waveguide 12 as shown in FIG. 8F. Then, an incident side reflection film 93 and an emission side reflection film 94 are formed respectively on the entire polished planes 91, 92 perpendicular to the optical waveguide 12.

Here, the incident side reflection film 93 and the emission side reflection film 94 are deposit and formed on the planes 91, 12 as single-layer or multi-layer deposition films by a vapor deposition, a sputtering, a chemical vapor deposition, or the like.

When forming the incident side reflection film 93 and the emission side reflection film 94 as deposition films, a deposition process is performed in a temperature condition lower than a heat-resistant temperature, for example a glass transition temperature, of an optical adhesive used for adhering the protection members 86, 87 on top of the optical waveguide 12.

Since protection members 86, 87 are bonded to the respective ends of the optical modulator 8 according to the present invention, the end facets of the optical waveguide 12 that are conventionally located at the top corners of the end facets of the optical modulator 8 are now located substantially at the centers of the planes 91, 92, as shown in FIG. 7. Then, as a result, if the corner of either of the planes 91, 92 is chipped in the polishing operation in Step S16, the corresponding end facet of the optical waveguide 12 is not chipped. In other words, the end facets of the optical waveguide 12 can hardly be chipped. Thus, it is possible to minimize the loss of light from either of the end facets of the optical waveguide 12.

As the protection member 86, 87 are made of an appropriate material that correspond to the material of the substrate 11, the first end facet 84 of the substrate 11 through the end facet 86a and the second end facet 85 of the substrate 11 through the end facet 87a can be polished at a uniform polishing rate in Step S16. Then, the end facets of the optical waveguide 12 are no longer rounded in the polishing step, and the planes 91, 92 perpendicular to the optical waveguide 12 composed of very flat polished planes can be obtained. Thus, it is possible to minimize the reflection loss at the end facets of the optical waveguide 12. The reflection loss can be further reduced by making the end facets of each of the planes 91, 92 have the same crystal orientation.

Further, by arranging the protection members 86, 87 purposely, the accuracy of the polishing process in Step S16 is improved and the perpendicularity of the obtained plane 91 (92) relative to the optical waveguide 12 is also improved. Thus, it is possible to minimize the loss of light from the loss of the perpendicularity.

As a result of arranging the protection members 86, 87, it is possible to minimize the fluctuations in the film thickness of the incident side reflection film 93 and the emission side reflection film 94 firmly laid as single-layer or multi-layer deposition films, caused by film-forming particles moving from the respective planes 91, 92 to other lateral surfaces or by film-forming particles coming from lateral direction moving to end facets. Then, it is possible to optimize the film thickness at and near the end facets of the optical waveguide 12, which is vital for securing the necessary reflection factor. In other words, the reflection factor can be improved than ever.

Since the incident side reflection film 93 and the emission side reflection film 94 are formed over large areas respectively extending from the first end facet 84 and the second end facet 85 of the substrate 11 to the end facets 86a, 87a, they are very stable and hardly peeled off. Additionally, the present invention provides an enhanced degree of reproducibility in terms of film forming.

In an experiment for examining the effect of arranging the protection members 86, 87 according to the present invention, the planes 91, 92 where the protection members 86, 87 are bonded were polished to find that neither chip nor bend takes place at the end facets of the optical waveguide 12 and the optical polishing operation was performed to make planes 91, 92 very flat and suitable for laying the incident side reflection film 93 and the emission side reflection film 94 composed of single-layer or multi-layer deposition films.

Particularly, when the first protection member 86 and the second protection member 87 are made of a material same as the substrate 11 and the end facets 86a, 87a of the protection members 86, 87 and the first and second end facets 84, 85 that form the planes 91, 92 are processed to show the same crystal orientation, they show the same crystal hardness so that the planes 91, 92 would not become inclined due to a difference in polishing rates.

Thus, as the protection members 86, 87 are bonded to the ends of the optical modulator 8 according to the present invention, the end facets of the optical waveguide 12 are moved substantially to the centers of the respective planes 91, 92. With this arrangement, the present invention provides the following advantages. The end facets of the optical waveguide 12 are free from chips and roundedness. The optical waveguide 12 is held perpendicular to the planes 91, 92. The accuracy of polishing the planes 91, 92 is improved. The incident side reflection film 93 and the emission side reflection film 94 are prevented from being peeled off and moving round. The reflection factors of the incident side reflection film 93 and the emission side reflection film 94 are improved. The designed reflection characteristics are realized. The performances of the reflection films are reproducible. Then, as a result, it is possible to improve the finesse of the optical resonator 5 having the incident side reflection film 93 and the emission side reflection film 94 and manufacture optical modulators and an optical frequency comb generators that show excellent performances with an enhanced degree of reproducibility and a high yield.

In an experiment, optical modulators 8 having the above-described configuration were prepared by laying reflection films 93, 94 showing a reflection factor of 97% respectively as single-layer or multi-layer deposition films on the polished planes 91, 92. As a result, it was possible to achieve a degree of finesse of 61 when the crystal length of the optical waveguide 12 was made equal to 27.4 mm (to be referred to as short resonator hereinafter). Similarly, it was possible to achieve a degree of finesse of 38 when the crystal length of the optical waveguide 12 was made equal to 54.7 mm (to be referred to as long resonator hereinafter). In view of the fact that the degree of finesse of conventional waveguide type optical resonators is maximally 30 (IEEE Photonics Technology Letters, Vol. 8, No. 10, 1996), it will be appreciated that an optical modulator 8 according to the present invention, where the accuracy of polishing the end facets and that of coating are improved, can dramatically improve the finesse. Particularly, all the six prepared sample optical modulators 8 achieved a degree of finesse above 30 to prove that the reproducibility of the manufacturing process is high.

In other words, the protection members 86, 87 having same stiffness as the substrate 11 for forming the optical waveguide 12 from a top of the substrate 11 are arranged and adhered on top of the optical waveguide 12 by an optical adhesive such that at least one of end facets forms identical plane 91, 92 with end facets of the substrate including an optical incident end and an optical emission end, and the planes 91, 92 perpendicular to the optical waveguide 12 are formed as flat polished surfaces including the optical incident end and the optical emission end of the optical waveguide 12, by polishing the end facets of the protection members 86, 87 and the end facets of the substrate 11. In addition, by depositing reflections films as single-layer or multi-layer deposition films over the plane formed by the end facets of the substrate 11 and the end facets of the protection members 86, 87 attached by the adhesive in a temperature condition lower than a heat-resistant temperature of the adhesive, single-layer or multi-layer deposition films are laid reliably as each of reflection films 93, 94 and prevented from being peeled off at the corner of the top of the end facets, without a bad influence such as a deterioration of an optical property of the deposition films by a diffusion gas generated by heating the adhesive or a physical change in shape of the deposition films by a reduced intensity of adhered part. In this way, chips and roundedness when processing a corner of an end facet of the optical waveguide 12 are minimized, the reflection films 93, 94 are laid reliably and prevented from being peeled off at the corner of the top of the end facets, the reflection factor of the reflection films 93, 94 and the finesse of the resonator are improved, and the performance of the device itself is improved.

Figure 9:
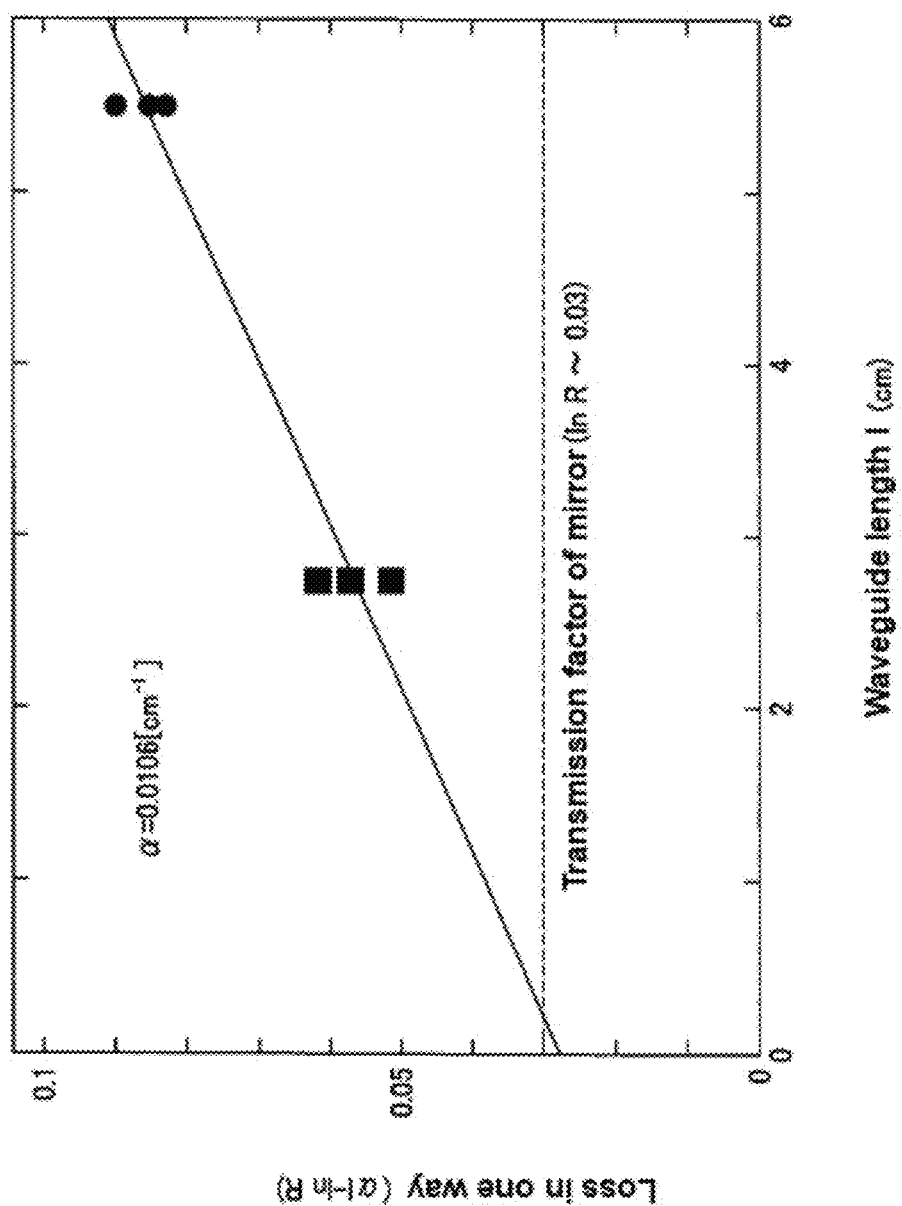
FIG. 9 is a view for explaining about experimental results of loss characteristics of an optical modulator according to the present invention.

FIG. 9 illustrates the internal loss of the optical waveguides 12 of the optical resonators 5 prepared in the above-described experiment either in the forward direction or in the backward direction. The losses of the three samples of optical modulator 8 including the long resonator were observed in a direction of propagation and plotted in FIG. 9 (as indicated by round marks in FIG. 9). Similarly, the losses of the three samples of optical modulator 8 including the short resonator were observed in a direction of propagation and plotted in FIG. 9 (as indicated by square marks in FIG. 9). Then, the marks were approximated by a straight line.

From the obtained straight line, if the reflection factor of the reflection films 93, 94 is R and the loss per unit length of the optical waveguide 12 is $\alpha$, the internal loss Ls in a direction of propagation of the optical waveguide 12 having an optical resonator 5 with a length of 1 is expressed by Ls=$\alpha_1$−1nR when the loss is small. If the observed degree of finesse is F, the loss Ls in a direction of propagation is determined by Ls=$\pi$/F. It will be appreciated from the graph of FIG. 9 where the internal loss Ls is determined from the observed degree of finesse F that the internal loss of the optical waveguide 12 increases as the crystal length of the optical waveguide 12 increases.

Note that, in FIG. 9, the internal loss that arises when the length of the optical resonator 5 is 0 is due to the loss that arises at the end facets of the crystal. More specifically, since the reflection films 93, 94 showing a reflection factor of 97% (a transmission factor of 3%) are coated, a loss of 3% arises as minimum. However, it will be appreciated from FIG. 9 that there is no significant loss except the loss due to the transmission through the reflection films 93, 94 on the planes 91, 92.

Matching a waveguide loss factor of an optical waveguide with a transmission factor of a mirror leads to improve a performance of the optical waveguide by increasing a transmission factor and a finesse of a resonator. A loss factor of an optical waveguide which can be used as an optical comb generator is within a range of about 1% to 5% per one way, so an optical resonator with good performance can be made by depositing reflection films 93, 94 with a reflection factor in a range of 95% to 99%.

Similarly, when the optical modulator 8 is applied to an optical frequency comb generator, the planes 91, 92 are polished and the incident side reflection film 93 and the emission side reflection film 94 are laid in a condition where the protection members 86, 87 have been applied to consequently make it possible to improve the reflection factor of the reflection films 93, 94. Then, as a result, it is possible to improve the finesse of the optical resonator 5 and extend the frequency range for generating sidebands.

When the optical modulator 8 is applied to an optical frequency comb generator, the incident side reflection film 93 may be replaced by a narrow band filter that transmits only light entering the optical waveguide 12 and reflects the sidebands generated in the optical waveguide 12. The efficiency of transforming incident light into sidebands can be improved by replacing the incident side reflection film 93 by such a narrow band filter.

Similarly, the emission side reflection film 94 may be replaced by a filter for flattening the output spectrum. In ordinary optical frequency comb generators, the intensity of light of the obtained sidebands rapidly decreases exponentially as the sideband number increases. Therefore, it is possible to flatten the intensity of light of each obtained sideband by replacing the emission side reflection film 94 by a filter having characteristics for offsetting the decrease in the intensity of light as a function of the degree.

Note that both the incident side reflection film 93 and the emission side reflection film 94 may be replaced respectively by the above-described filters or either of the reflection films 93, 94 may be replaced by the corresponding filter.

Also note that an optical modulator 8 according to the present invention and an optical frequency comb generator realized by applying the optical modulator 8 are of the monolithic type where an incident side reflection film 93 and an emission side reflection film 94 are directly formed relative to the planes 91, 92. In other words, the reflection films 93, 94 are not arranged at positions separated from the respective planes 91, 92 in the optical modulator 8 so that the FSR (free spectral range) of the optical resistor 5 is governed by the crystal length of the crystal of the optical waveguide 12 from the plane 91 to the plane 92 after the polishing in the Step S16. For this reason, the crystal length of the optical modulator 8 is required to be accurately and rigorously controlled so as to make integer times of the FSR of the optical resonator 5 equal to the desired modulation frequency.

If, for example, the FSR of the optical resonator 5 is made to agree with frequency $f_{FSR}$ by making the crystal length (the distance from the first end facet 84 to the second end facet 85 of the substrate 11) of the optical waveguide 12 equal to the value expressed by formula (1) below;

$$L = c/2n_g f_{FSR} - c\tau_g/n_g \qquad (1),$$

(where c is the speed of light in vacuum)

taking the group refractive index $n_g$ of the optical waveguide 12 and the average value $\tau_g$ of the group delay time of the incident side reflection film 93 and the emission side reflection film 94 into consideration. Then, it is possible to dramatically improve the modulation efficiency.

Figure 10:
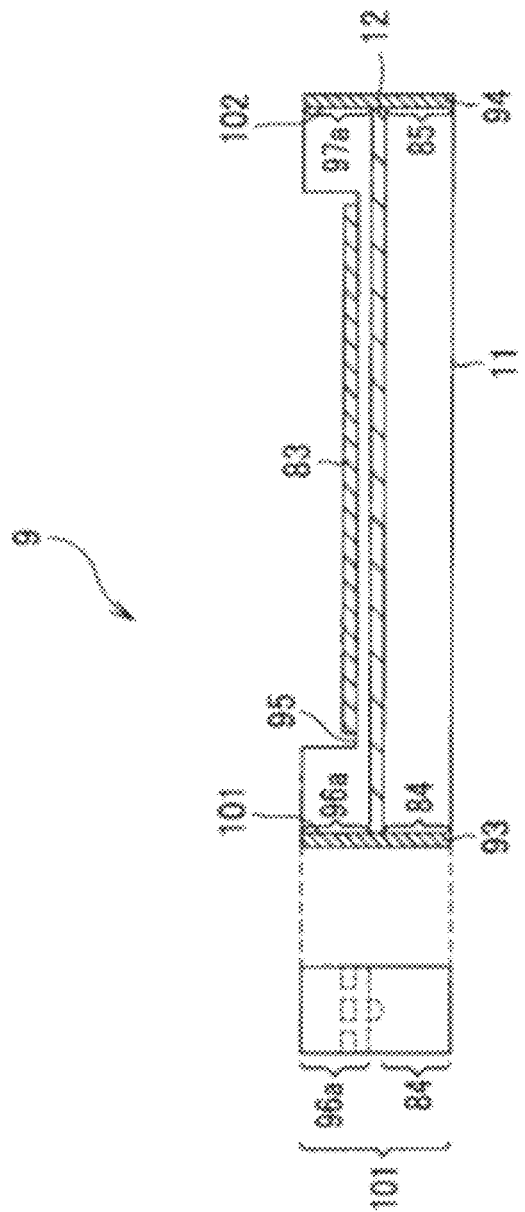
FIG. 10 is a view illustrating a configuration of an optical modulator having a wafer taking both roles of a protection member and a buffer layer.

The present invention is by no means limited to the above-described embodiment. FIG. 10 is a schematic illustration of another embodiment of optical modulator 9 according to the present invention. The description of the components of the above-described optical modulator 8 given above by referring to FIGS. 5 and 6 is also applicable to the components of the optical modulator 9 of this embodiment that are same as of similar to them.

The optical modulator 9 includes a substrate 11, an optical waveguide 12 formed on the substrate 11 to modulate the phase of light propagating through it, a wafer 95 arranged on the top surface of the optical waveguide 12, an electrode 83 arranged on the top surface of the wafer 95 in such a way that the direction of the modulation electric field is substantially perpendicular to the direction of propagation of light, a first end facet 84 and a second end facet 85 arranged opposite to each other with the optical waveguide 12 interposed between them, an incident side reflection film 93 composed of a single-layer or multi-layer deposition film laid on the plane 101 formed between the first end facet 84 and an end facet 96a of the wafer 95, and an emission side reflection film 94 composed of a single-layer or multi-layer deposition film laid on the plane 102 formed between the second end facet 85 and an end facet 97a of the wafer 95.

As in the case of the above-described optical modulator 8, an unillustrated oscillator for oscillating a modulation signal with frequency $f_m$ and an unillustrated terminator are connected to the optical modulator 9.

The wafer 95 is typically made of $SiO_2$ and formed so as to have a length substantially same as that of the optical waveguide 12 and show a U-shaped profile. The wafer 95 is formed so as to show a large thickness only at the opposite end parts thereof and a small thickness only at the central part thereof where the electrode 83 is arranged. With this arrangement, it is possible to efficiently apply a modulation electric field to light propagating in the optical waveguide 12 from the electrode 83.

The wafer 95 takes the role of the above-described buffer layer 14 and suppresses the loss of light when the optical waveguide 12 formed immediately under the surface of the substrate 11 is coated. The wafer 95 also takes the role of the first protection member 86 and that of the second protection member 87 of the above-described optical modulator 8. Thus, the wafer 95 is cut in such a way that its end facets 96a, 97a respectively form planes 101, 102 with the first end facet 84 and the second end facet 85.

When arranging the wafer 95, the $SiO_2$ wafer whose opposite ends are made to show a right thickness is bonded onto the substrate 11 and the part thereof for arranging the electrode 83 is cut to show a U-shaped profile as shown in FIG. 10.

Thus, the optical modulator 9 provides advantages similar to those of the optical modulator 8 and an additional advantage of saving the efforts required to fit the protection members.

Figure 11:
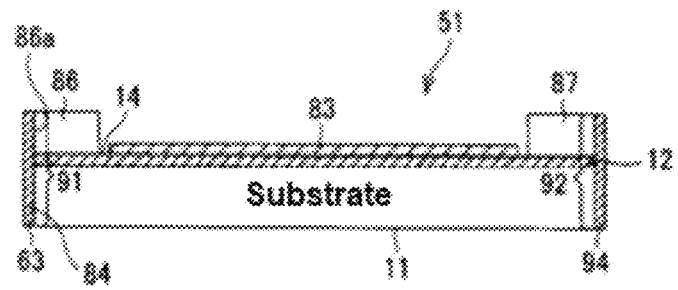
FIG. 11A, FIG. 11B, and FIG. 11C are views illustrating examples of a configuration of a reciprocating modulation type optical modulator according to the present invention.
Figure 11:
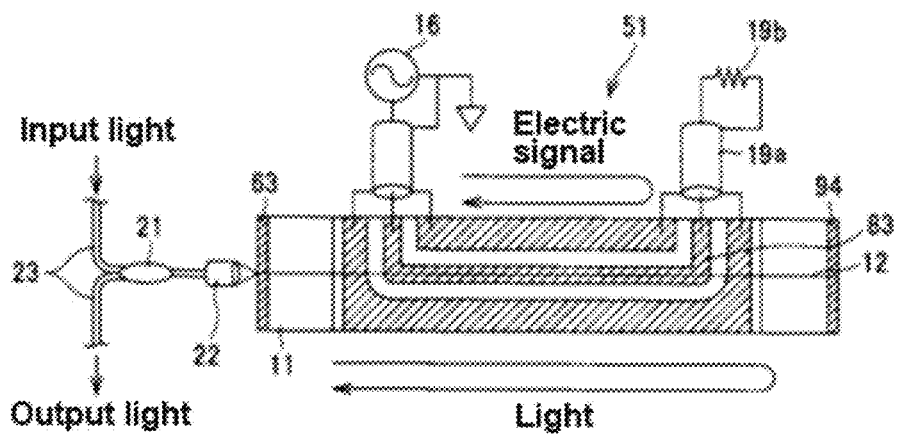
Figure 11:
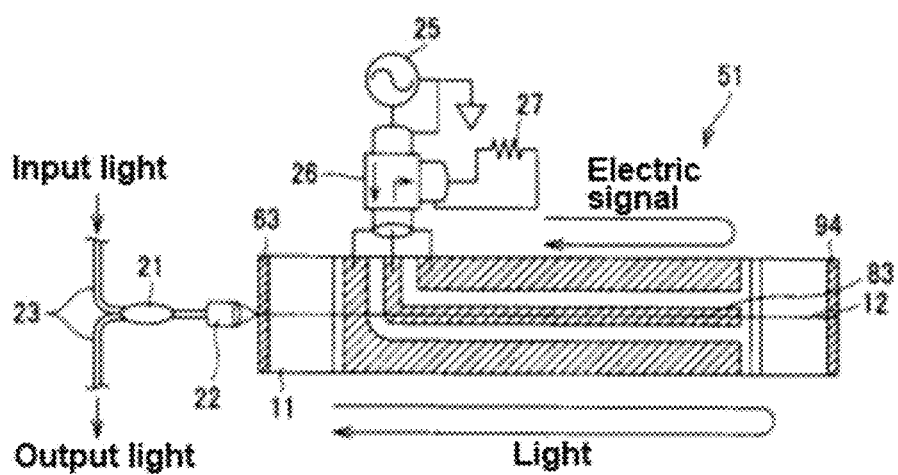

The present invention is by no means limited to the above-described embodiments. For example, the present invention can also be applied to a reciprocating modulation type optical modulator 51 as shown in FIGS. 11A to 11C. The configuration and the components of the optical modulator 51 that are same as or similar to those of the optical modulator 8 described above by referring to FIGS. 4 and 5 are denoted by the same reference symbols and will not be described here any further.

In addition, as shown in FIGS. 11A to 11C, the optical modulator 51 can operate as so-called reciprocating modulation type optical modulator 51, as the emission side reflection film 94 is arranged as high reflection film at one of the opposite ends of the optical waveguide 12 and the anti-reflection film 63 is arranged at the other end of the optical waveguide 12.

As shown in FIG. 11A, the optical modulator 51 includes a substrate 11, an optical waveguide 12 formed on the substrate 11 and adapted to modulate the phase of light propagating through it, a buffer layer 14 laid on the optical waveguide 12 on the substrate 11 to cover it, an electrode 83 arranged on the top surface of the optical waveguide 12 in such a way that the direction of the modulation electric field is substantially perpendicular to the direction of propagation of light, a first protection member 86 and a second protection member 87 arranged at respective upper parts of the optical waveguide 12, an anti-reflection film 63 laid on the plane 91 and an emission side reflection film 94 laid on the plane 92.

When the optical modulator 51 is actually put to use, as shown in FIG. 11B, an optical system including a light transmission path 23 typically made of an optical fiber so as to transmit input light from a light source or transmit output light output from the optical modulator 51 to the outside, an optical circulator 21 for separating the input light and the output light, and a focuser 22 optically connected to the optical circulator 21 is mounted on it, and an oscillator 16 to be arranged at the side of one of the opposite ends of the electrode 83 to oscillate a modulation signal of frequency $f_m$ and a phase shifter 19a and a reflector 19b to be arranged at the side of the other end of the electrode 83 are additionally provided.

The anti-reflection film 63 is laid on the plane 91 that is formed between the first end facet 84 and the end facet 86a of the first protection member 86. The anti-reflection film 63 may be made of a low reflection film or formed without coating to provide effects similar to those obtained when a low reflection film is laid.

The focuser 22 focuses the input light that has passed the optical circulator 21 to an end of the optical waveguide 12 and also the output light that has been transmitted through the anti-reflection film 63 from the end of the optical waveguide 12 so as to send it to the optical circulator 21. The focuser 22 may be formed by using a lens or the like for optically coupling the input light so as to make it show a spot diameter corresponding to the diameter of the optical waveguide 12.

The optical modulator 51 having the above-described configuration operates as so-called reciprocating modulation type optical modulator, as the emission side reflection film 94 is arranged as high reflection film at one of the opposite ends of the optical waveguide 12 and the anti-reflection film 63 is arranged at the other end of the optical waveguide 12. Then, input light entering the optical waveguide 12 is modulated as it is propagated through the optical waveguide 12 and reflected by the emission side reflection film 94 at the corresponding end facet. Then, it is propagated through the optical waveguide 12 again and transmitted through the anti-reflection film 63 so as to be emitted to the side of the focuser 22 as output light. At the same time, the electric signal of frequency $f_m$ supplied from the oscillator 16 propagates on the electrode 83, while modulating the input light, and will be reflected by the reflector 19b.

In this optical modulator 51, when a modulation signal of frequency $f_m$ oscillated by the oscillator 16 to the electrode 83 is supplied, the modulation signal propagates through the electrode 83 in a forward direction, so a phase of light propagating in a forward direction in the optical waveguide 12 can be modulated. The modulation signal propagating on the electrode 83 in the forward direction is reflected by a reflector 19b without any change, and then, propagates through the electrode 83 in a backward direction, after a phase of light is modulated by a phase shifter 19a. In this way, a phase of light propagating in a backward direction in the optical waveguide can be modulated. By the way, a phase may be modulated by the phase shifter 19a such that a phase modulation applied to light propagating in the backward direction in the optical waveguide 12 will be same as a phase modulation with respect to light propagating in the forward direction in the optical waveguide 12.

In this optical modulator 51, a phase modulation can be applied not only to light propagating in the forward direction of the optical waveguide 12, but also to light propagating in the backward direction of the optical waveguide 12, so a modulation efficiency can be increased.

In addition, in this optical modulator 51, by driving and inputting an electric signal synchronized with time for light to reciprocate in the optical waveguide 12 from the electrode 83, a phase modulation can be applied deeper for several tens of times compared to when passing through the optical waveguide 12 for only one time. In this way, an optical frequency comb having sidebands over a broad range can be generated, and all frequency intervals between adjacent side bands will be equal to a frequency $f_m$ of input electric signal.

In addition, this optical modulator 51 can modulate by confining light within a narrow optical waveguide 12, a modulation index can be increased, and it functions as an optical frequency comb generator 1, a light quantity of sidebands and a number of sidebands generated can be increased compared to a bulk type optical frequency comb generator.

In addition, in the optical frequency comb generator 1 using this optical modulator 51, by adjusting a phase of a modulation signal reflected by the reflector 19b and adjusted by the phase shifter 19a according to a shape of the electrode 83, a frequency $f_m$ of a modulation signal, and a group refractive index $n_g$ of the optical waveguide 12, not only light propagating in the forward direction of the optical waveguide 12, but also light propagating in the backward direction of the optical waveguide 12 can be applied with a phase modulation with high efficiency, and a modulation efficiency can be increased up to maximum of near two times.

Additionally, an oscillator 25 and a terminator 27 may be arranged at one of the opposite ends of the electrode 83 of the optical modulator 51 as shown in FIG. 11C and the electric signal supplied from the oscillator 25 may be propagated on the electrode 83 and reflected by the other end of the electrode 83. Still additionally, an isolator 26 for separating the electric signal supplied from the oscillator 25 and the electric signal reflected by the other end of the electrode 83 may be provided. An incident side reflection film 93 composed of a single-layer or multi-layer deposition film having a high reflection factor is laid on the optical modulator 51. Then, as a result, it is possible to resonate light in the inside of the optical waveguide 12. Alternatively, the incident side reflection film 93 may be replaced by an anti-reflection film 63 having a low reflection factor as described. With this arrangement, it is possible to make light reciprocate only once in the optical waveguide 12 while it is being modulated for the phase thereof.

Since it is possible to modulate the phase of light by means of the electric signal when the latter is moving forwardly and also when moving backwardly to improve the modulation efficiency if the reflection phase of the electric signal is adjusted according to the phase of light reflected by the emission side reflection film 94 of this optical modulator 51. The modulation efficiency can be improved further by bonding protection members 86, 87 to suppress the above-described phenomenon of peeled films 63, 93, 94 and chips and improve the finesse of the optical modulator 51.

Figure 12:
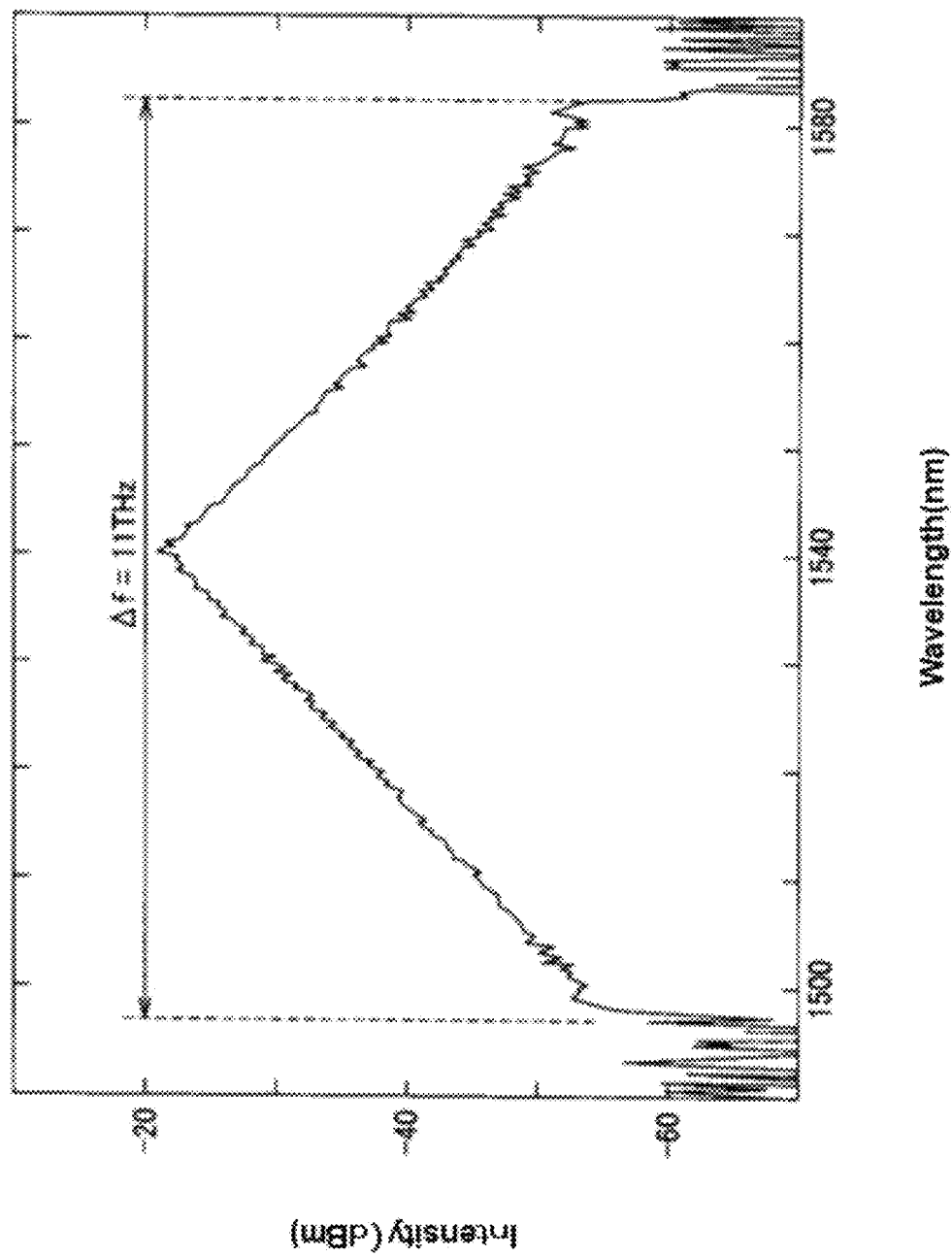
FIG. 12 is a view illustrating the intensity distribution in each frequency (wavelength) of sidebands of an optical frequency comb generator according to the present invention.

When any of the above-described optical modulator 51 is applied to an optical frequency comb generator, it is possible to modulate light resonating in the optical waveguide 12 when it is moving forward and also when it is moving backward by means of an electric signal reciprocating in the electrode. With such an arrangement, in the intensity distribution of sidebands in each frequency (wavelength), the modulation index indicating the magnitude of the modulation applied in the optical waveguide 12 is expressed by π radian in each direction of propagation, when the modulation frequency of the electric signal applied to the electrode 83 is 25 G and the power of the electric signal is 0.5 W as shown in FIG. 12. Then, as a result, it will be seen that the half wavelength voltage V π that is defined as the voltage necessary for moving the phase by a half wavelength is 7.1 V.

An optical modulator 8 formed by using a short resonator shows a high efficiency for generation of sidebands if compared with an optical modulator 8 formed by using a long resonator because of the high degree of finesse as described above and the frequency band width Δf of the generated sidebands gets to 11 THz. While the electrode 83 of an optical modulator 8 formed by using a short resonator is as short as 20 mm, the optical modulator 8 provides a modulation efficiency comparable with that of an optical modulator 8 formed by using a long resonator. In other words, reciprocating modulation works very efficiently.

The optical modulator 51 may alternatively be arranged in such a way that electric signals are driven and input independently from the opposite ends of the electrode 83 by dividing the output of the oscillator 16 that operates as signal source in place of reflecting an electric signal. Still alternatively, independent oscillators 16 may be connected respectively to the opposite ends of the electrode 83.

Figure 13:
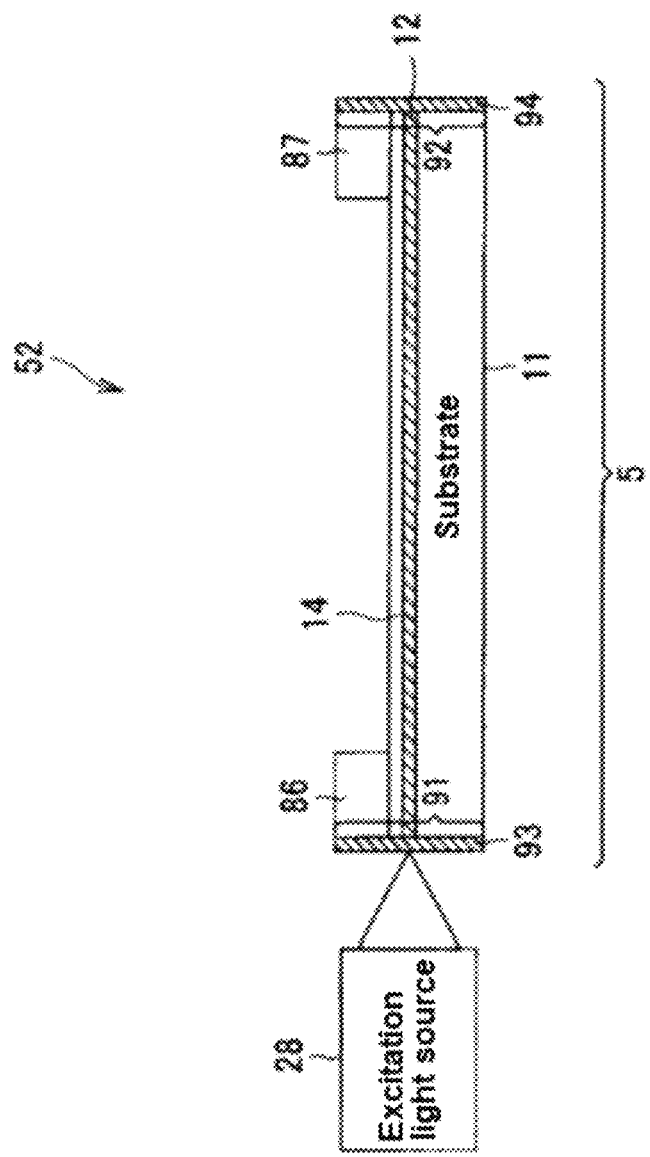
FIG. 13 is a view illustrating a configuration of an optical waveguide type laser oscillator according to the present invention.

The present invention is also applicable to an optical waveguide type laser oscillator 52 as shown in FIG. 13. In FIG. 13, the components of the laser oscillator 52 that are same as or similar to those of the above-described optical modulator 8 illustrated in FIGS. 5 and 6 are denoted respectively by the same reference symbols and will not be described any further.

Referring now to FIG. 13, the laser oscillator 52 includes a substrate 11, an optical waveguide 12 formed on the substrate 11, a buffer layer 14 laid on the optical waveguide 12 on the substrate 11 to cover it, a first protection member 86 and a second protection member 87 arranged at respective upper parts of the optical waveguide 12, an incident side reflection film 93 laid on plane 91 and an emission side reflection film 94 laid on plane 92 to form a resonator 5 between the incident side reflection film 93 and the emission side reflection film 94. When the laser oscillator 52 is actually put to use, an excitation light source 28 for emitting light with wavelength $\lambda_0$ is mounted on it.

An amplification medium such as erbium ions that absorbs light entering it via the incident side reflection film 93 and shows a specific amplification characteristic relative to the wavelength of light is dispersed in the optical waveguide 12 of the laser oscillator 52. With this arrangement, it is possible to make the optical waveguide 12 operate as amplification medium for light. As light having an appropriate wavelength range is made to enter the optical waveguide 12 that operates as amplification medium, it operates also as optical amplifier for amplifying light of a specific wavelength that is determined by energy level. Additionally, it also operates as oscillator that amplifies and oscillates light generated by transition of spontaneous emission. The laser oscillator 52 operates for laser oscillation when the amplification factor exceeds the loss factor in the optical resonator 5. Therefore, it is possible to reduce the threshold value of laser oscillation by applying the protection members 86, 87 to prevent the reflection films 93, 94 from being peeled off and/or chipped and enhance the reflection characteristic at the end facets of the optical waveguide 12 so as to reduce the loss factor in the optical resonator 5.

By configuring the optical waveguide 12 as a nonlinear optical crystal such as $LiNbO_3$, and by a nonlinear polarization induced by light incident in the optical waveguide, an amplification gain can be given to a wavelength different from the incident light, without introducing specific amplification medium in the optical waveguide 12. For example, the optical waveguide 12 may be configured by using a nonlinear optical crystal having periodical polarization inversion structure.

As the incident side reflection film 93 composing the optical resonator 5 in the laser oscillator 52, a film having a low reflection factor with respect to light from the excitation light source 28, and also, having a high reflection factor with respect to a wavelength of light oscillated by the optical waveguide 12, may be used. In addition, as the emission side reflection film 94 composing the optical resonator 5, a film having a reflection factor capable of most suitable output coupling with respect to a wavelength of light oscillated by the optical waveguide 12 may be used.

The laser oscillator 52 can also be used for an optical parametric oscillator. In such a case again, oscillation takes place when the amplification factor exceeds the loss factor in the optical resonator 5. Therefore, it is possible to reduce the threshold value of oscillation by applying the protection members 86, 87 to prevent the reflection films 93, 94 from being peeled off and/or chipped and produce the optical resonator 5 having a high degree of finesse.

As described above, the laser oscillator 52 and the optical parametric oscillator realized by using it provides advantages including that light can be confined to a narrow region and that the amplification factor is improved by raising the electric field intensity when the optical waveguide 12 is used. Particularly, the laser oscillator 52 can achieve a high degree of finesse if compared with conventional oscillators so that the advantages of using the optical waveguide 12 are further boosted.

Figure 14A:
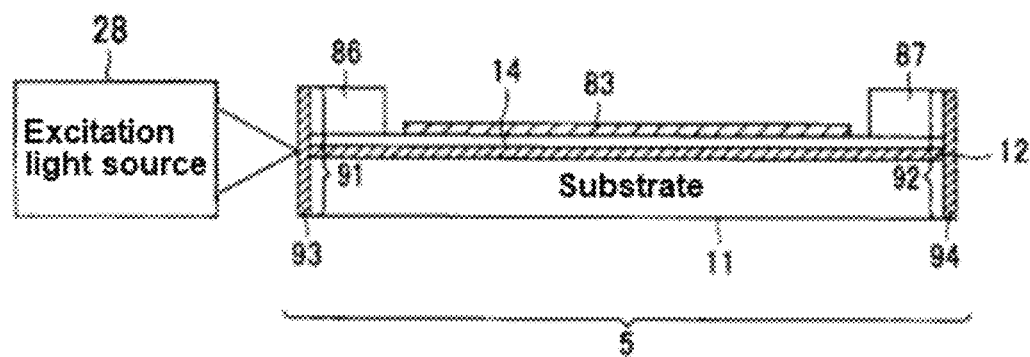
FIG. 14A and FIG. 14B are views illustrating a configuration of a laser oscillator according to the present invention.
Figure 14B:
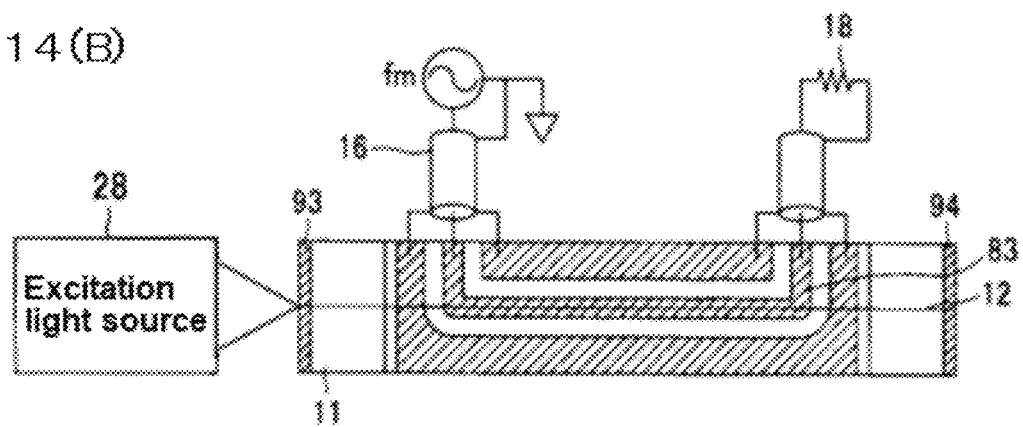

The present invention can also be applied to a mode locked laser oscillator 53 as shown in FIGS. 14A and 14B. Light with locked modes refers to light where the phases of a large number of modes of light oscillated with uniform frequency intervals are uniformized. In FIGS. 14A and 14B, the components of the laser oscillator 53 that are same as or similar to those of the optical modulator 8 and the laser oscillator 52 illustrated in FIGS. 5, 6 and 13 are denoted respectively by the same reference symbols and will not be described any further.

Referring to FIGS. 14A and 14B, the laser oscillator 53 includes a substrate 11, an optical waveguide 12 formed on the substrate 11 and adapted to modulate the phase of light propagating through it, a buffer layer 14 laid on the optical waveguide 12 on the substrate 11 to cover it, an electrode 83 arranged on the top surface of the optical waveguide 12 in such a way that the direction of the modulation electric field is substantially perpendicular to the direction of propagation of light, a first protection member 86 and a second protection member 87 arranged at respective upper parts of the optical waveguide 12, an incident side reflection film 93 composed of a single-layer or multi-layer deposition film laid on plane 91, an emission side reflection film 94 composed of a single-layer or multi-layer deposition film laid on plane 92, and an optical resonator 5 formed between the incident side reflection film 93 and the emission side reflection film 94. When the laser oscillator 53 is actually put to use, an excitation light source 28 for emitting light with wavelength $\lambda_0$ is mounted on it and an oscillator 16 to be arranged at the side of one of the opposite ends of the electrode 83 to oscillate a modulation signal of frequency $f_m$ and a terminator 18 to be arranged at the side of the other end of the electrode 83 are additionally provided. Each of the incident side reflection film 93 and the emission side reflection film 94 operates to lock the phases of the multiple of modes of laser oscillation.

The laser oscillator 53 having the above-described configuration can operate for mode locked laser oscillation where the multiple of modes are locked as the electrode 83 is arranged at an upper part of the optical waveguide 12 of the above-described laser oscillator 52. When a modulation signal of a frequency that agrees with integer times of the FSR of the optical resonator 5 is driven and input from the oscillator 16, the phases of the modes are locked on the basis of the electrooptic effects of the optical waveguide 12 that oscillates light of a multiple of modes so that the laser oscillator operates for mode locked laser oscillation.

As the modes are locked, the time waveform of light oscillated by the laser oscillator 53 becomes short pulses having a time width substantially equal to the opposite number of the amplified frequency bandwidth. Additionally, the waveform of the frequency axis becomes an optical frequency comb where sidebands are arranged at constant frequency intervals. Therefore, it is possible to use the laser oscillator 53 for observing the frequency of light and apply it to a multi-wavelength light source by optimally controlling it. It may be needless to say that the laser oscillator 53 can be used for an optical parametric oscillator like the above-described laser oscillator 52. Particularly, since the protection members 86, 87 are bonded to the laser oscillator 53, the reflection films 93, 94 are free from the problem of being peeled off and/or chipped to improve the degree of finesse of the entire optical resonator 5 and the laser oscillator 53 can operate efficiently for mode locked laser oscillation.

Note that the mode locked laser oscillation of the laser oscillator 53 is not limited to the above-described one that utilizes the electrooptic effects and may alternatively be based on any phenomenon so long as the laser oscillator is designed to exploit the nonlinear effects of optical elements in the optical resonator 5. For instance, it is possible to clearly set off the effects by using $LiNbO_3$ crystal for the optical waveguide 12.

Figure 15:
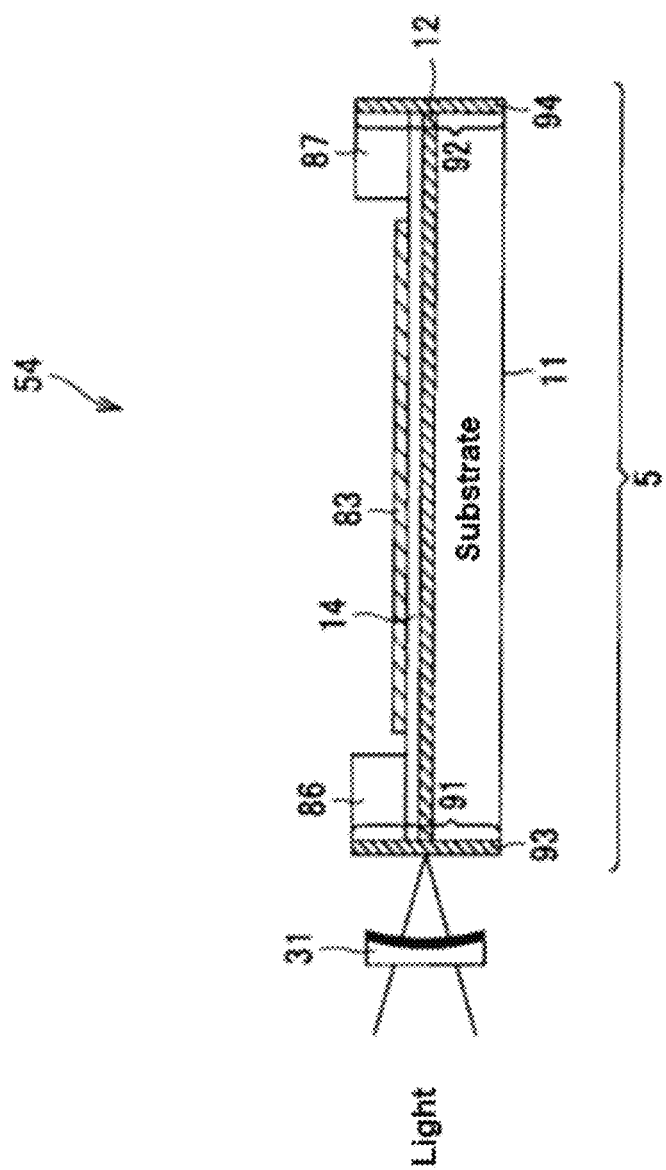
FIG. 15 is a view illustrating an example of a configuration of a modified FP electrooptic modulator according to the present invention.

The present invention can also be applied to a modified Fabry-Perot (FP) electrooptic modulator 54 as illustrated in FIG. 15. In FIG. 15, the components of the modified FP electrooptic modulator 54 that are same as or similar to those of the optical modulator 8 and the laser oscillator 52 illustrated in FIGS. 5, 6 and 13 are denoted respectively by the same reference symbols and will not be described any further.

Referring to FIG. 15, the modified FP electrooptic modulator 54 includes a substrate 11, an optical waveguide 12 formed on the substrate 11 to modulate the phase of propagating light, a buffer layer 14 laid on the substrate 11 so as to cover the optical waveguide 12, an electrode 83 formed on the top surface of the optical waveguide 12 in such a way that the direction of the modulation electric field is substantially perpendicular to the direction of propagation of light, a first protection member 86 and a second protection member 87 formed respectively at upper parts of the optical waveguide 12, an incident side reflection film 93 composed of a single-layer or multi-layer deposition film laid on the plane 91, an emission side reflection film 94 composed of a single-layer or multi-layer deposition film laid on the plane 92, and an optical resonator 5 formed between the incident side reflection film 93 and the emission side reflection film 94. When the laser oscillator 53 is actually put to use, a reflector 31 is mounted and, if necessary, an oscillator to be arranged at the side of one of the opposite ends of the electrode to oscillate a modulation signal of frequency $f_m$ and a terminator to be arranged at the side of the other end of the electrode are provided.

The reflector 31 transmits light supplied from the outside and leads it to the end of the optical waveguide 12 at the side of the modified FP electrooptic modulator 54, while it reflects light emitted from the end of the optical waveguide 12. More specifically, the efficiency of transforming light entering the optical waveguide 12 into sidebands can be improved by arranging the reflector 31 because then it is possible to transmit only light entering the optical waveguide 12 and reflect the sidebands generated in the optical waveguide 12. In other words, the modified FP electrooptic modulator 54 can provide advantages similar to those provided when the incident side reflection film 93 is replaced by a narrow band filter that transmits only light entering the optical waveguide 12 and reflects the sidebands generated in the optical waveguide 12. Particularly, since the protection members 86, 87 are bonded in the modified FP electrooptic modulator 54, the reflection films 93, 94 are free from being peeled off and/or chipped to improve the finesse of the entire optical resonator 5 and hence the efficiency of transforming light into sidebands.

An optical modulator 8 according to the present invention can be applied to a communication system 55 as will be described hereinafter.

Figure 16A:
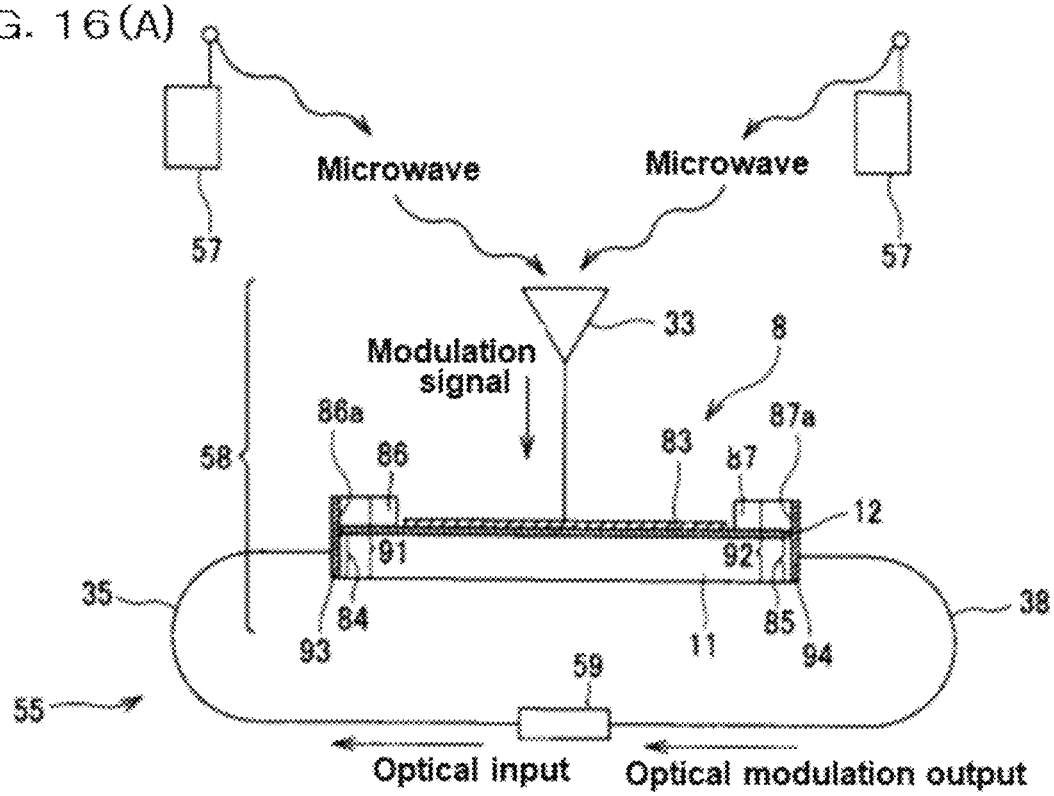
FIG. 16A and FIG. 16B are views for explaining about an example of a communication system where an optical modulator according to the present invention is mounted in each of base stations.

A system for code division multiple access that is based on a WDM communication method is typically applied to the communication system 55. As shown in FIG. 16A, the communication system 55 includes portable communication appliances 57, each of which is a mobile terminal that a pedestrian can carry, a plurality of base stations 58 for relaying communications by transmitting/receiving radio signals with any of the portable communication appliances 57 and a host control apparatus 59 for controlling communications in the entire network including the base stations 58 by way of optical fiber communication networks 35, 38 connected to it.

Each of the portable communication appliances 57 is adapted to be mounted in a vehicle or carried by a person so as to transmit/receive radio signals with the base station 58 arranged in the district where the portable communication appliance 57 is located. More specifically, while the portable communication appliance 57 may be an apparatus for fax communications or an apparatus mounted in a personal computer for data communications, it is generally a portable telephone or a PHS (personal handy phone system) for voice communications. Thus, it is small and lightweight and specifically designed as portable appliance.

As shown in FIG. 16A, an optical modulator 8 is mounted in each of the base stations 58. An antenna 33 for transmitting/receiving a microwave with any of the portable communication appliances 57 is connected to the electrode 83 of the optical modulator 8. Light transmitted from the host control apparatus 59 by way of the optical fiber communication network 35 is partly made to enter the optical waveguide 12 of the optical modulator 8 via the incident side reflection film 93. Light that is made to enter the optical waveguide 12 is resonated by the incident side reflection film 93 and the emission side reflection film 94 that are arranged substantially in parallel with each other. Additionally, the optical modulator 8 can receive the microwave supplied from any of the portable communication appliances 57 by way of the antenna 33 and apply a modulation signal that corresponds to the microwave to light propagating in the optical waveguide 12 by way of the electrode 83 so that it can perform an operation of phase modulation on the light according to the information transmitted from the portable communication appliance 57. The optical modulator 8 emits the phase-modulated light via the emission side reflection film 94. The emitted light is then transmitted to the host control apparatus 59 by way of the optical fiber communication network 38.

The host control apparatus 59 generates light to be transmitted to the base stations 58 and obtain the detected output of any of the base stations 58 by performing an operation of photoelectric conversion on the light modulated at the base stations 58. In other words, the host control apparatus 59 can collectively control the detected outputs from various base stations.

In the communication system 55, light output from the host control apparatus 59 is transmitted to a target base station 58 by way of the optical fiber communication network 35. Then, the base station 58 propagates transmitted light in the optical waveguide 12 of the optical modulator 8 and performs an operation of phase modulation according to the microwave before it transmits the light to the host control apparatus 59 by way of the optical fiber communication network 38.

More specifically, when a portable communication appliance 57 located in the vicinity of a base station 58 makes a call, the light transmitted to the base station 58 is subjected to phase modulation that corresponds to the talk contained in the above-described microwave. On the other hand, when the portable communication appliance 57 located in the vicinity of a base station 58 does not make any call, the light transmitted to the base station 58 is not subjected to the above-described phase modulation. Thus, when the light transmitted from the base station 58 by way of the optical fiber communication network 38 has been subjected phase modulation, the host control apparatus 59 can obtain a detection output that corresponds to the talk by performing an operation of photoelectric conversion on it.

Since an optical modulator 8 having a resonator to which protection members 86, 87 are bonded and that shows a high degree of finesse is mounted in each base station 58 of the communication system 55, it is possible to increase the number of reciprocations of light propagating in the optical waveguide 12 and consequently improve the sensitivity of the optical modulator 8 itself.

Figure 16B:
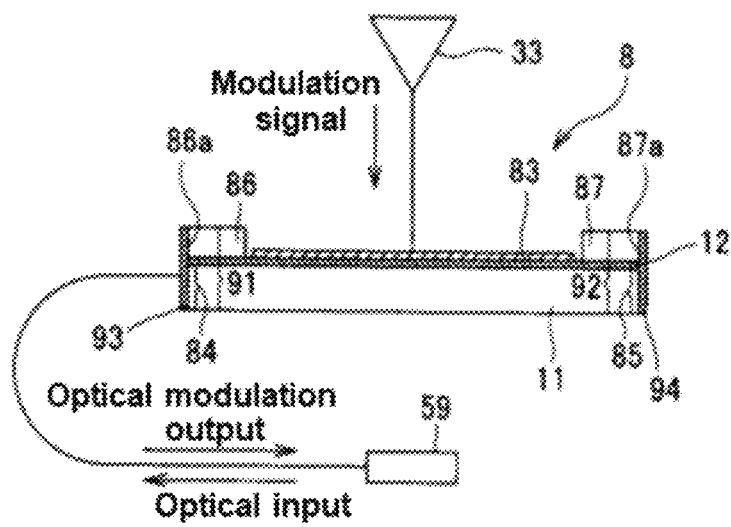

It may be appreciated that single core bidirectional optical transmission can be used for the communication system 55 as shown in FIG. 16B.

The crystal length $LC_1$ of the optical waveguide 12 in the forward direction (backward direction) may be so adjusted as to be about 27 mm (or 54 mm) in an optical modulator 8 according to the present invention as shown in FIG. 5. The advantages of selecting such a crystal length will be described below.

Figure 17A:
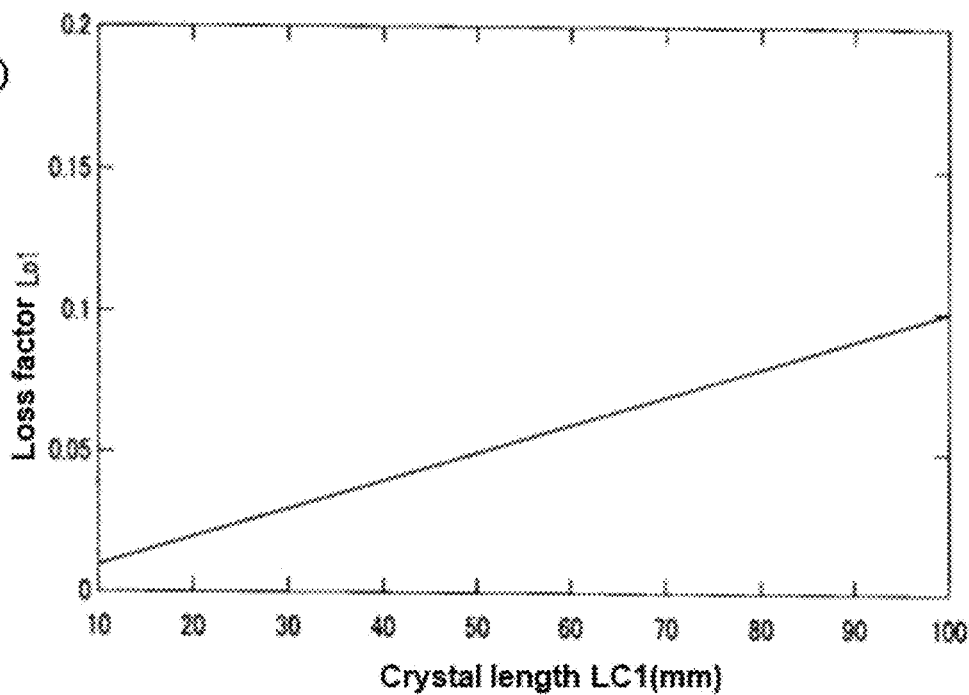
FIG. 17A and FIG. 17B are views for explaining about a performance of an optical modulator according to the present invention when the length is limited.
Figure 17B:
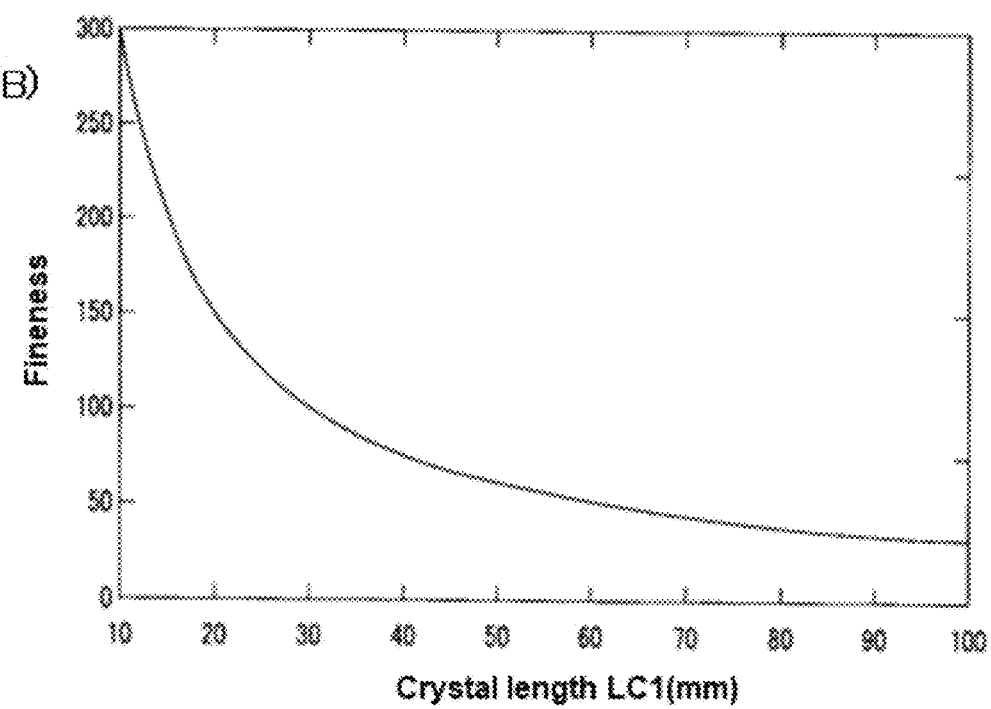

When the loss factor of light propagating in the forward direction (backward direction) in the optical waveguide 12 is $Lo_1$, FIG. 17A shows the relationship between the loss factor $Lo_1$ and the crystal length $LC_1$ of the optical waveguide 12. As seen from FIG. 17A, the loss of propagating light gradually increases as the crystal length $LC_1$ increases. FIG. 17B illustrates the relationship between the crystal length $LC_1$ and the finesse. Finesse is generally expressed by $\pi/Lo_1$ and, as seen from FIG. 17B, it is high when the crystal length $LC_1$ is small.

The performance index of an optical modulator 8 can be expressed by V $\pi$/(finesse) (where V $\pi$ is the voltage required for $\pi$ radian modulation). Thus, an optical modulator 8 and an optical frequency comb generator including the optical modulator 8 perform excellently when the performance index is small.

Figure 18:
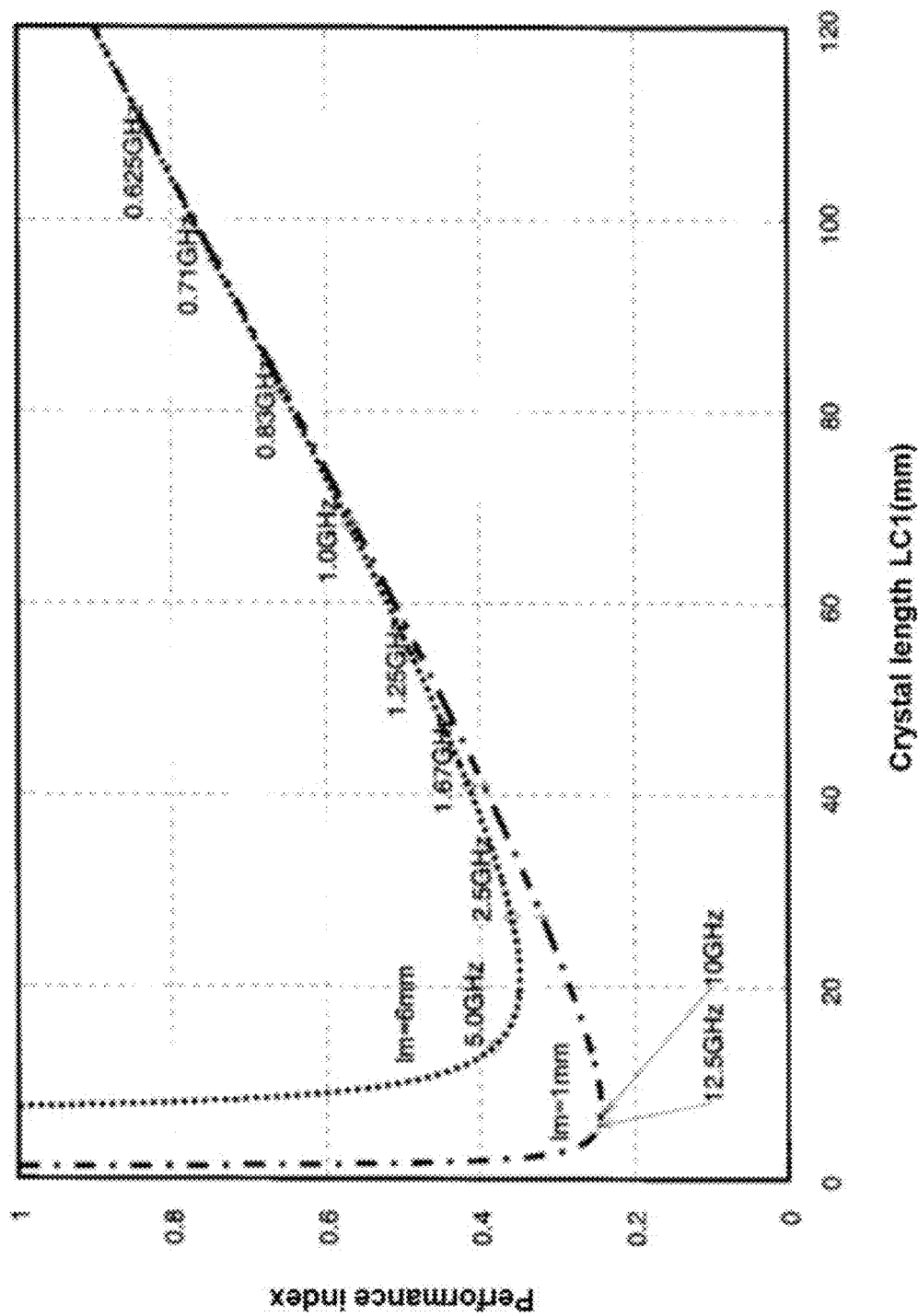
FIG. 18 is a view for explaining about a performance of other optical modulator according to the present invention when the length is limited.

FIG. 18 is a graph illustrating the relationship between the performance index computationally determined on the basis of the finesse and the loss factor $Lo_1$ and the crystal length $LC_1$. In FIG. 18, 1 m represents the difference between the crystal length $LC_1$ and the length of the electrode 83. Generally, the optical waveguide 12 should be free from an electrode for several millimeters from the opposite ends thereof. Therefore, the graph of FIG. 18 shows instances where 6 mm and 1 mm are selected as 1 m for computations.

As shown in FIG. 18, if 1 m=6 mm, the performance index is small when the crystal length $LC_1$ is 15 to 30 mm. When FSR that corresponds to the crystal length $LC_1$ in such a range is plotted, it is found that the performance index is smallest at or near 2.5 GHz. For the simulation of the tendency shown in FIG. 18, it is assumed that the modulation frequency is 25 GHz, that the transmission loss of microwave at the electrode 83 is −10 dB/50 mm and that the transmission loss of light is −0.0106/cm, considering that the modulation index is $\pi$ radian when Pin=0.43 W and the crystal length $LC_1$=27 mm (when the electrode 83 is 21 mm long) at the time of a reciprocating modulation. Additionally, the reflection factor of the mirror is optimized relative to the loss factor that is a function of the crystal length.

Thus, when 1 m=6 mm, it is possible to further improve the performance of the optical modulator 8 by making the crystal length $LC_1$ of the optical waveguide 12 equal to about 27 mm. However, the crystal length $LC_1$ has not necessarily to be made equal to about 27 mm and any other length may alternatively be selected within the range of 24±6 mm. For practical applications, it is preferable that the crystal length $LC_1$ is one integer-th of 10 GHz for TDM (time division multiplex) optical communications or of 25 GHz for WDM (wavelength division multiplex) optical communications in the field of optical communications. The crystal length of 27 mm corresponds to 2.5 GHz.

A similar excellent performance is observed by simulation when the plot in the FSR that corresponds to the crystal length $LC_1$ is 1.25 GHz. Therefore, a crystal length $LC_1$ of about 54 mm may be selected correspondingly.

When 1 m=1 mm, a similar excellent performance is observed by simulation at about 10 GHz. Thus, it is possible to further improve the performance of the optical modulator 8 by selecting a corresponding value for the crystal length $LC_1$.

In addition, in a method for manufacturing an optical modulator 8 according to the present invention shown in FIG. 8, an optical waveguide 12 is formed by thermally diffusing Ti atoms in a substrate 11 in a process for manufacturing an optical waveguide 12 in steps S11 and S12, but it may be alternated by a proton exchange for substituting Li with $H^+$ by immersing $LiNbO_3$ crystal in a benzoic acid.

Here, in an optical comb generation in an optical comb generator using a waveguide type optical resonator for resonating light confined in an optical waveguide, orthogonal polarized components destabilize a control for matching a resonant frequency of the optical comb generator with a laser frequency, so it will be a cause of a deviation of a control point, an oscillation of control and else, and when using an optical comb for example to a measuring device for measuring a height or a distance to an object to be measured, orthogonal polarized components have been a cause of measurement error. However, by obtaining an optical comb output with increased single polarization degree by improving a polarization extinction ratio, by inhibiting an output of orthogonal polarized components which do not contribute to an optical comb generation, and by adopting a waveguide type optical modulator 8A having an optical waveguide 12A formed as a region in which a waveguide mode exists only with respect to a single polarized component configured as shown in FIG. 5, a control of a resonator can be stabilized without changing a shape of a transmission mode waveform of the optical waveguide, so it is possible to stabilize as an optical frequency comb generator, and to reduce an error and improve an accuracy of a measuring device including the optical comb.

Figure 19:
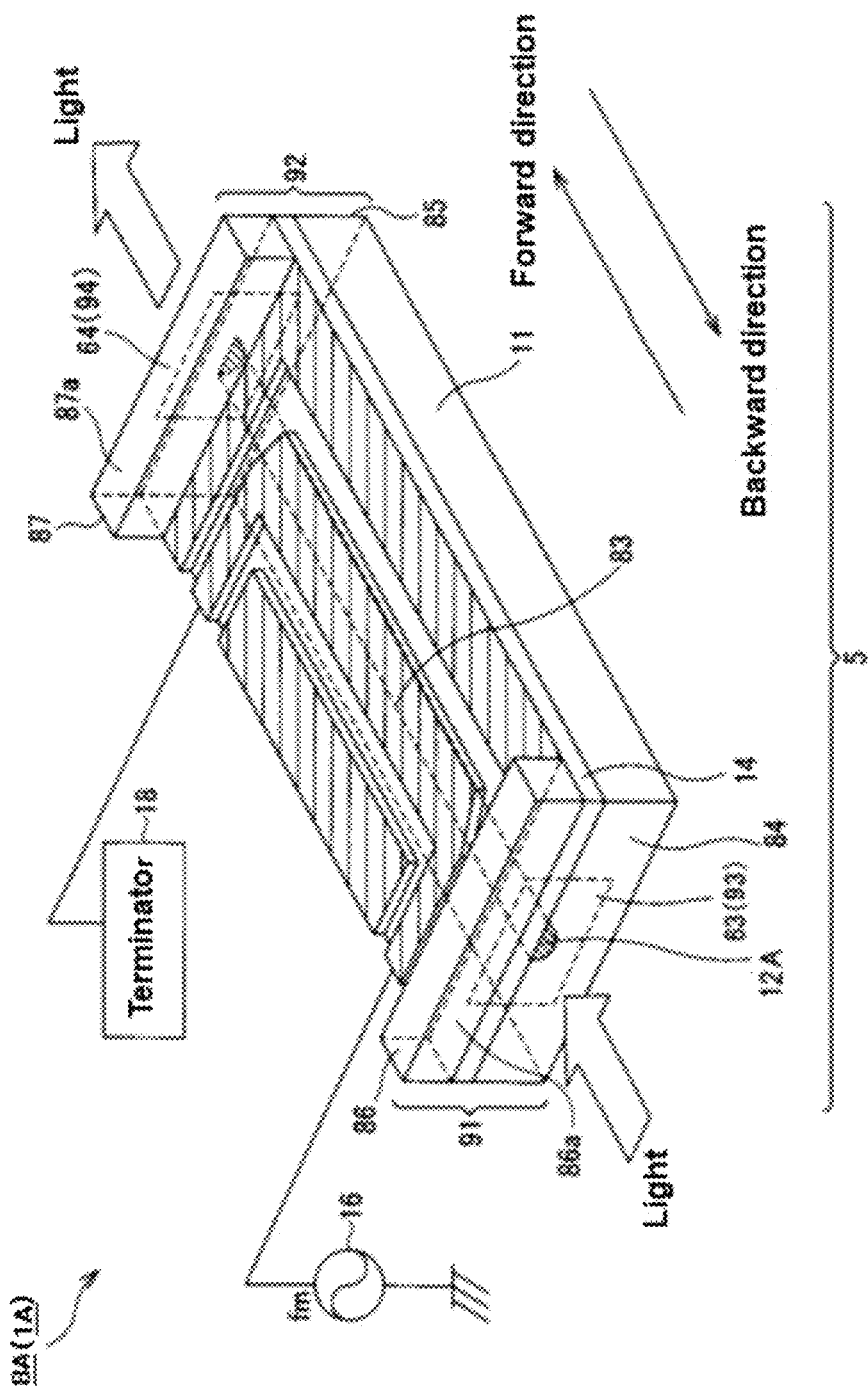
FIG. 19 is a perspective view illustrating an example of other configuration of an optical modulator according to the present invention.

A configuration of a waveguide type optical modulator 8A shown in FIG. 19 is same as that of the waveguide type optical modulator shown in FIG. 5, except for an optical waveguide 12A formed as a region in which a waveguide mode exists only with respect to a single polarized component, so same components are denoted by the same reference symbols and will not be described here any further.

Figure 20:
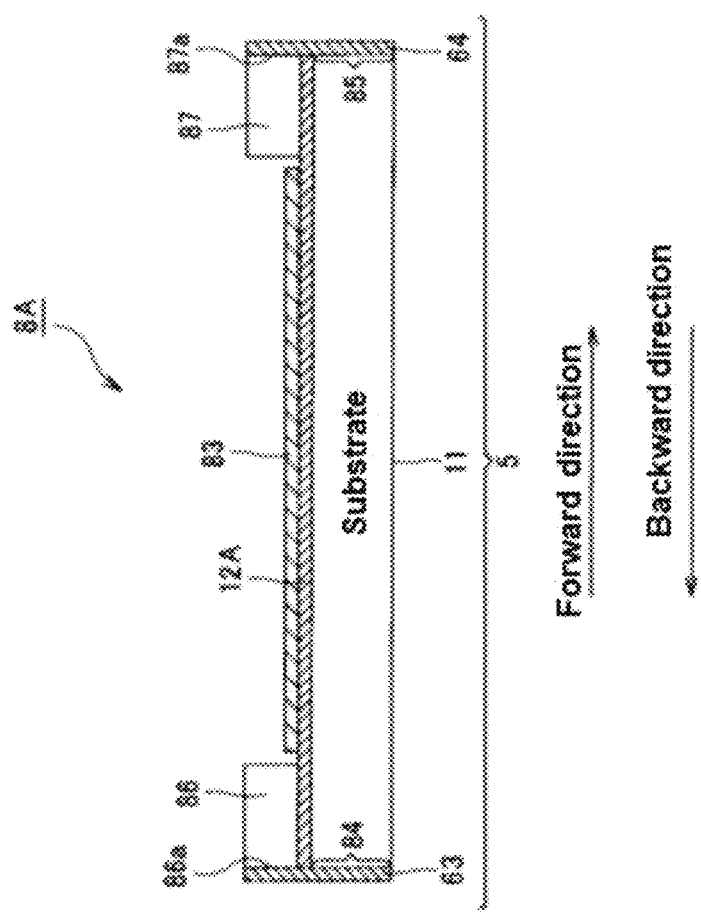
FIG. 20 is a side view of the optical modulator.

FIG. 20 is a side view of a waveguide type optical modulator 8A.

In the waveguide type optical modulator 8A, the optical waveguide 12A is formed as a region in which a waveguide mode exists only with respect to a single polarized component in a substrate 11 having at least electrooptic effect such as to run from an incident side anti-reflection film 63 through an emission side anti-reflection film 64.

In light incident in the optical waveguide 12A via the incident side anti-reflection film 63, only a single polarized component propagates while totally reflecting at an interface of the optical waveguide 12A.

Here, the optical waveguide 12A only passing through a single polarized component can be formed as a region with high refractive index with respect to a single polarized component in the substrate having an electrooptic effect, by an optical waveguide forming method giving a change of refractive index only to a specific polarized component, for example a proton exchange method.

The optical waveguide 12A can be formed as a region in which a waveguide mode exists only with respect to a single polarized component by a proton exchange method in the substrate 11, for example composed of $LiNbO_3$.

In addition, the optical waveguide 12A can be formed as a region in which a waveguide mode is limited to a single polarization by adjusting a refractive index distribution, when manufacturing by diffusing Ti atoms in the substrate 11 or by depositing Ti atoms on the substrate 11 by epitaxial growth. In the optical waveguide 12A, for example LiNbO$_3$ crystal optical waveguide can be used, and the optical waveguide 12A can be formed by diffusing Ti atoms on a surface of the substrate 11 composed of LiNbO$_3$ or the like. The region diffused with Ti atoms will be having a high refractive index compared to other regions, and can confine light of single polarized component, so the optical waveguide 12A capable of propagating light of single polarized component can be formed. There is a condition that a waveguide mode will be effected only with respect to a single polarized component, although a refractive index will be high with respect to both of orthogonal polarized components.

An LiNbO$_3$ crystal type optical waveguide 12A prepared by the above-described method provides electrooptic effects such as Pockels effect that the refractive index changes in proportion to the intensity of electric field and the Kerr effect that the refractive index changes in proportion to the square of the intensity of the electric field so that it is possible to modulate light of single polarized component, utilizing such physical phenomena.

The buffer layer 14 covers the optical waveguide 12A to suppress the propagation loss of light of single polarized component in the optical waveguide 12A. Note that, the electric field intensity falls to reduce the modulation effect when the buffer layer 14 has a too large film thickness. Therefore, it is preferable to select a small film thickness within a range that does not significantly raise the propagation loss of light of single polarized component.

The electrode 83 is made of a metal material such as Ti, Pt or Au and adapted to modulate the phase of light propagating through the optical waveguide 12A by driving and inputting the modulation signal of frequency $f_m$ supplied from the oscillator 16 into the optical waveguide 12A.

Each of the first protection member 86 and the second protection member 87 is formed by a member corresponding to the material of the substrate 11. The first protection member 86 and the second protection member 87 may be made of a material same as that of the substrate 11. The end facet 86a of the first protection member 86 and the first end facet 84 that form the plane 91 may be processed so as to have the same crystal orientation relative to each other. Similarly, the end facet 87a of the second protection member 87 and the second end facet 85 that form the plane 92 may be processed so as to have the same crystal orientation relative to each other.

The anti-reflection film 63 is formed and laid as a single-layer or multi-layer deposition film on the plane 91 that is perpendicular to the optical waveguide 12A formed between the first end facet 84 and the end facet 86a of the first protection member 86. The anti-reflection film 64 is formed and laid as a single-layer or multi-layer deposition film on the plane 92 that is perpendicular to the optical waveguide 12A formed between the second end facet 85 and the end facet 87a of the second protection member 87. These anti-reflection films 63, 64 may be made of a low reflection film or formed without coating to provide effects similar to those obtained when a low reflection film is laid.

The terminator 18 is a resistor fitted to the terminal of the electrode 83 and adapted to prevent the waveform of the electric signal from being disturbed by preventing the electric signal from being reflected at the terminal.

Now, the method of preparing an optical modulator 8A according to the present invention will be described below by referring to FIG. 21.

Firstly, in Step S21, a photoresist pattern 13 is formed on a surface of a substrate 11 made of LiNbO$_3$ crystal as shown in FIG. 21A.

Then, in Step S22, as shown in FIG. 21B, an optical waveguide 12A is formed as a region in which a waveguide mode exists only with respect to a single polarized component by a proton exchange method for exchanging Li at a surface layer of the substrate 11 with H$^+$, by heating the substrate 11 of LiNbO$_3$ crystal in which the photoresist pattern 13 is formed on the surface thereof in a condition that the substrate 11 is immersed in a proton exchange liquid such as a benzoic acid.

In addition, a process for forming the optical waveguide 12A of these Steps S21 and S22 is not limited to a proton exchange method, and for example it may be alternated to a Ti diffusion method, wherein, in Step S21, a photoresist pattern 13 is formed on a surface of a substrate 11 made of LiNbO$_3$ crystal and Ti is deposited on the surface of the substrate 11 made of LiNbO$_3$ crystal, and the photoresist is removed to produce Ti micro-wires having a width of microns, and then, in Step S22, Ti atoms are thermally diffused in the substrate 11 to form an optical waveguide 12A as a region in which a waveguide mode exists only with respect to a single polarized component by heating the substrate 11 where Ti micro-wires are formed.

Then, in Step S23, an SiO$_2$ thin film is deposited as a buffer layer 14 on the surface of the substrate 11 by removing the photoresist pattern 13 as shown in FIG. 21C. Alternatively, in Step S23, a buffer layer 14 may be formed by applying an SiO$_2$ wafer to the surface of the substrate 11. If such is the case, the film thickness may be controlled by polishing the deposited buffer layer 14, considering the region for arranging an electrode in Step S24, which will be described hereinafter.

Then, in Step S24, an electrode 83 is formed on the buffer layer 14 as shown in FIG. 21D.

Then, in Step S25, protection members 86, 87 are bonded to an upper part of the optical waveguide 12A as shown in FIG. 21E. The protection members 86, 87 may be bonded by means of an adhesive agent or by means of some other direct bonding method. When the substrate 11 is made of LiNbO$_3$ crystal, the protection members 86, 87 may also be made of the same material as LiNbO$_3$. In Step S25, the applied protection members 86, 87 are cut so as to make their end facets 86a, 87a form planes 91, 92 with the first end facet 84 and the second end facet 85 of the substrate 11 respectively.

Then, in the last step of Step S26, the obtained planes 91, 92 are polished to planes perpendicular to the optical waveguide 12A as shown in FIG. 21F. Then, an incident side anti-reflection film 63 and an emission side anti-reflection film 64 are formed respectively on the entire polished planes 91, 92 perpendicular to the optical waveguide 12A.

Since protection members 86, 87 are bonded to the respective ends of the optical modulator 8A according to the present invention, the end facets of the optical waveguide 12A that are conventionally located at the top corners of the end facets of the optical modulator 8A are now located substantially at the centers of the planes 91, 92. Then, as a result, if the corner of either of the planes 91, 92 is chipped in the polishing operation in Step S26, the corresponding end facet of the optical waveguide 12A is not chipped. In other words, the end facets of the optical waveguide 12A can hardly be chipped. Thus, it is possible to minimize the loss of light from either of the end facets of the optical waveguide 12A.

As the protection member 86, 87 are made of an appropriate material that correspond to the material of the substrate 11, the first end facet 84 of the substrate 11 through the end facet 86a and the second end facet 85 of the substrate 11 through the end facet 87a can be polished at a uniform polishing rate in Step S26. Then, the end facets of the optical waveguide 12A are no longer rounded in the polishing step, and the planes 91, 92 composed of very flat polished planes can be obtained. Thus, it is possible to minimize the reflection loss at the end facets of the optical waveguide 12A. The reflection loss can be further reduced by making the end facets of each of the planes 91, 92 have the same crystal orientation.

Further, by arranging the protection members 86, 87 purposely, the accuracy of the polishing process in Step S26 is improved and the perpendicularity of the obtained plane 91 (92) relative to the optical waveguide 12A is also improved. Thus, it is possible to minimize the loss of light from the loss of the perpendicularity.

Since the incident side anti-reflection film 63 and the emission side anti-reflection film 64 are formed over large areas respectively extending from the first end facet 84 and the second end facet 85 of the substrate 11 to the end facets 86a, 87a, they are very stable and hardly peeled off. Additionally, the present invention provides an enhanced degree of reproducibility in terms of film forming.

In an experiment for examining the effect of arranging the protection members 86, 87 according to the present invention, the planes 91, 92 where the protection members 86, 87 are bonded were polished to find that neither chip nor bend takes place at the end facets of the optical waveguide 12A and the optical polishing operation was performed to make planes 91, 92 very flat and suitable for laying the incident side anti-reflection film 63 and the emission side anti-reflection film 64 composed of single-layer or multi-layer deposition films.

Particularly, when the first protection member 86 and the second protection member 87 are made of a material same as the substrate 11 and the end facets 86a, 87a of the protection members 86, 87 and the first and second end facets 84, 85 that form the planes 91, 92 are processed to show the same crystal orientation, they show the same crystal hardness so that the planes 91, 92 would not become inclined due to a difference in polishing rates.

In the optical modulator 8A with such configuration, a phase of light of single polarized component propagated in the optical waveguide 12A by entering via the incident side anti-reflection film 63 is modulated by a modulation signal of frequency $f_m$ supplied from the oscillator 16, and emitted via the emission side anti-reflection film 64. Also, in the optical modulator 8A according to the present invention, the end facets of the optical waveguide 12A are moved substantially to the centers of the respective planes 91, 92, by bonding the protection members 86, 87 at the respective ends, so chips and roundedness of end facets of the optical waveguide 12A is minimized, perpendicularity between the optical waveguide 12A and the planes 91, 92 is secured, accuracy of polishing the planes 91, 92 is improved, and yield is also improved.

Figure 22:
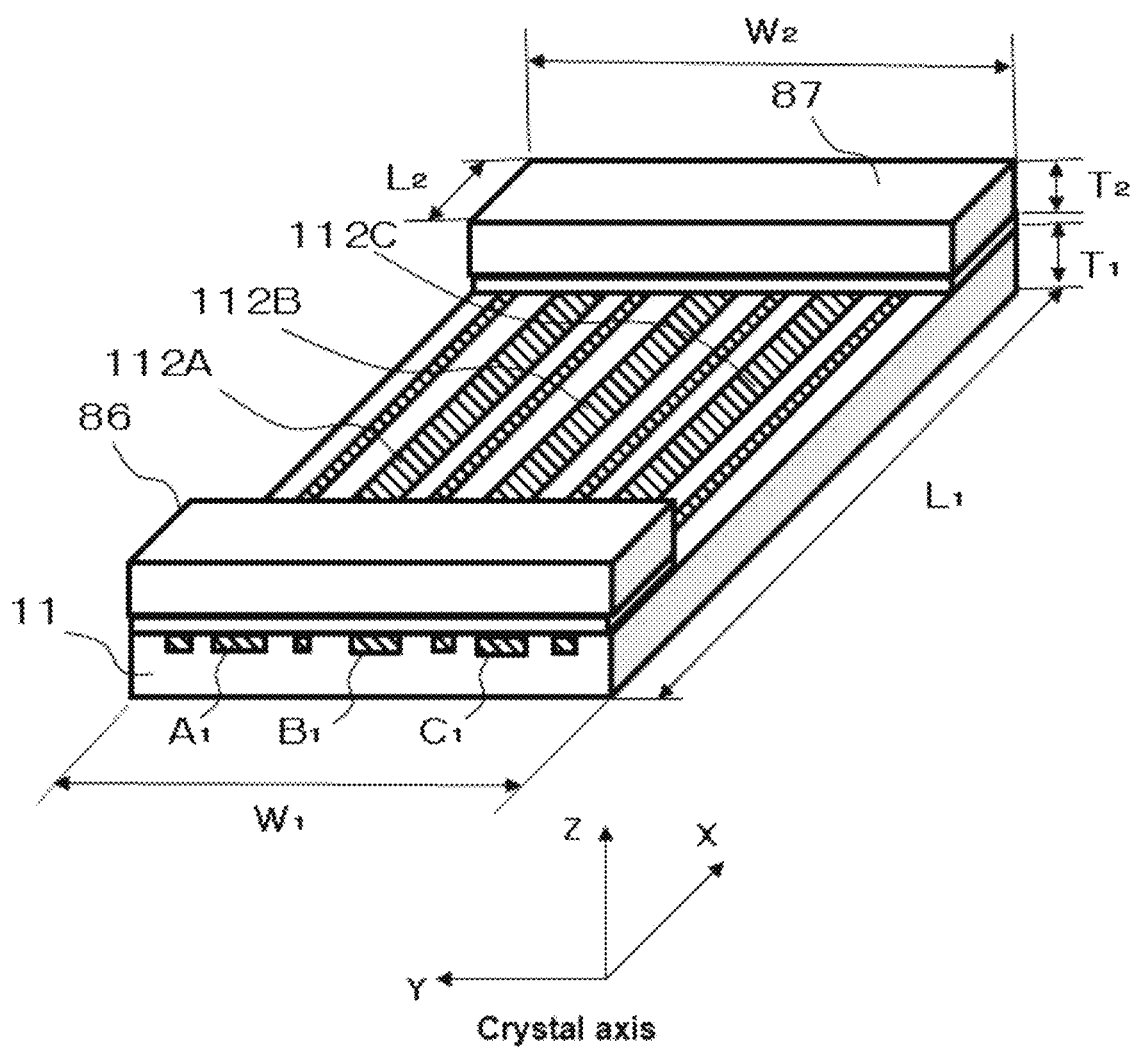
FIG. 22 is a perspective view of a substrate provided with three optical waveguides produced for measuring an end facet reflection factor of an optical modulator according to the present invention.
Figure 23:
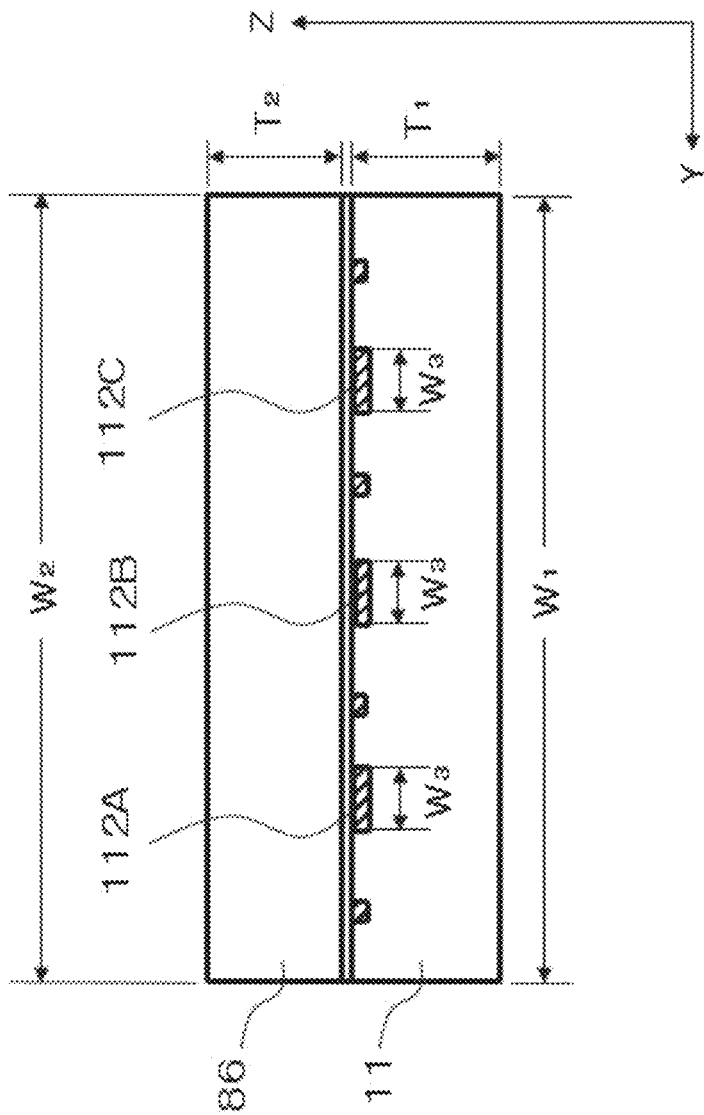
FIG. 23 is a front view illustrating an incident side end facet of the substrate.
Figure 24:
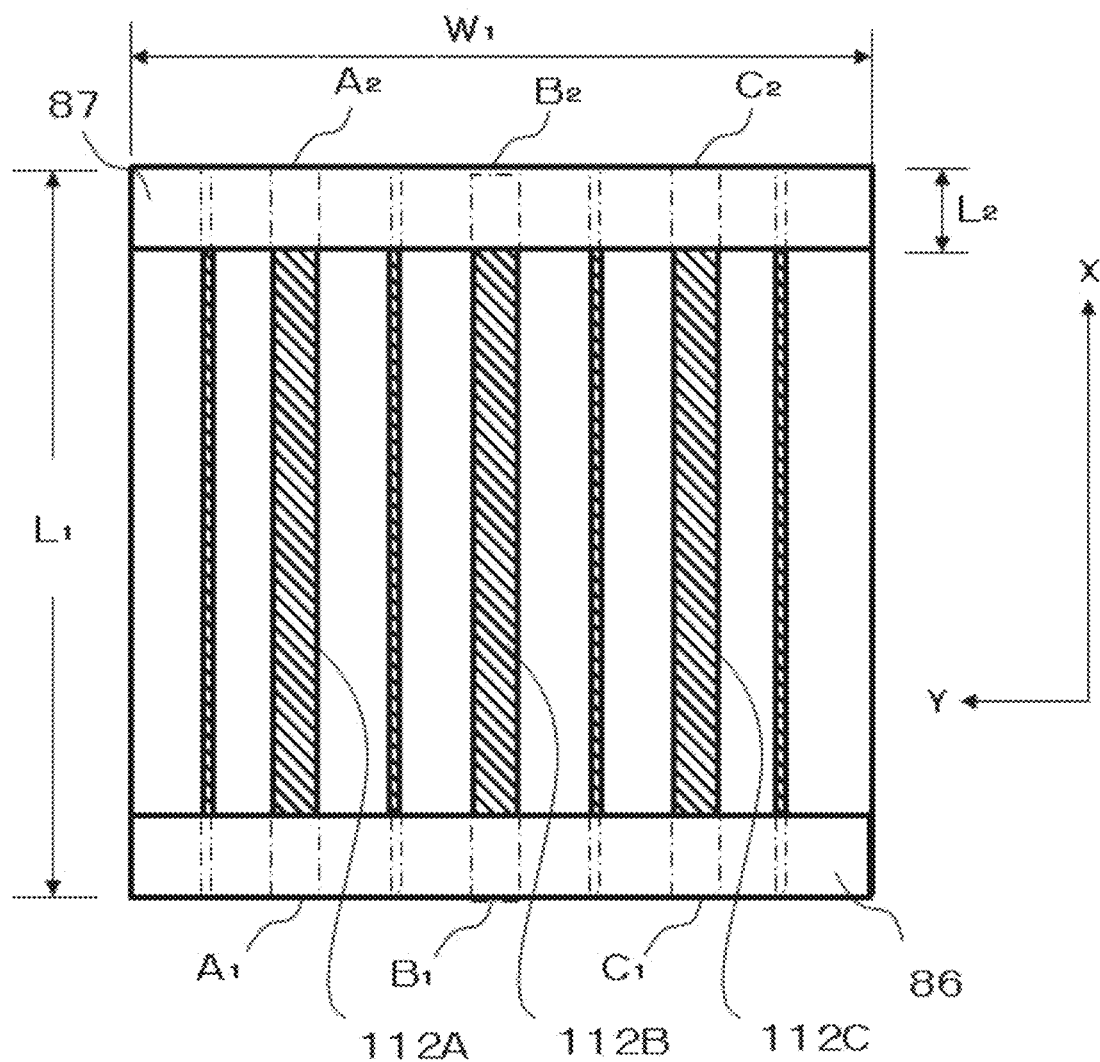
FIG. 24 is a plan view of the substrate.

Here, about a single polarization type optical waveguide formed by a proton exchange method in which only a single polarized component of incident light will be propagated and an orthogonal polarized optical waveguide formed by a Ti diffusion method in which only both of orthogonal polarized components of incident light will be propagated, as shown in FIGS. 22, 23 and 24, three optical waveguides 112A, 112B and 112C were formed on LiNbO$_3$ crystal substrate 11 with a width $W_1$=1.9 [mm], a length $L_1$=27.4 [mm], a thickness $T_1$=0.5 [mm], and protection members 86, 87 with a width $W_2$=1.9 [mm], a length $L_2$=1.5 [mm], a thickness $T_2$=0.5 [mm] were bonded on top of the optical waveguides 112A, 112B and 112C, and by polishing end facets of the LiNbO$_3$ crystal substrate 11 and end facets of the protection members 86, 87 to be LiNbO$_3$ crystal substrate block in which an incident surface and an emission surface of three optical waveguides 112A, 112B and 112C are finished as planes, 10 of 6 types of samples in which a width $W_3$ of optical path of three optical waveguides 112A, 112B and 112C are respectively 6.0 [µm], 6.3 [µm], 6.6 [µm], 6.9 [µm], 7.2 [µm], and 7.5 [µm] were prepared, and a reflection factor at incident surfaces $A_1$, $B_1$, $C_1$ and emission surfaces $A_2$, $B_2$, $C_2$ of three optical waveguides 112A, 112B and 112C were measured to calculate a transmission factor and a finesse of each sample, and results as below were obtained.

That is, a finesse of the orthogonal polarization type optical waveguide was about 30 to 45, but in the single polarization type optical waveguide, a finesse of about 50 to 65 was obtained. Also, a transmission factor of the orthogonal polarization type optical waveguide was about 12.5 to 25 [%], but in the single polarization type optical waveguide, a transmission factor of about 20 to 32.5 [%] was obtained.

In addition, the optical modulator 8A may be operated as so-called reciprocating modulation type optical modulator with configuration as shown in the FIGS. 11A, 11B and 11C, as well as the optical modulator 8, by arranging an emission side reflection film 94 as high reflection film at one end of the optical waveguide 12A formed as a region in which a waveguide mode exists only with respect to a single polarized component, and by arranging the anti-reflection film 63 at the other end.

Also, the optical modulator 8A functions as an optical comb generator 1A by polishing the planes 91, 92 in parallel to each other in the Step S26, and by forming an incident side reflection film 93 and an emission side reflection film 94 over all surface respectively on the polished planes 91, 92, instead of the incident side anti-reflection film 63 and the emission side anti-reflection film 64.

In other words, in the optical comb generator 1A, the incident side reflection film 93 and the emission side reflection film 94 are arranged in parallel with each other in order to resonate light that enters the optical waveguide 12A and form the optical resonator 5 for resonating light by reciprocatingly reflecting light passing through the optical waveguide 12A.

As the first end facet 84 and the second end facet 85 are formed substantially perpendicular relative to the optical waveguide 12A, it is possible to resonate light of single polarized component efficiently by means of the incident side reflection film 93 and the emission side reflection film 94 that are laid respectively on them as a single-layer or multi-layer deposition film.

With the optical comb generator 1A having the above-described configuration, in light that is made to enter it from the outside via the incident side reflection film 93, light of single polarized component is propagated in the forward direction in the optical waveguide 12A and reflected by the emission side reflection film 94, while it is partly transmitted to the outside. Light of single polarized component reflected by the emission side reflection film 94 is propagated in the backward direction in the optical waveguide 12A and reflected by the incident side reflection film 93. As such reflections are repeated, light of single polarized component resonates in the optical waveguide 12A.

Additionally, it is possible to modulate the phase of light deeper by tens of several times than ever by using an electric signal that is synchronized with the time necessary for light to make a round trip in the optical waveguide 12A and driving it to enter from the electrode 83 if compared with light that is made to pass through the optical modulator 8A only once. With this arrangement, it is also possible to generate several hundreds of sidebands over a broad range with the center thereof at the frequency $v_1$ of incident light. Note that all the frequency intervals of adjacent sidebands are equal to the frequency $f_m$ of the input electric signal. Therefore, the optical modulator 8A functions as an optical frequency comb generator 1A for generating an optical comb of single polarized component adapted to use a large number of sidebands, by replacing the incident side anti-reflection film 63 and the emission side anti-reflection film 64 with the incident side reflection film 93 and the emission side reflection film 94.

In other words, the optical comb generator comprises the optical waveguide 12A formed as a region in which a waveguide mode exists only with respect to a single polarized component on the substrate 11 having at least an electrooptic effect such as to penetrate from the incident side reflection film 93 to the emission side reflection film 94 composing a resonating means, so only the single polarized component of light incident via the incident side reflection film 93 is propagated at the optical waveguide 12A, and an optical comb is generated as an optical modulation output of the single polarized component only via the emission side reflection film 94.

Figure 25:
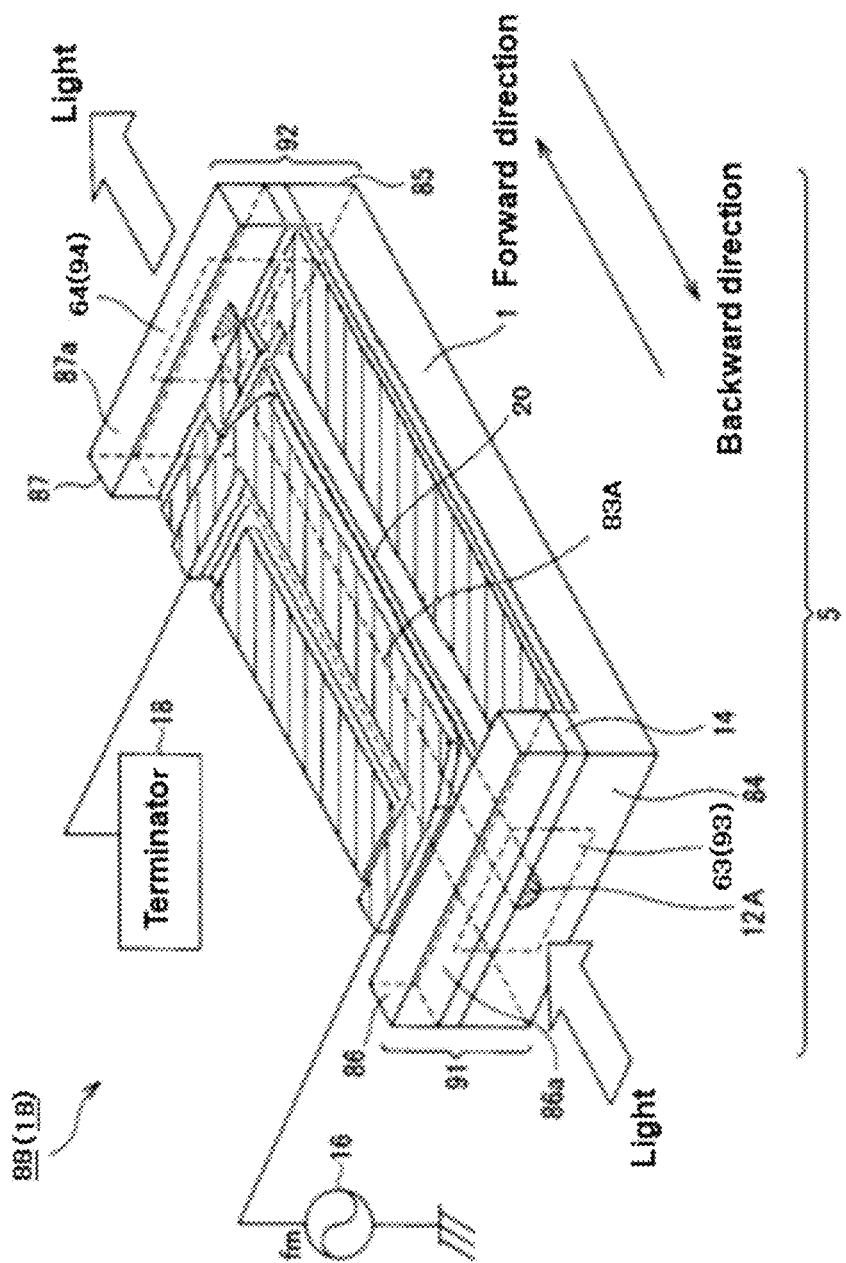
FIG. 25 is a perspective view illustrating a configuration of an optical modulator (optical comb generator) comprising an electrode having a ridge structure according to the present invention.

Here, in the optical modulator 8, 8A and 51 according to the present invention, by configuring the electrode 83 arranged on top of the optical waveguide 12A supplied with a modulation signal to have a ridge structure as a waveguide type optical modulator 8B (optical comb generator 1B) shown in FIG. 25, an efficiency of optical modulation can be further improved.

In the waveguide type optical modulator 8B (optical comb generator 1B), the electrode 83 in the waveguide type optical modulator 8A (optical comb generator 1A) shown in FIGS. 19 and 20 is having a ridge structure, so same components as the optical modulator 8A (optical comb generator 1A) are referred to the explanation in FIGS. 19 and 20, and will not be described here any further.

In the waveguide type optical modulator 8B (optical comb generator 1B), a substrate 11 is typically formed by cutting a large crystal of LiNbO$_3$ or GaAs with a diameter of 3 to 4 inches grown by a pulling method into a wafer. The surface of the substrate 11 produced by cutting is then subjected to a mechanical polishing process and/or a chemical polishing process to provide a protrusion 20 for forming an electrode 83A having a ridge structure.

The optical waveguide 12A is formed as a region in which a waveguide mode exists only with respect to a single polarized component for propagating light of single polarized component such as to penetrate from an incident end to an emission end, by a proton exchange method or a Ti diffusion method.

The refractive index of the layer of the optical waveguide 12A is set to be higher than that of any other layer such as the substrate 11 with respect to a single polarized component. In light that enters the optical waveguide 12A, only a single polarized component is propagated through the optical waveguide 12A as it is totally reflected by the interface thereof.

An LiNbO$_3$ crystal type optical waveguide 12A prepared by the above-described method provides electrooptic effects such as Pockels effect that the refractive index changes in proportion to the intensity of electric field and the Kerr effect that the refractive index changes in proportion to the square of the intensity of the electric field so that it is possible to modulate light of single polarized component, utilizing such physical phenomena.

The electrode 83A having a ridge structure includes a main electrode formed on the protrusion 20, and composed of metal materials such as Ti, Pt, or Au. The electrode 83A having a ridge structure in which the main electrode is formed on the protrusion 20 modulates the phase of light propagating through the optical waveguide 12A by driving and inputting the modulation signal of frequency $f_m$ supplied from the oscillator 16 into the optical waveguide 12A.

Now, the method of preparing an optical modulator 8B (optical comb generator 1B) according to the present invention will be described below by referring to FIG. 26.

Firstly, in Step S31, a photoresist pattern 13 is formed on a surface of a substrate 11 made of LiNbO$_3$ crystal as shown in FIG. 26A.

Then, in Step S32, as shown in FIG. 26B, an optical waveguide 12A is formed as a region in which a waveguide mode exists only with respect to a single polarized component by a proton exchange method for exchanging Li at a surface layer of the substrate 11 with H$^+$, by heating the substrate 11 of LiNbO$_3$ crystal in which the photoresist pattern 13 is formed on the surface thereof in a condition that the substrate 11 is immersed in a proton exchange liquid such as a benzoic acid.

In addition, a process for forming the optical waveguide 12A of these Steps S31 and S32 is not limited to a proton exchange method, and for example it may be alternated to a Ti diffusion method, wherein, in Step S31, a photoresist pattern 13 is formed on a surface of a substrate 11 made of LiNbO$_3$ crystal and Ti is deposited on the surface of the substrate 11 made of LiNbO$_3$ crystal, and the photoresist is removed to produce Ti micro-wires having a width of microns, and then, in Step S32, Ti atoms are thermally diffused in the substrate 11 to form an optical waveguide 12A as a region in which a waveguide mode exists only with respect to a single polarized component by heating the substrate 11 where Ti micro-wires are formed.

Figure 27:
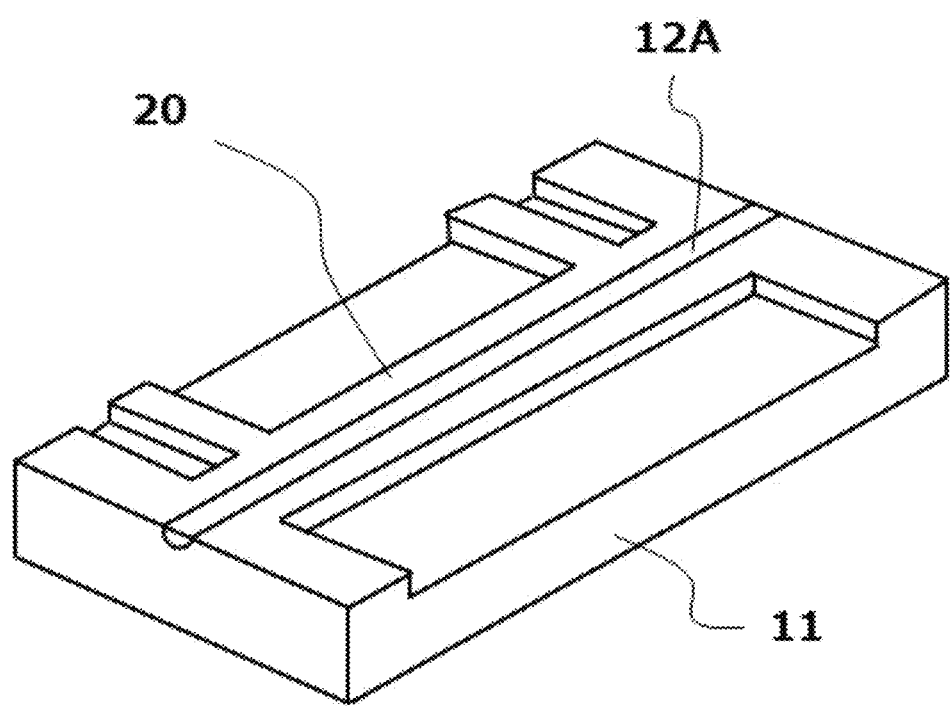
FIG. 27 is a perspective view illustrating a substrate forming an electrode having a ridge structure of the optical modulator (optical comb generator).

Then, in Step S33, the photoresist pattern 13 of the substrate 11 formed on the optical waveguide 12A is removed, and further, a protrusion 20 for forming an electrode 83A having a ridge structure, as shown in FIG. 27, by a mechanical polishing process, a chemical polishing process, or the like.

Then, in Step S34, an SiO$_2$ thin film is deposited as a buffer layer 14 on the surface of the substrate 11 as shown in FIG. 26D. In this Step S23, a buffer layer 14 may be formed by applying an SiO$_2$ wafer to the surface of the substrate 11. If such is the case, the film thickness may be controlled by polishing the deposited buffer layer 14, considering the region for arranging an electrode in Step S35, which will be described hereinafter.

Then, in Step S35, the electrode 83A having a ridge structure is formed on the buffer layer 14 of the substrate 11 as shown in FIG. 26E. The electrode 83A having a ridge structure is shown in a sectional view of main part of FIG. 28.

Then, in Step S36, protection members 86, 87 are bonded to an upper part of the optical waveguide 12A as shown in FIG. 26F. The protection members 86, 87 may be bonded by means of an adhesive agent or by means of some other direct bonding method. When the substrate 11 is made of LiNbO$_3$ crystal, the protection members 86, 87 may also be made of the same material as LiNbO$_3$. In Step S36, the applied protection members 86, 87 are cut so as to make their end facets 86*a*, 87*a* form planes 91, 92 with the first end facet 84 and the second end facet 85 of the substrate 11 respectively.

In the optical modulator 8B according to the present invention, in the last step of Step S37, the obtained planes 91, 92 are polished to planes perpendicular to the optical waveguide 12A as shown in FIG. 26G. Then, an incident side anti-reflection film 63 and an emission side anti-reflection film 64 are formed respectively on the entire polished planes 91, 92.

Also, in an optical comb generator 1B according to the present invention, the planes 91, 92 are polished in parallel to each other in the Step S37, and an incident side reflection film 93 and an emission side reflection film 94 are formed over all surface respectively on the polished planes 91, 92 perpendicular to the optical waveguide 12A, instead of the incident side anti-reflection film 63 and the emission side anti-reflection film 64.

In the optical modulator 8B and the optical comb generator 1B having such configuration, a phase of light of single polarized component propagating the optical waveguide 12 by entering from an incident end can be modulated efficiently, by a modulation signal of frequency $f_m$ supplied from the oscillator 16 to the electrode 83A having a ride structure.

Also, in the optical modulator 8B and the optical comb generator 1B according to the present invention, the end facets of the optical waveguide 12A are moved substantially to the centers of the respective planes 91, 92, by bonding the protection members 86, 87 at the respective ends, so chips and roundedness of end facets of the optical waveguide 12A is minimized, perpendicularity between the optical waveguide 12A and the planes 91, 92 is secured, accuracy of polishing the planes 91, 92 is improved, and yield is also improved.

Also, in the optical comb generator 1B, in light that is made to enter it from the outside via the incident side reflection film 93, light of single polarized component is propagated in the forward direction in the optical waveguide 12A and reflected by the emission side reflection film 94, while it is partly transmitted to the outside. Light of single polarized component reflected by the emission side reflection film 94 is propagated in the backward direction in the optical waveguide 12A and reflected by the incident side reflection film 93. As such reflections are repeated, light of single polarized component resonates in the optical waveguide 12A.

Additionally, it is possible to modulate the phase of light deeper by tens of several times than ever by using an electric signal that is synchronized with the time necessary for light to make a round trip in the optical waveguide 12A and driving it to enter from the electrode 83 if compared with light that is made to pass through the optical modulator 8B only once. With this arrangement, it is also possible to generate several hundreds of sidebands over a broad range with the center thereof at the frequency $v_1$ of incident light. Note that all the frequency intervals of adjacent sidebands are equal to the frequency $f_m$ of the input electric signal. Therefore, the optical modulator 8B functions as an optical frequency comb generator 1B for generating an optical comb of single polarized component adapted to use a large number of sidebands.

The optical comb generator 1B according to the present invention comprises the optical waveguide 12A formed as a region in which a waveguide mode exists only with respect to a single polarized component on the substrate 11 having at least an electrooptic effect such as to penetrate from the incident side reflection film 93 to the emission side reflection film 94 composing a resonating means, so only the single polarized component of light incident via the incident side reflection film 93 is propagated at the optical waveguide 12A, and an optical comb is generated as an optical modulation output of the single polarized component only via the emission side reflection film 94. Also, as protection members 86, 87 are bonded to the respective ends of the optical comb generator 1B, the end facets of the optical waveguide 12A that are conventionally located at the top corners of the end facets are now located substantially at the centers of the planes 91, 92. As a result, if the corner of either of the planes 91, 92 is chipped in the polishing operation in Step S37, the corresponding end facet of the optical waveguide 12A is not chipped. In other words, the end facets of the optical waveguide 12A can hardly be chipped. Thus, it is possible to minimize the loss of light from either of the end facets of the optical waveguide 12A.

Figure 28:
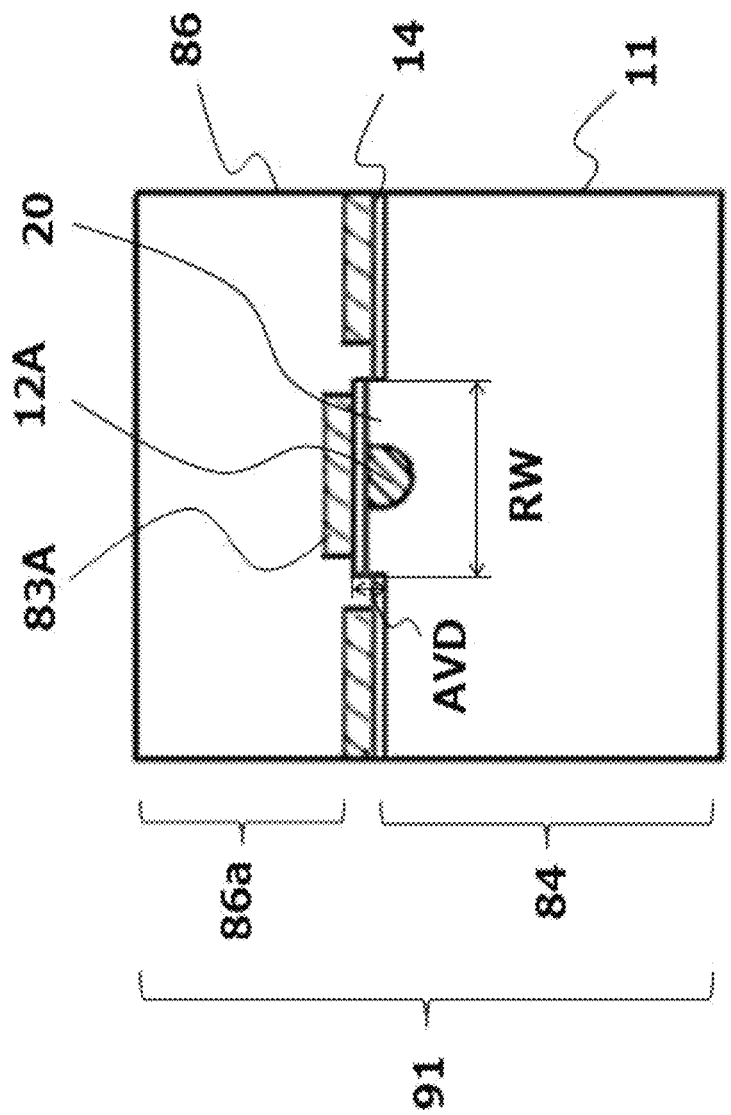
FIG. 28 is sectional front view of main part illustrating an electrode having a ridge structure of the optical modulator (optical comb generator).

Also, the optical modulator 8B comprises the electrode 83A having a ridge structure and formed on the buffer layer 14 of the substrate 11, as shown in a sectional view of main part of FIG. 28, so a modulation efficiency can be further improved.

Figure 29:
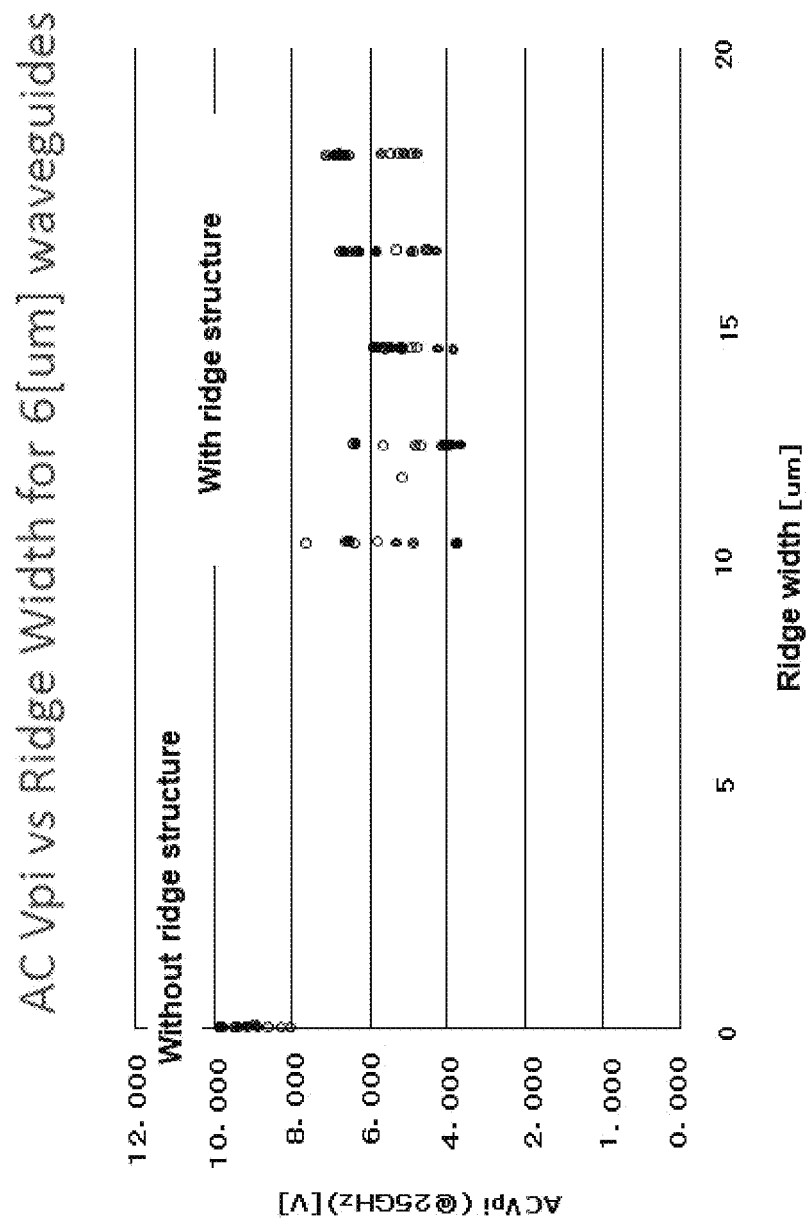
FIG. 29 is a view for explaining about a result of measuring a change of a drive voltage (AC Vpi) in 25 GHz with or without a ridge structure of an electrode for an optical modulator according to the present invention.
Figure 30:
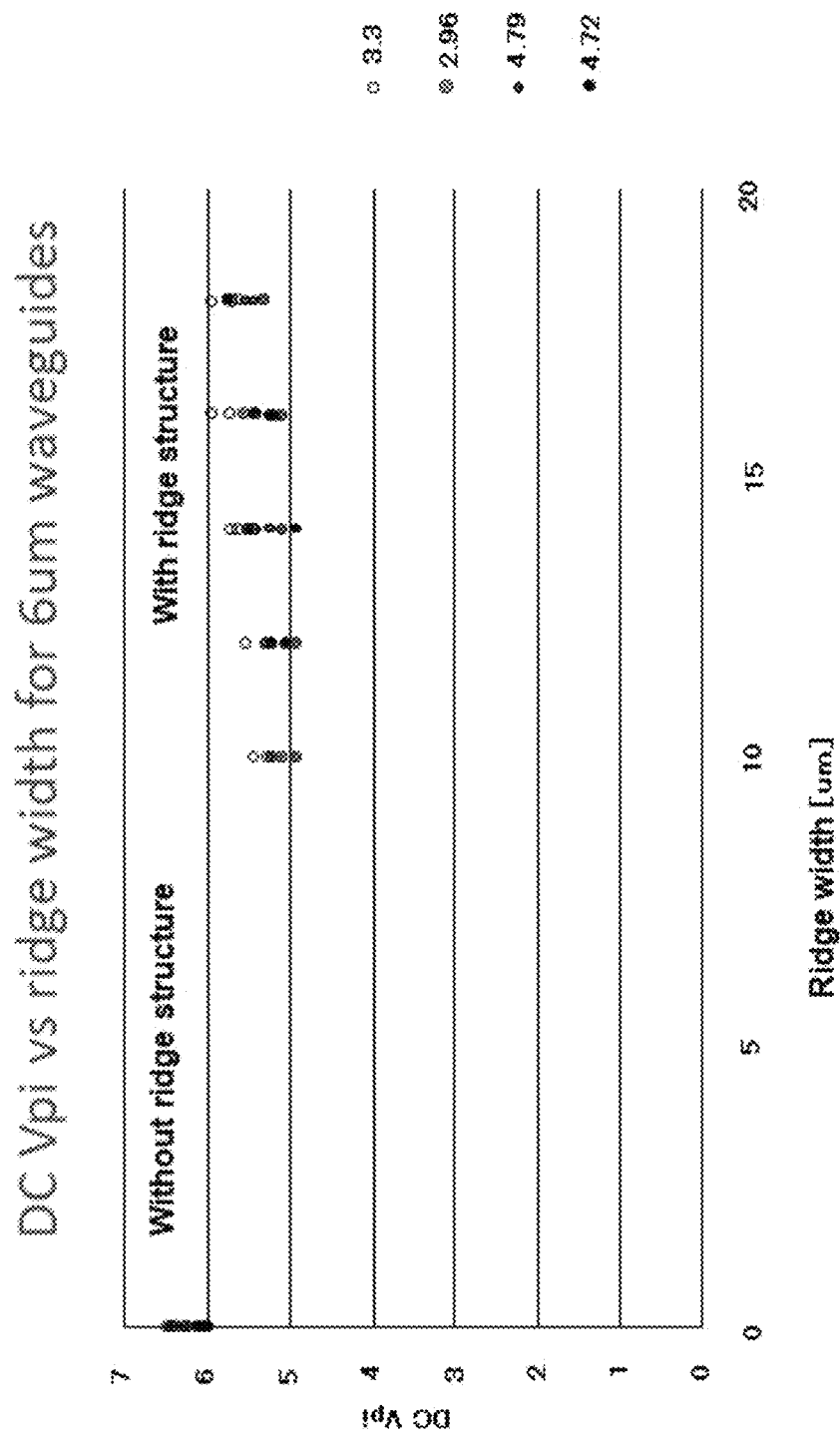
FIG. 30 is a view for explaining about a result of measuring a change of a direct current drive voltage (DC Vpi) with or without a ridge structure of an electrode for an optical modulator according to the present invention.

Here, samples of the optical modulator 8B in which a ridge width Rw of the electrode 83A having a ridge structure and formed on the buffer layer 14 of the substrate 11 were 10, 12, 14, 16 and 18 [μm], and an average depth AVD of a ridge groove were 3.3, 2.96, 4.79 and 4.72 [μm], were formed, and results of measuring a drive voltage (AC Vpi) in 25 GHz and a direct current drive voltage (DC Vpi) are shown in FIGS. 29 and 30. Vpi is a voltage required for π radian modulation of a phase.

That is, in a conventional optical modulator with an electrode structure not having a ridge structure, a drive voltage (AC Vpi) in 25 Ghz was about 8 to 10 V and a direct current drive voltage (DC Vpi) was about 6 to 6.5 V, but in the optical modulator 8B comprising the electrode 83A having a ridge structure, a drive voltage (AC Vpi) in 25 Ghz was about 3.5 to 7.5 V and a direct current drive voltage (DC Vpi) was about 5 to 6V By arranging a ridge structure as such, an average voltage of a drive voltage (AC Vpi) in 25 Ghz was reduced to about 70% of that of a conventional optical modulator with an electrode not having a ridge structure, and it corresponds to about 50% reduction in electric power. Also, an average voltage of a direct current drive voltage (DC Vpi) was reduced to about 80% of that of conventional optical modulator with an electrode not having a ridge structure, and it corresponds to about 50% reduction in electric power.

That is, the optical modulator 8B and the optical comb generator 1B comprises a first protection member 86 and a second protection member 87 composed of a member having same stiffness as the substrate 11 of the optical waveguide 12A and arranged on top of the optical waveguide 12A such that at least one end facet of each of the protection members 86, 87 forms an identical plane with an end facet of the substrate 11 including an optical incident end or an optical emission end in the optical waveguide 12A, and an incident side anti-reflection film 63 or an incident side refection film 93 and an emission side snit-reflection film 64 or an emission side reflection film 94 are laid as single-layer or multi-layer deposition films on planes perpendicular to the optical waveguide 12A formed by polishing end facets of the substrate and the end facet of each of the protection members, so chips of the end facet of the optical waveguide can be prevented, mounting of high reflection film is stabilized, and a finesse of the optical resonator 5 composed of the incident side reflection film 93 and the emission side reflection film 94 is improved, and also, a drive power can be reduced by comprising the electrode 83A having a ridge structure.

Therefore, in the optical modulator 8A, 8B configured as the above, and in the optical modulator 51, members 86, 87 having same stiffness as the substrate 11 for forming the optical waveguide 12A from a top surface thereof is arranged on top of the optical waveguide 12A such that at least one end facet of each of the members 86, 87 forms an identical plane with an end facet of the substrate 11 including an optical incident end or an optical emission end in the optical waveguide 12A, and an incident side refection film 93 and an emission side reflection film 94 composed of single-layer or multi-layer deposition films composing a resonating means are laid on planes perpendicular to the optical waveguide 12A formed by polishing end facets of the substrate 11 and the end facet of each of the members 86, 87, so the chips and the roundedness of the corner of the end facet of the optical waveguide are minimized in the polishing process and the reflection film is laid reliably and prevented from being peeled off at the corner of the top of the end facet to improve the reflection factor of the reflection film and the finesse of the resonator and to improve the performance of the device. Also, the optical modulator 8A, 8B, 51 comprises the optical waveguide 12A formed as a region in which a waveguide mode exists only with respect to a single polarized component on the substrate 11 having at least an electrooptic effect such as to penetrate from the incident side reflection film 93 to the emission side reflection film 94 composing a resonating means, so only the single polarized component of light incident via the incident side reflection film 93 is propagated at the optical waveguide 12A, and it functions as an optical comb generator 1, 1A capable of generating a stable optical comb as an optical modulation output of a single polarized component only via the emission side reflection film 94.

The optical waveguide 12A of the optical modulator 8b, 51 as described above is formed as a region in which a waveguide mode exists only with respect to a single polarized component on the substrate 11 having at least an electrooptic effect such as to penetrate from the incident side reflection film 93 to the emission side reflection film 94, and comprises the electrode 83A having a ridge structure, so a low power type laser light source or an optical comb generator capable of outputting an optical comb or a laser light of single polarized component only can be built.

Also, in the optical modulator 8A, 8B (optical comb generator 1A, 1B), by depositing reflection films 93, 94 with a reflection factor in a range of 95% to 99%, a waveguide loss factor of the optical waveguide 12A can be matched with a transmission factor of the reflection films 93, 94 to improve a transmission factor and a finesse of a resonator, and a performance of the resonator can be improved.

Figure 31:
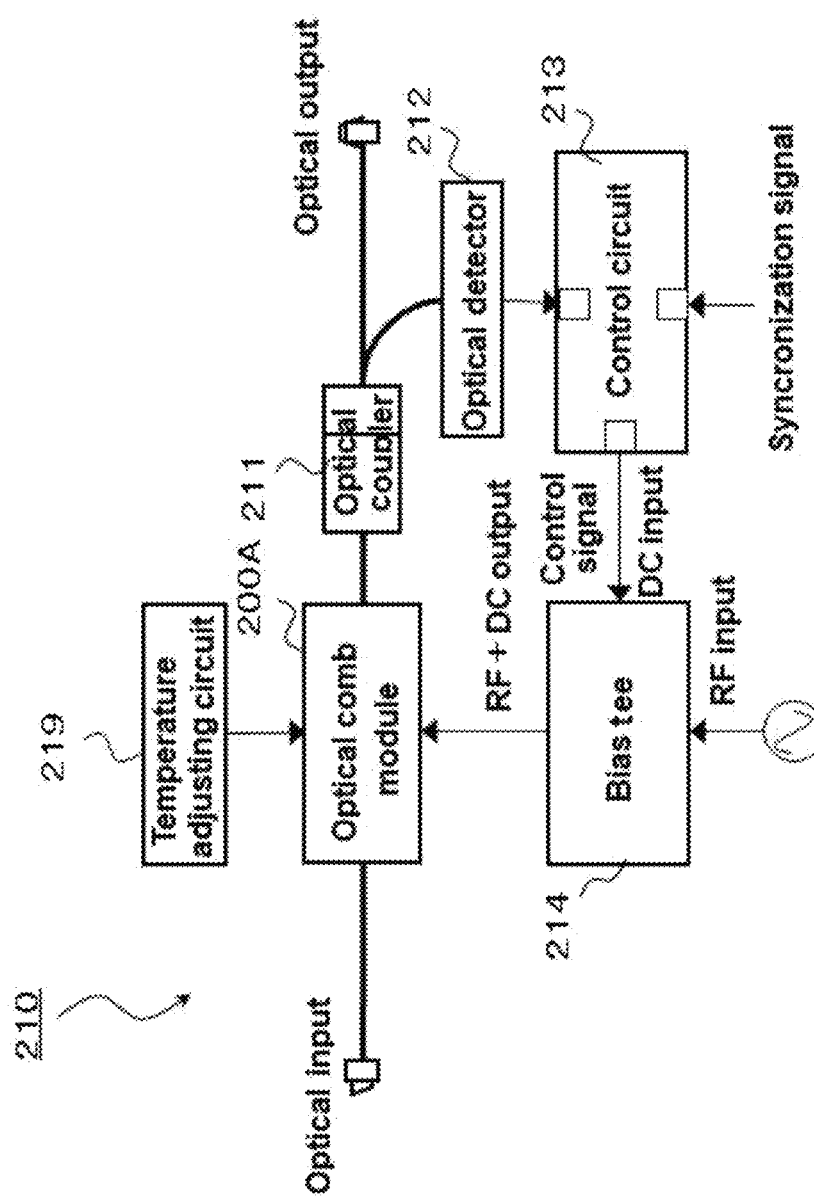
FIG. 31 is a block diagram illustrating an example of a configuration of an optical comb generator using a low power type optical comb module according to the present invention.

Next, a configuration of an optical comb generator 210 using a low power type optical comb module according to the present invention is shown in a block diagram of FIG. 31.

The optical comb generator 210 comprises: an optical coupler 211 for branching a part of optical comb output from the low power type optical comb module 200A according to the present invention; an optical detector 212 for detecting light branched by the optical coupler 211; a control circuit 213 for supplying an optical detection signal obtained by the optical detector 212, and else.

The low power type optical comb module 200A generates and outputs an optical comb by entering a laser light emitted from a laser light source (not shown) and inputting a RF modulation signal via a bias tee 214, and by modulating a phase of a single polarized component of incident laser light by a RF modulation signal. The optical comb module 200A is configured such that a resonant length of a resonating means composed of an incident side reflection film and an emission side reflection film arranged at an optical waveguide by controlling a temperature by a temperature adjusting circuit 219.

The control circuit 213 calculates an error with respect to a control target from an optical detection signal, and generates a control signal such that the error will be zero and supplies the control signal to the bias tee 214.

By applying a DC bias of the optical comb module 200A, a resonant frequency of the optical comb module 200A can be made to follow an input laser frequency.

The control circuit 213 may be single printed substrate, or may be a combination of a printed substrate and a RF mixer or an isolator. A control signal according to an amount of error with respect to a control target is generated by a mixing of a synchronization signal and an optical detection signal of the optical detector 212.

A part of output of a RF modulation signal source can be used as a synchronization signal. In that case, it is necessary that an operation range of the optical detector 212 is equal to or more than a RF drive frequency.

In the control circuit 213, an error signal is generated by removing a low frequency component of a signal obtained by inputting a synchronization signal and an optical detection signal to a mixer via a phase adjuster. Or other modulation signal (dither signal) can be used as a RF drive signal as a synchronization signal. A mixing of a synchronization signal and an output signal of the optical detector 212 is performed while applying a modulation with amplitude smaller than a FSR of a resonant mode to a resonant frequency of the optical comb module 200A or a laser frequency. If a dither signal frequency is low, an error signal can be generated by a product-sum operation of a digital signal processing after converting an optical detection signal to a digital signal by an analogue to digital converter.

An error signal in which a frequency characteristic is adjusted is added to a DC bias of the optical comb module 200A via the bias tee 214 as a control signal. Generally, an error signal is input to a circuit having each of proportional, integral and differential function, and a frequency characteristic of a control loop is determined by an amplitude adjustment of these components, and a resonant frequency of the optical comb module 200A is controlled to follow an oscillating frequency of an input laser.

Figure 32:
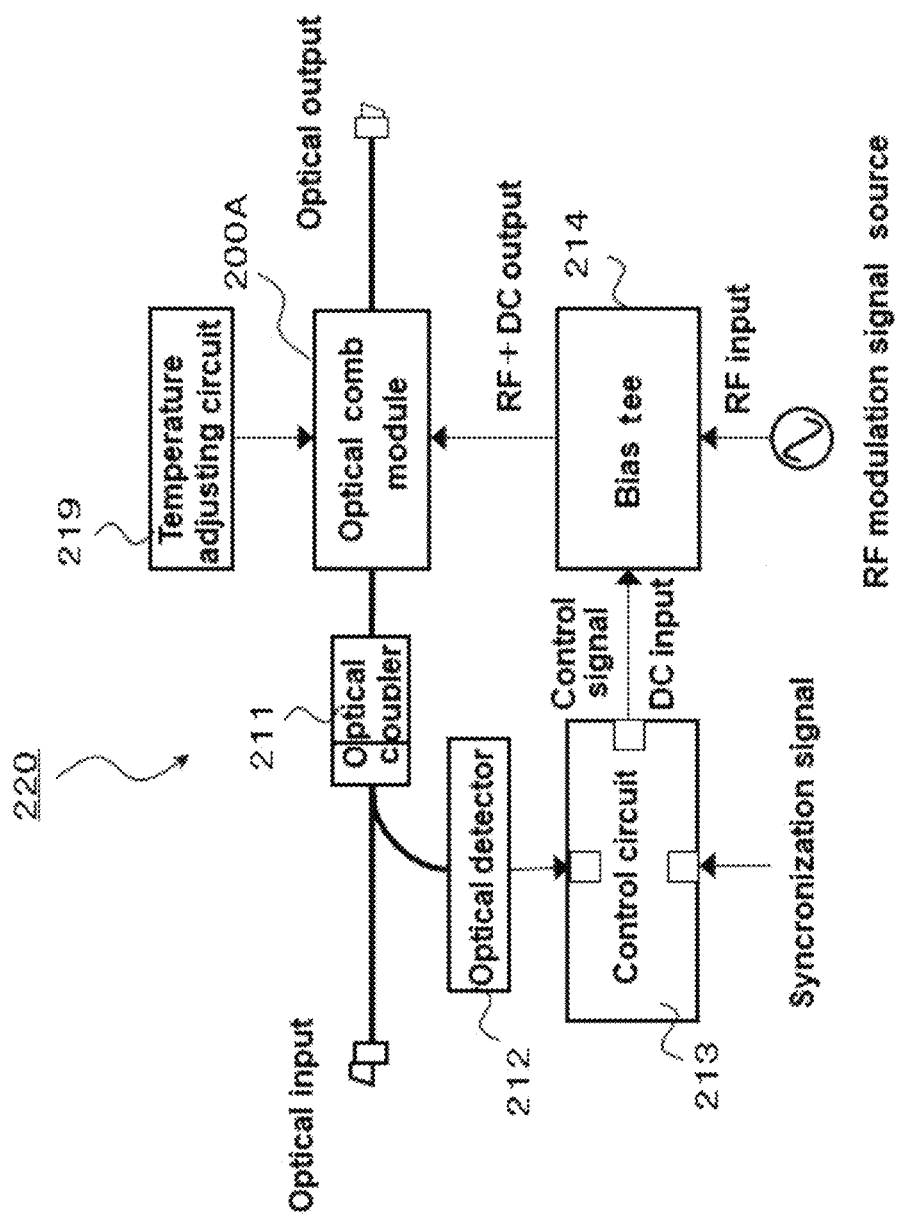
FIG. 32 is a block diagram illustrating an example of other configuration of an optical comb generator using a low power type optical comb module according to the present invention.

In addition, a configuration of an optical comb generator 220 using a low power type optical comb module according to the present invention is shown in a block diagram of FIG. 32.

This optical comb generator 220 controls a resonator by using a reflected light of a low power type optical comb module 200A according to the present invention, and a part of a reflected light of the low power type optical comb module 200A is branched by an optical coupler 211 to enter an optical detector 212.

Each component of the optical comb generator 220 are same as the components of the optical comb generator 210 shown in FIG. 31, and corresponding components are denoted by the same reference symbols in FIG. 32 and will not be described here any further.

The control circuit 213 calculates an error with respect to a control target from an optical detection signal obtained by the optical detector 212, and outputs a control signal such that the error will be zero. By adding a DC bias of the optical comb module to the control signal, a resonant frequency of the optical comb module 200A can be made to follow an input laser frequency.

Figure 33:
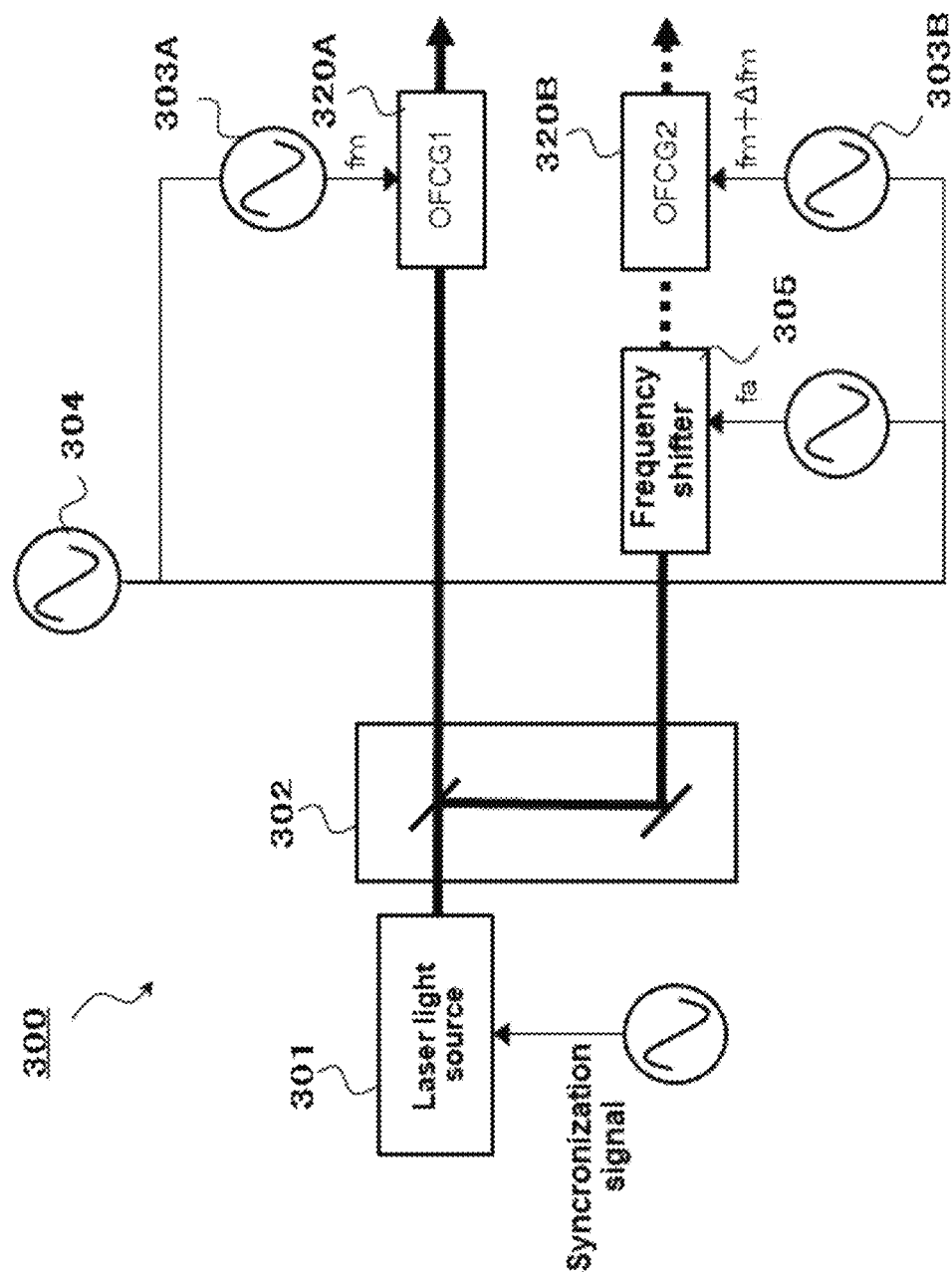
FIG. 33 is a block diagram illustrating an example of a configuration of an optical comb light source built by using a low power type optical comb module according to the present invention.

Further, the low power type optical comb module according to the present invention can build an optical comb light source 300 with a configuration as shown in FIG. 33.

This optical comb light source 300 comprises: a laser light source 301 of a single frequency oscillation; a separation optical system 302 such as a light beam splitter or an optical coupler for separating a laser light of single frequency emitted from the laser light source 301 into two laser lights; a frequency shifter 305 for shifting a frequency of one of laser lights separated by the separation optical system 302; two optical comb generators (OFCG1, OFCG2) 320A, 320B respectively using the low power type optical comb module; and else.

In this optical comb light source 300, a laser light emitted from one laser light source 301 of a single frequency oscillation is separated by the separation optical system 302 into two laser lights to be input into two optical comb generators (OFCG1, OFCG2) 320A, 320B.

Two optical comb generators 320A, 320B are driven by oscillators 303A, 303B for oscillating in a frequency $f_m$ and a frequency $f_m + \Delta f_m$ different to each other. A relative frequency of frequencies $f_m$ and $f_m + \Delta f_m$ of respective oscillators 303A, 303B will be stable by a phase synchronization by a common reference oscillator 304. A frequency shifter 305 such as an audio optical frequency shifter (AOFS) is arranged before the optical comb generator (OFCG2) 320B, and an optical frequency shift of a frequency fa is applied to an input laser light by this frequency shifter 305. In this way, a beat frequency between carrier frequencies will be an alternate current signal of frequency fa, and not a direct current signal. As a result, a beat signal of high frequency side sidebands and a beat signal of low frequency side sidebands of carrier frequencies will be generated in a frequency region in which beat signals will be opposed to each other by interposing a beat frequency fa between carrier frequencies, so it is suitable for a comparison of phase.

Two optical comb generators (OFCG1, OFCG2) 320A, 320B are respectively composed of the low power type optical comb module according to the present invention, and capable of outputting an optical comb of a single polarized component by modulating a phase of only a single polarized component of input laser light.

This optical comb light source 300 generates two optical combs having different frequency intervals and a center frequency of two optical comb generators (OFCG1, OFCG2) 320A, 320B, with one laser light source 301 of a single frequency oscillation as common, and by using the optical comb light source 300, for example as first and second light sources in an optical three-dimensional measuring device or a distance meter relating to Japanese Patent No. 5231883 previously proposed by the inventors of the present invention, in other words, as first and second light sources in which an intensity and a phase are periodically modulated respectively, and emit a reference light and a measuring light with a coherence and with mutually different modulation period, so it is possible to build a measurement system of an optical three-dimensional measuring device or a distance meter with a stable measurement operation by irradiating an optical comb output for measuring a polarized component of two optical comb generators (OFCG1, OFCG2) 320A, 320B while scanning a surface of an object to be measured, and by detecting reflected light from a surface for each point of irradiation points to calculate a distance (height).

Figure 34:
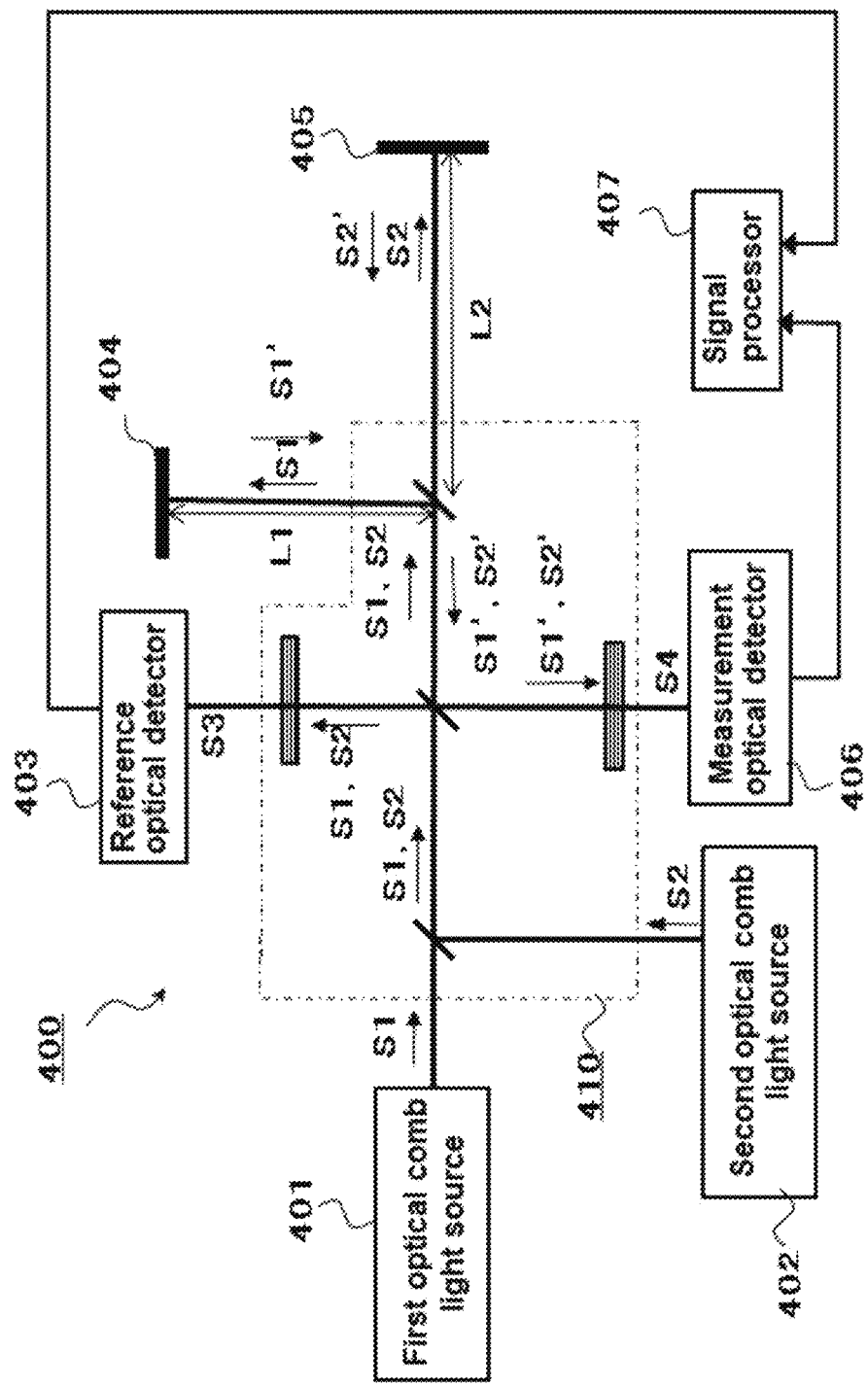
FIG. 34 is a block diagram illustrating a configuration of an optical comb distance meter composed by using the optical comb light source.

FIG. 34 is a block diagram illustrating a configuration of an optical comb distance meter 400 composed by using the optical comb light source 300.

The optical comb distance meter 400 shown in a block diagram of FIG. 34 is to measure a distance by using an optical frequency comb interferometer, and two optical frequency combs with frequency intervals different from a center frequency emitted from first and second optical comb light sources 401, 402 are periodically modulated of its intensity or phase respectively, and irradiated on a reference surface 404 and a measuring surface 405 as a reference light S1 and a measuring light S2 with a coherence and with mutually different modulation period, and an interfering light S3 of the reference light S1 and the measuring light S2 irradiated on the reference surface 404 and the measuring surface 405 is detected by a reference optical detector 403, and also, an interfering light S4 of a reference light S1' reflected by the reference surface 404 and a measuring light S2' reflected by the measuring surface 405 is detected by a measurement optical detector 406, and a difference between a distance L1 to the reference surface 404 and a distance L2 to the measuring surface 405 can be calculated from a refractive index in a measuring wavelength and a light speed, from a time difference between an interfering signal detected the interfering light S3 by the reference optical detector 403 and an interfering signal detected the interfering light S4 by the measurement optical detector 406, by a signal processor 407.

By combining with an optical scanning device, this optical comb distance meter 400 irradiates the measuring light A2 to a surface of an object to be measured while scanning it, and a reflected light from the surface is detected for each point of irradiation points by calculating a distance (height), and an optical comb shape measuring device capable of obtaining a surface shape of the object can be configured from a distribution of distance (height) and a coordinate of a scan. There are various forms to a scanner optical system. By using a telecentric optical system, a light can be made to enter approximately perpendicular to the object within a measuring scope.

Also, by using the optical comb light source 300 as a light source in a vibration measuring device relating to Japanese Patent No. 5336921 or Japanese Patent No. 5363231 previously proposed by the present inventors, in other words, as a light source for emitting a reference light and a measuring light with coherence and in which a phase is mutually synchronized, with mutually different modulation frequency and center frequency, and having a spectrum with predetermined frequency intervals, optical combs of single polarized component emitted from two optical comb generators (OFCG1, OFCG2) 320A, 320B are irradiated at different places according to a wavelength via an element to separate the optical combs per wavelength, and a measuring system of a vibration measuring device for performing a stable multipoint vibration measuring can be configured.

Figure 4:
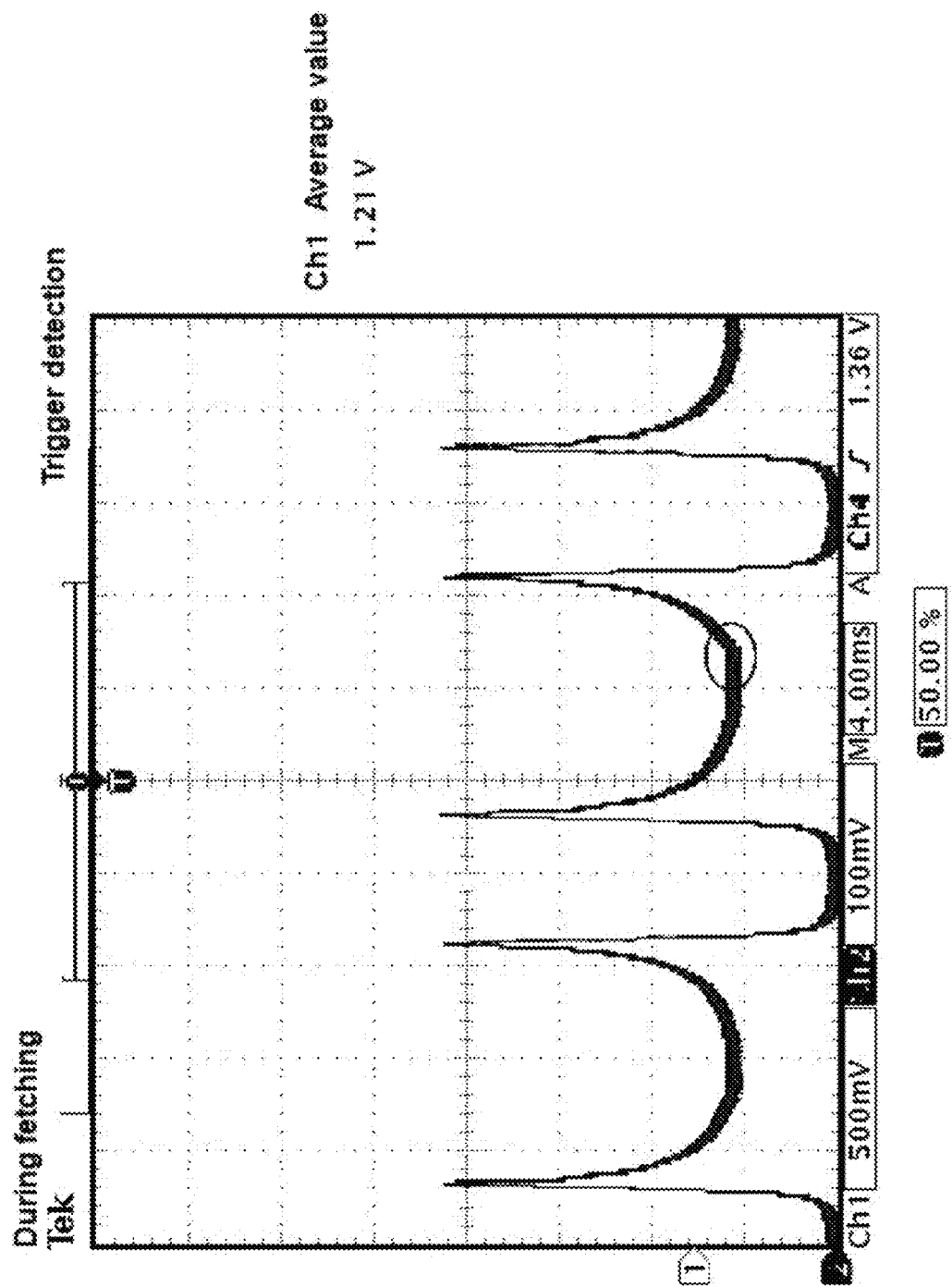
FIG. 4 is a characteristic chart illustrating a change in shape of a transmission mode waveform by orthogonal polarized components generated when feedback controlling a resonant length of an optical resonator in a known optical comb generator using an optical waveguide for transmitting a polarized component including a mix of an orthogonal mode.
Figure 35:
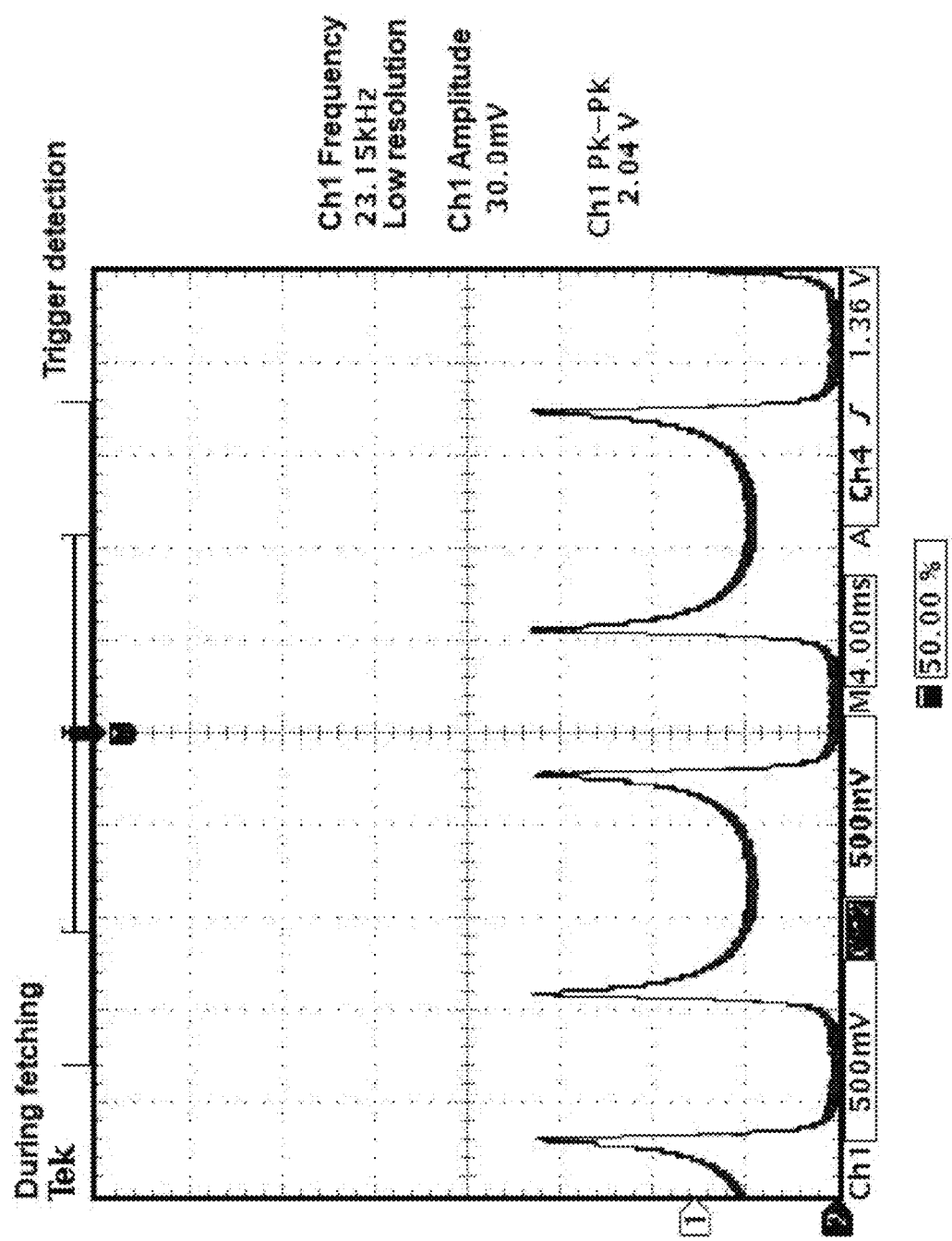
FIG. 35 is a characteristic chart illustrating a transmission mode waveform without a change in shape obtained when feedback controlling a resonant length of an optical resonator in an optical comb generator using an optical waveguide transmitting only a single polarized component according to the present invention.

Here, in a measuring device using an optical comb obtained by an optical comb generator using an optical waveguide for transmitting a polarized component including a mix of an orthogonal mode, as shown by a circle mark in FIG. 4, there is a case that a change in shape of a transmission mode waveform by orthogonal polarized components occurs, and also, a place of its occurrence (relative position with respect to a main mode) is dispersed, and it will be a destabilizing factor of control as there will be plural minimum parts, but there will be no change in shape of a transmission mode waveform as shown in FIG. 35, by using an optical waveguide transmitting only a single polarized component, so it is possible to stabilize as an optical comb generator, improve an accuracy of a measuring device including an optical comb, and reduce an error.

That is, a polarized component orthogonal to an optical comb generation will be a cause of measurement error of a distance and a height when using an optical comb for a measurement, and also, a polarized component orthogonal to an optical comb generation destabilizes a control for matching a resonant frequency of an optical comb generator with a laser frequency, and it will be a cause of an oscillation of control and a deviation of control point, and also, when using an optical comb for a measurement, it was a cause of measurement error of a distance and a height, but by performing an optical comb generation using an optical waveguide for transmitting only a single polarized component, an output of an orthogonal polarized components which do not contribute to an optical comb generation is inhibited, a polarization extinction ratio of an optical comb output is improved, a single polarization degree is increased, a control of a resonator is stabilized, unnecessary interfering signal is removed, and an measurement error in a measurement of shape or a measurement of distance using an optical comb is removed to achieve an accuracy of measurement, and to achieve an improvement of reliability of an entire system.

Glossary of Drawing References 1, 1A, 1B, 210, 220, 320A, 320B Optical comb generator
5 Optical resonator
8, 8A, 8B, 51 Optical modulator
11 Substrate
12, 12A Optical waveguide
14 Buffer layer
16 Oscillator
18 Terminator
19a Phase shifter
19b Reflector
20 Protrusion
21 Optical circulator
22 Focuser
63 Anti-reflection film
83, 83A Electrode
84 First end facet
85 Second end facet
86 First protection member
86a, 87a End facet
87 Second protection member
91, 92 Plane
93 Incident side reflection film
94 Emission side reflection film
200A Low power type optical comb module
210, 220 Optical comb generator
211 Optical coupler
212 Optical detector
213 Control circuit
214 Bias tee
130, 300 Optical comb light source
301 Laser light source
302 Separation optical system
303A, 303B Oscillator
304 Reference oscillator
305 Frequency shifter
320A, 320B Optical comb generator (OFCG1, OFCG2)
400 Optical comb distance meter
401, 402 Optical comb light source
403 Reference optical detector
404 Reference surface
405 Measuring surface
406 Measurement optical detector
407 Signal processor

The invention claimed is:

1. A method for preparing an optical resonator for propagating and resonating light incident via an incident side reflection film by an optical waveguide formed to penetrate from the incident side reflection film to an emission side reflection film, wherein the method comprises:
   an optical waveguide forming process for forming the optical waveguide from a top of a substrate;
   an arranging process for arranging protection members having same stiffness as the substrate on top of the optical waveguide such that at least one end facet of each of the protection members forms an identical plane with an end facet of the substrate including an optical incident end or an optical emission end in the optical waveguide;
   a polishing process for forming a plane perpendicular to the optical waveguide as a flat polished surface including the optical incident end or the optical emission end in the optical waveguide by polishing the end facet of the substrate and the end facet of one of the protection members arranged in the arranging process; and
   a reflection film laying process for laying a single-layer or multi-layer deposition film as the incident side reflection film or the emission side refection film on the plane formed in the polishing process,
   wherein, in the arranging process, the protection members are arranged on top of the optical waveguide by attaching by an adhesive,
   in the reflection film laying process, the incident side reflection film or the emission side reflection film is formed on the plane perpendicular to the optical waveguide, by laying the multi-layer deposition film with a reflection factor of 95% or more all over the plane formed by the end facet of the substrate and the end facet of one of the protection members attached by the adhesive, in a temperature condition lower than a heat-resistant temperature of the adhesive without diffusing a gas component from the adhesive after hardening.

2. A method for preparing an optical modulator for propagating and modulating light incident via an incident side reflection film by an optical waveguide in which the incident side reflection film and an emission side reflection film are formed, wherein the method comprises:
   an optical waveguide forming process for forming the optical waveguide from a top of a substrate;
   a laminating process for laminating a buffer layer on the substrate to cover at least the optical waveguide formed in the optical waveguide forming process;
   an electrode forming process for forming an electrode for applying an electric field to the optical waveguide on the buffer layer laminated in the laminating process;
   an arranging process for arranging protection members having same stiffness as the substrate on top of the optical waveguide such that at least one end facet of each of the protection member forms an identical plane with an end facet of the substrate including an optical incident end or an optical emission end in the optical waveguide;

a polishing process for forming a plane perpendicular to the optical waveguide as a flat polished surface including the optical incident end or the optical emission end in the optical waveguide by polishing the end facet of the substrate and the end facet of one of the protection members arranged in the arranging process; and a reflection film laying process for laying a single-layer or multi-layer deposition film as the incident side reflection film or the emission side refection film on the plane formed in the polishing process, wherein, in the arranging process, the protection members are arranged on top of the optical waveguide by attaching by an adhesive, in the reflection film laying process, the incident side reflection film or the emission side reflection film is formed on the plane perpendicular to the optical waveguide, by laying the multi-layer deposition film with a reflection factor of 95% or more all over the plane formed by the end facet of the substrate and the end facet of one of the protection members attached by the adhesive, in a temperature condition lower than a heat-resistant temperature of the adhesive without diffusing a gas component from the adhesive after hardening.

3. The method for preparing the optical modulator according to claim 2, wherein in the optical waveguide forming process, the optical waveguide is formed as a region in which a waveguide mode exists only with respect to a single polarized component by a proton exchange from a top of the substrate having at least an electrooptic effect.

4. The method for preparing the optical modulator according to claim 2, wherein the method further comprises a ridge structure forming process for forming a ridge structure to the substrate, wherein in the electrode forming process, an electrode having a ridge structure is formed as the electrode for applying an electric field to the optical waveguide on the buffer layer laminated in the laminating process on the substrate in which the ridge structure is formed.

5. An optical resonator comprising:
a resonating means composed of an incident side reflection film and an emission side reflection film for resonating light incident via the incident side reflection film;
an optical waveguide formed to penetrate from the incident side reflection film to the emission side reflection film for propagating light resonated by the resonating means;
a substrate to which the optical waveguide is formed from a top surface thereof; and
an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide,
wherein the incident side reflection film and the emission side reflection film are respectively a multi-layer deposition film with a reflection factor of 95% or more laid, in a temperature condition lower than a heat-resistant temperature of the adhesive without diffusing a gas component from the adhesive after hardening, on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

6. The optical resonator according to claim 5, wherein the protection members composing the end facet protecting means are made from a material same as the substrate, and the end facet of the substrate and the end facet of one of the protection members forming the plane are having an identical crystal orientation mutually,
the end facet protecting means is arranged on the optical waveguide such that one end facet of one of the protection members forms an identical plane with the end facet of the substrate including the optical incident end in the optical waveguide, and such that one end facet of other of the protection members forms an identical plane with the end facet of the substrate including the optical emission end in the optical waveguide.

7. An optical modulator comprising:
an oscillating means for oscillating a modulation signal of a predetermined frequency;
a resonating means composed of an incident side reflection film and an emission side reflection film for resonating light incident via the incident side reflection film;
an optical waveguide formed to penetrate from the incident side reflection film to the emission side reflection film for modulating a phase of light resonated by the resonating means according to the modulation signal supplied from the oscillating means;
a substrate to which the optical waveguide is formed from a top surface thereof; and
an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide,
wherein the incident side reflection film and the emission side reflection film are respectively a multi-layer deposition film with a reflection factor of 95% or more laid, in a temperature condition lower than a heat-resistant temperature of the adhesive without diffusing a gas component from the adhesive after hardening, on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

8. An optical modulator comprising:
a resonating means composed of an incident side reflection film and an emission side reflection film for resonating light incident via the incident side reflection film;
an optical waveguide formed to penetrate from the incident side reflection film to the emission side reflection film;
a substrate to which the optical waveguide is formed from a top surface thereof;
an optical modulation means composed of an electrode formed on the substrate for propagating a modulation signal to a forward direction or a backward direction for modulating a phase of light propagated in the optical waveguide according to a wavelength of an electric signal supplied to the electrode; and an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a multi-layer deposition film with a reflection factor of 95% or more laid, in a temperature condition lower than a heat-resistant temperature of the adhesive without diffusing a gas component from the adhesive after hardening, on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

9. The optical modulator according to claim 8, wherein the optical waveguide is formed on the substrate having at least an electrooptic effect as a region in which a waveguide mode exists only with respect to a single polarized component.

10. The optical modulator according to claim 8, wherein a ridge structure is formed to the substrate and the electrode of the optical modulator is having a ridge structure.

11. An optical frequency comb generator comprising:
an oscillating means for oscillating a modulation signal of a predetermined frequency;
a resonating means composed of an incident side reflection film and an emission side reflection film for resonating light incident via the incident side reflection film;
an optical waveguide formed to penetrate from the incident side reflection film to the emission side reflection film for modulating a phase of light resonated by the resonating means according to the modulation signal supplied from the oscillating means and for generating side bands with a frequency of incident light as a center at frequency intervals of the modulation signal;
a substrate to which the optical waveguide is formed from a top surface thereof;
an optical modulation means composed of an electrode formed on the substrate for propagating the modulation signal to a forward direction or a backward direction for modulating a phase of light propagated in the optical waveguide according to a wavelength of an electric signal supplied to the electrode; and
an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a multi-layer deposition film with a reflection factor of 95% or more laid, in a temperature condition lower than a heat-resistant temperature of the adhesive without diffusing a gas component from the adhesive after hardening, on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

12. An optical oscillator comprising:
a resonating means composed of an incident side reflection film and an emission side reflection film for resonating light incident via the incident side reflection film or light generated by a laser amplification;
an optical waveguide formed to penetrate from the incident side reflection film to the emission side reflection film for amplifying light resonated by the resonating means and for emitting amplified light to outside via the emission side reflection film;
a substrate to which the optical waveguide is formed from a top surface thereof;
an optical modulation means composed of an electrode formed on the substrate for propagating a modulation signal to a forward direction or a backward direction for modulating a phase of light propagated in the optical waveguide according to a wavelength of an electric signal supplied to the electrode; and
an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a multi-layer deposition film with a reflection factor of 95% or more laid, in a temperature condition lower than a heat-resistant temperature of the adhesive without diffusing a gas component from the adhesive after hardening, on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive.

13. The optical oscillator according to claim 12, wherein a medium having an amplifying property with respect to a wavelength of light inherent to the medium by absorbing light incident via the incident side reflection film is diffused in the optical waveguide.

14. The optical oscillator according to claim 12, wherein the optical waveguide is composed of a nonlinear optical crystal.

15. An optical oscillator comprising:
an oscillating means for oscillating a modulation signal of a predetermined frequency;
a resonating means composed of an incident side reflection film and an emission side reflection film for resonating light incident via the incident side reflection film or light generated by a laser amplification;
an optical waveguide formed to penetrate from the incident side reflection film to the emission side reflection film for amplifying light resonated by the resonating means according to the modulation signal supplied from the oscillating means and for emitting amplified light to outside via the emission side reflection film;
a substrate to which the optical waveguide is formed from a top surface thereof;
an optical modulation means composed of an electrode formed on the substrate for propagating the modulation signal to a forward direction or a backward direction for modulating a phase of light propagated in the optical waveguide according to a wavelength of an electric signal supplied to the electrode; and an end facet protecting means composed of protection members having same stiffness as the substrate and the protection members are arranged and attached on the optical waveguide by an adhesive such that at least one end facet of each of the protection members forms an identical plane with an end facet of the substrate including an optical incident end or an optical emission end in the optical waveguide, wherein the incident side reflection film and the emission side reflection film are respectively a multi-layer deposition film with a reflection factor of 95% or more laid, in a temperature condition lower than a heat-resistant temperature of the adhesive without diffusing a gas component from the adhesive after hardening, on a plane perpendicular to the optical waveguide formed as a flat polished surface including the optical incident end or the optical emission end of the optical waveguide by polishing all over the plane formed by the end facet of the substrate and the end facet of one of the protection members attached by the adhesive, and synchronize phases between multi-modes for oscillating laser.

* * * * *